(12) United States Patent
Xu et al.

(10) Patent No.: US 12,069,059 B2
(45) Date of Patent: *Aug. 20, 2024

(54) SYSTEM AND METHOD FOR DYNAMICALLY PROVIDING COMMUNICATION PROFILES FOR MOBILE DEVICES

(71) Applicant: 7-TEL, Inc., San Jose, CA (US)

(72) Inventors: Richard H. Xu, San Jose, CA (US); Xiaolei Qin, Belmont, CA (US); Phillip C. Krasko, Patterson, CA (US); Douglas A Cheline, San Jose, CA (US)

(73) Assignee: 7-TEL, Inc., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/922,707

(22) Filed: Jul. 7, 2020

(65) Prior Publication Data

US 2020/0336491 A1 Oct. 22, 2020

Related U.S. Application Data

(60) Continuation of application No. 14/151,787, filed on Jan. 9, 2014, now Pat. No. 10,965,681, which is a
(Continued)

(51) Int. Cl.
*H04L 29/06* (2006.01)
*G06Q 20/10* (2012.01)
(Continued)

(52) U.S. Cl.
CPC ......... *H04L 63/102* (2013.01); *G06Q 20/102* (2013.01); *G06Q 20/28* (2013.01);
(Continued)

(58) Field of Classification Search
CPC ............................ H04L 63/102; G06Q 20/102
(Continued)

(56) References Cited

U.S. PATENT DOCUMENTS 6,563,919 B1 * 5/2003 Aravamudhan ........ H04L 51/56
379/230
6,775,267 B1 * 8/2004 Kung .................... H04L 47/805
379/114.06
(Continued)

FOREIGN PATENT DOCUMENTS

EP 1727383 * 5/2005 ............... H04Q 7/38
EP 1717383 A1 * 11/2006 .............. H04W 8/18
(Continued)

OTHER PUBLICATIONS

Anonymous, Canada News Wire Ottawa. Rogers Wireless and Motorola push versatility, durability and reliability to the limit with new 3G Motorola Extreme(TM) VA76r handset, Sep. 23, 2008, PR Newswire Association LLC, Canada News Wire, 3 pages. (Year: 2008).*

*Primary Examiner* — Benjamin S Brindley
(74) *Attorney, Agent, or Firm* — Huse IP Law; Charles C. Huse

(57) ABSTRACT

The mobile device stores a plurality of communication profiles comprising one or more local communication profiles and a global communication profile. The mobile device determines local access requirements for connecting to a local cellular network operator and determines whether the plurality of communication profiles comprises a local communication profile that satisfies the local access requirements. When the plurality of communication profiles does not comprise a local communication profile that satisfies the local access requirements: the mobile device connects to a global cellular network operator using the global communication profile; receives, from the global cellular network operator, a new local communication profile that satisfies the local access requirements and connects to the local cellular network operator using the new local communication profile. Subsequently, the mobile device communicates with (Continued)

another device via the local cellular network operator as if the mobile device was a local mobile device.

18 Claims, 28 Drawing Sheets

Related U.S. Application Data division of application No. 13/846,772, filed on Mar. 18, 2013, now abandoned, which is a continuation of application No. 12/774,620, filed on May 5, 2010, now abandoned, which is a continuation of application No. 12/774,590, filed on May 5, 2010, now abandoned, and a continuation of application No. PCT/US2010/032759, filed on Apr. 28, 2010.

(51) Int. Cl.

| | | |
|---|---|---|
| *G06Q 20/28* | (2012.01) | |
| *G06Q 40/00* | (2023.01) | |
| *H04L 9/40* | (2022.01) | |
| *H04L 67/306* | (2022.01) | |
| *H04M 15/00* | (2006.01) | |
| *H04M 17/00* | (2006.01) | |
| *H04M 17/02* | (2006.01) | |
| *H04W 4/24* | (2018.01) | |
| *H04W 8/18* | (2009.01) | |
| *H04W 12/06* | (2021.01) | |
| *H04W 12/45* | (2021.01) | |

(52) U.S. Cl.
CPC ............ *G06Q 40/00* (2013.01); *H04L 67/306* (2013.01); *H04M 15/00* (2013.01); *H04M 15/49* (2013.01); *H04M 15/51* (2013.01); *H04M 15/67* (2013.01); *H04M 17/02* (2013.01); *H04M 17/20* (2013.01); *H04W 4/24* (2013.01); *H04W 8/18* (2013.01); *H04W 12/06* (2013.01); *H04W 12/45* (2021.01)

(58) Field of Classification Search
USPC .......................................... 455/411
See application file for complete search history.

(56) References Cited

U.S. PATENT DOCUMENTS

| | | | | |
|---|---|---|---|---|
| 6,975,852 B1* | 12/2005 | Sofer | ................ | H04M 17/20 |
| | | | | 455/406 |
| 7,184,774 B2* | 2/2007 | Robinson | ............ | H04L 12/5691 |
| | | | | 455/445 |
| 2002/0197991 A1* | 12/2002 | Anvekar | ................ | H04W 8/183 |
| | | | | 455/406 |
| 2003/0036392 A1* | 2/2003 | Yukie | ................. | H04W 8/00 |
| | | | | 455/461 |
| 2003/0137991 A1* | 7/2003 | Doshi | ................ | H04L 61/4535 |
| | | | | 370/466 |
| 2003/0199265 A1* | 10/2003 | Aoyama | ............ | H04M 17/204 |
| | | | | 455/406 |
| 2007/0093246 A1* | 4/2007 | Adamany | ............ | H04W 12/08 |
| | | | | 455/432.1 |
| 2008/0081609 A1* | 4/2008 | Burgan | ................ | H04W 8/18 |
| | | | | 455/425 |
| 2008/0235185 A1* | 9/2008 | Fratti | ................. | H04W 48/14 |
| 2010/0248680 A1* | 9/2010 | Agulnik | ............ | H04W 74/006 |
| | | | | 370/328 |
| 2011/0207503 A1* | 8/2011 | Ruperto | ................ | H04W 48/18 |
| | | | | 455/552.1 |

FOREIGN PATENT DOCUMENTS

| | | | | |
|---|---|---|---|---|
| EP | 1727383 A1 | | 11/2006 | |
| EP | 1727383 A1 * | | 11/2006 | ............. H04W 8/18 |
| GB | 2313257 | * | 5/1996 | ............. H04Q 7/38 |
| GB | 2313257 A | | 11/1997 | |
| WO | WO1999/027723 A1 | | 6/1999 | |
| WO | WO2003024081 A1 | | 3/2003 | |
| WO | WO2007/143342 A2 | | 12/2007 | |
| WO | WO-2008027660 A2 * | | 3/2008 | ........... H04W 60/00 |
| WO | WO-2008143441 A1 * | | 11/2008 | ...... H04M 1/274566 |

\* cited by examiner

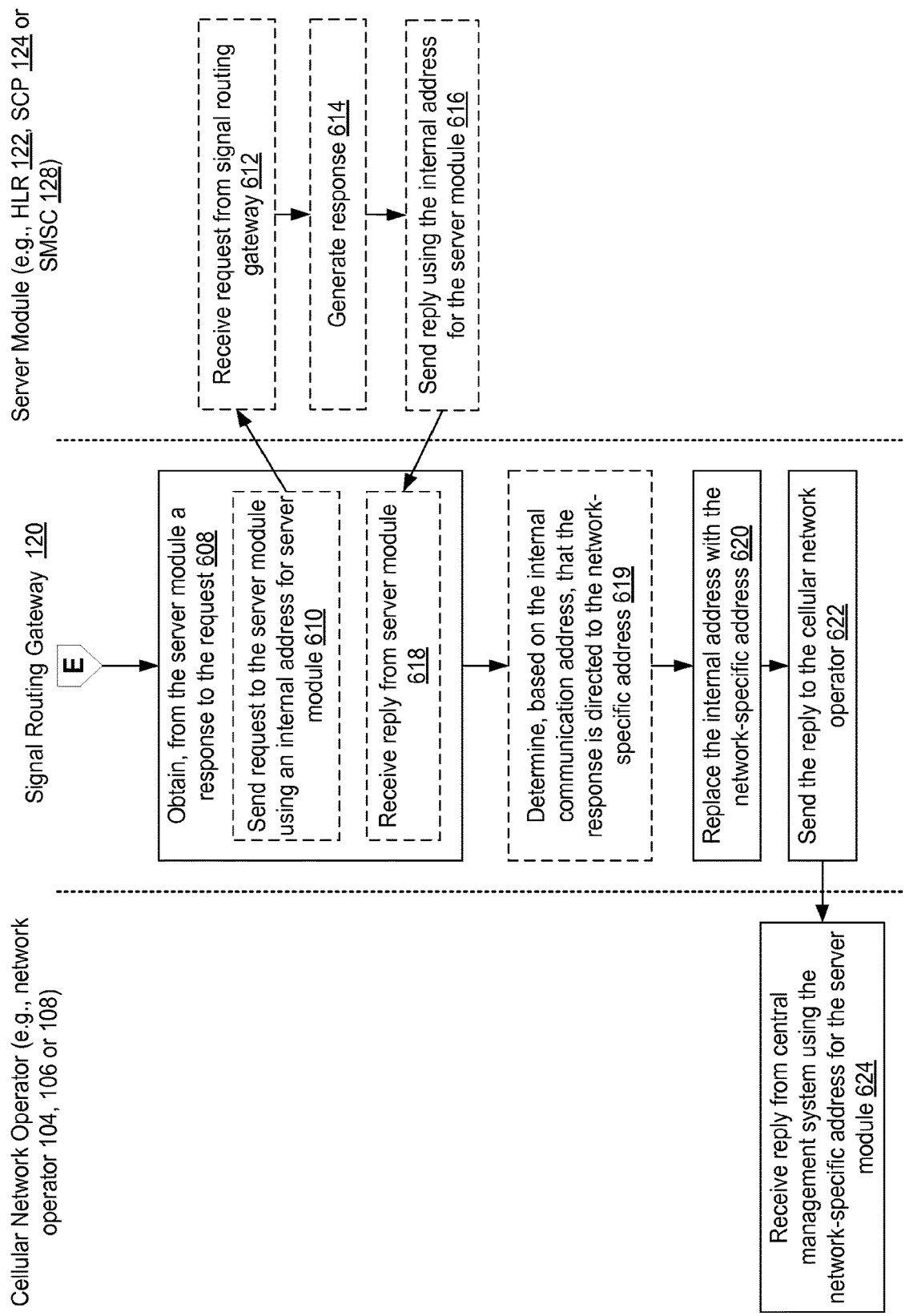

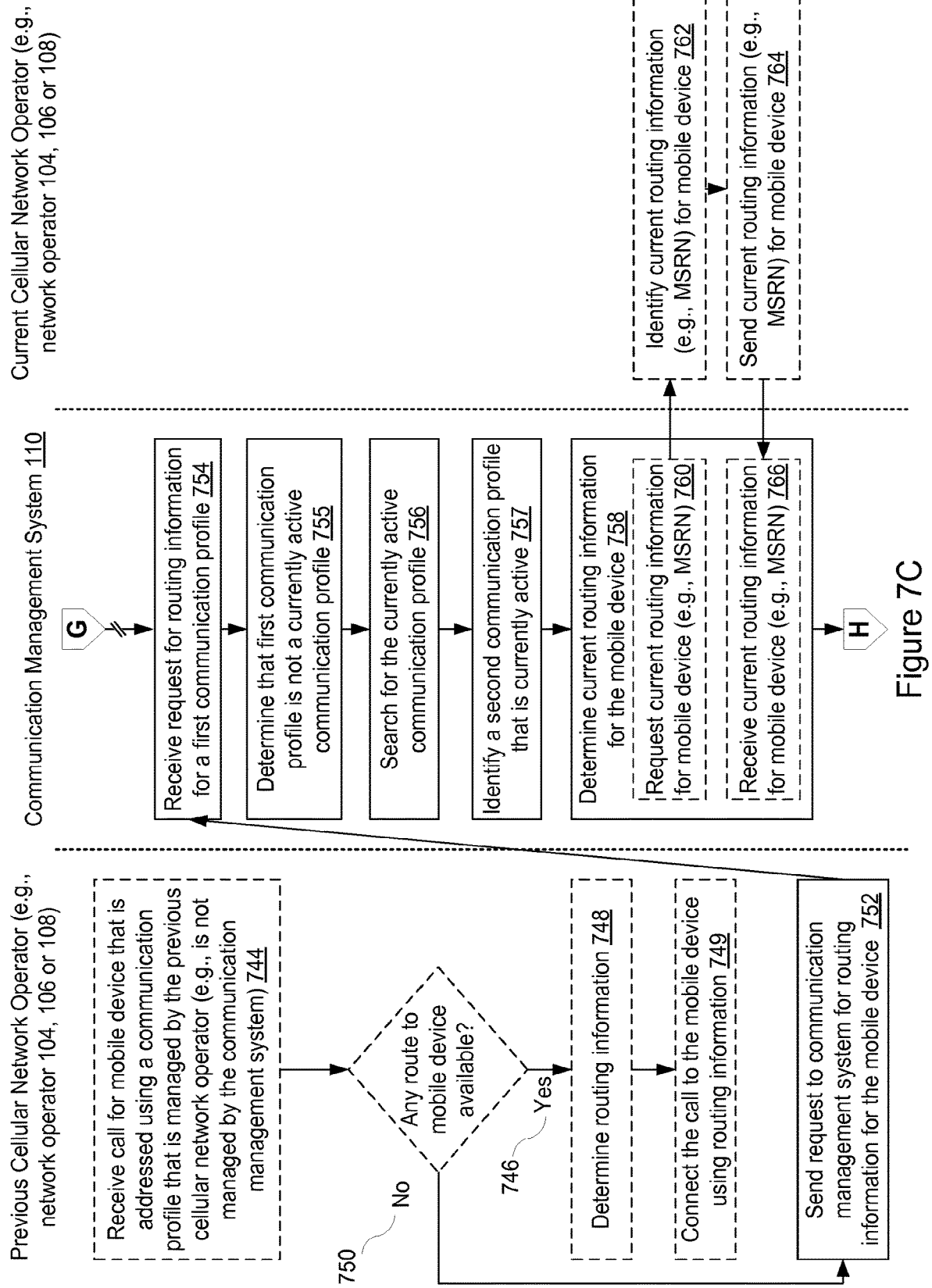

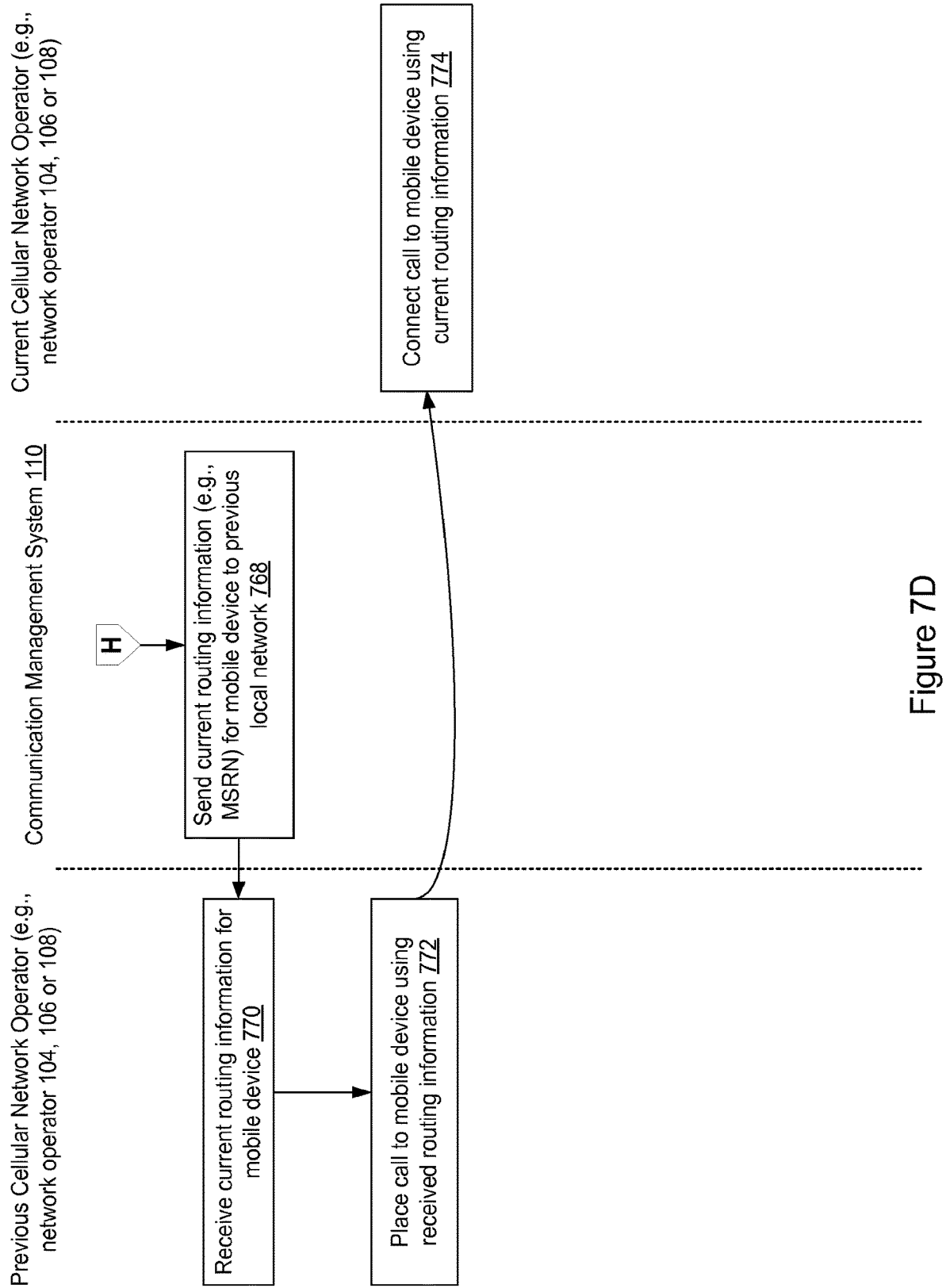

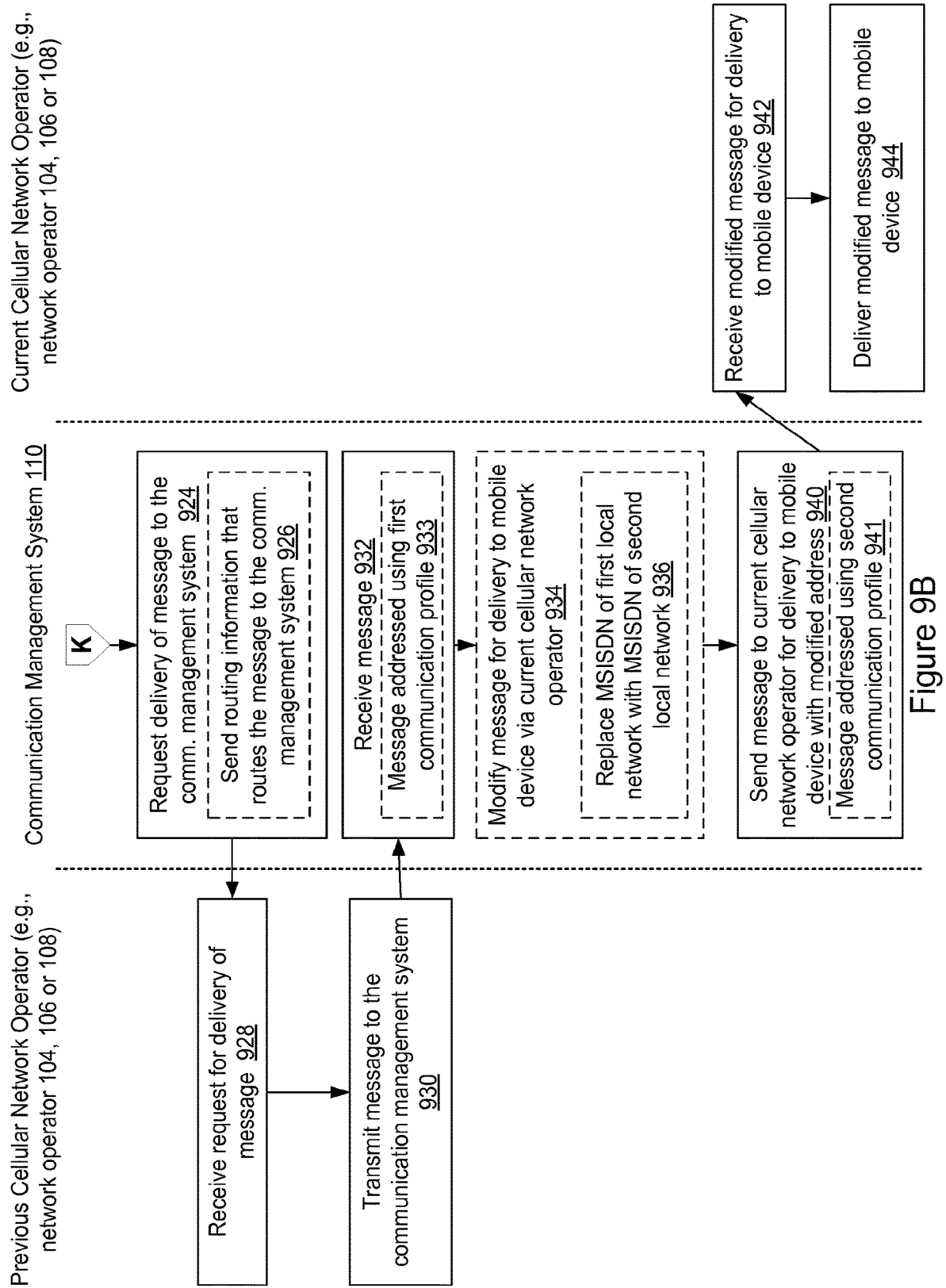

SYSTEM AND METHOD FOR DYNAMICALLY PROVIDING COMMUNICATION PROFILES FOR MOBILE DEVICES

RELATED APPLICATIONS

This application is a continuation of prior application Ser. No. 14/151,787, filed Jan. 9, 2014, which is a divisional of prior application Ser. No. 13/846,772, filed Mar. 18, 2013, which is a continuation of prior application Ser. No. 12/774,620, filed May 5, 2010, which is a continuation of PCT International Application No. PCT/US/2010/032759, filed Apr. 28, 2010, entitled "System and Method for Dynamically Providing Communication Profiles for Mobile Devices," and a continuation of prior application Ser. No. 12/774,590, filed May 5, 2010. The entirety of each of the foregoing applications is incorporated by reference herein.

This application is related to U.S. patent application Ser. No. 12/774,590, filed May 5, 2010, entitled "System and Method for Dynamically Providing Communication Profiles for Mobile Devices," which application is incorporated by reference herein in its entirety.

This application is related to U.S. patent application Ser. No. 12/774,605, filed May 5, 2010, entitled "System and Method for Routing Signals Using Network-Specific Identifiers for a Common Server Module," which application is incorporated by reference herein in its entirety.

This application is related to U.S. patent application Ser. No. 12/774,611, filed May 5, 2010, entitled "System and Method for Routing a Call to a Mobile Device Associated with Multiple Communication Profiles," which application is incorporated by reference herein in its entirety.

This application is related to U.S. patent application Ser. No. 12/774,629, filed May 5, 2010, entitled "System and Method for Routing a Message to a Mobile Device Associated with Multiple Communication Profiles," which application is incorporated by reference herein in its entirety.

TECHNICAL FIELD

The disclosed embodiments relate generally to systems and methods for providing mobile communication services. More specifically, the embodiments relate to dynamically switching between communication profiles on a mobile device so as to provide mobile communication services, and in particular mobile telephone services, to subscribers at a reduced cost.

BACKGROUND

Mobile devices such as mobile phones, PDAs, and smartphones are becoming increasingly ubiquitous. Subscribers need their mobile devices to be functional in a wide variety of locations including their place of work, their residence, and domestic travel destinations as well as international travel destinations. Typically, a home cellular network operator provides wireless communication services to the mobile devices of its subscribers over a home cellular network and has arrangements with other cellular network operators to provide access to the other cellular network operators' cellular communication networks via inter-network roaming agreements. However, the terms of these inter-network roaming agreements have a number of drawbacks, the biggest of which is the cost. Roaming subscribers making calls or sending messages are typically charged significantly more than subscribers of the local cellular network operator making the same actions. Similarly, high costs are also incurred by other callers in the roaming country attempting to call the mobile device of the roaming subscriber, as the callers must use the home phone number associated with the home cellular network operator to reach the mobile device, thereby incurring long-distance international phone charges.

As a result, many subscribers buy local prepaid mobile service plans from local cellular network operators for use when communicating while outside of the cellular network operated by their home cellular network operator, instead of using the roaming services provided by their home cellular network operator. As a preliminary matter, the logistics of acquiring separate subscriber identity module (SIM) cards and/or mobile devices for each country to which the subscriber plans to travel is burdensome and complicated. Moreover, while the subscriber is able to circumvent the high cost of roaming phone calls by switching between different SIM cards or different mobile device, such switching disconnects the subscriber from communications that are sent to their home cellular network operator.

In other words, in exchange for cheaper local calls, the subscriber loses the ability to make and receive communications using their existing account with their home cellular network operator, thereby making it difficult to communicate with friends and family who use the subscribers regular phone number that is associated with the subscriber's home cellular network operator to communicate with the subscriber. This behavior by subscribers also has negative consequences for network operators. In particular, when a subscriber switches SIM cards or mobile devices, the home cellular network operator loses the chance to provide services to that subscriber, resulting in lost revenue for the home cellular network operator. Additionally, switching SIM cards or mobile devices also limits the ability of the subscriber to remain connected with contacts in foreign countries that the user was in communication with using a local SIM card or local mobile device. In particular, when the subscriber switches back from the local SIM card or local mobile device to the home mobile device or home SIM card, the subscriber is unable to receive calls or messages that are directed towards the local SIM card or local mobile device, because the local SIM card and/or the local mobile device are no longer connected to a cellular network operator.

Other problems are faced by subscribers who want to use a mobile device that was using funds from a prepaid account. Prepaid service plans are increasingly popular, however, a prepaid subscriber who travels to a geographic location where the home cellular network operator does not have any infrastructure for adding funds (topping-up) the prepaid account may be faced with a shortage of funds in the prepaid account and no way to add additional funds. Moreover, prepaid vouchers are typically denominated in local currency, which further complicates adding funds to a prepaid account with the subscriber's home network operator which typically accepts the subscriber's home currency. If a prepaid subscriber merely switches mobile devices or SIM cards to a local mobile device associated with a local cellular network operator, the funds paid to the subscriber's home cellular network operator are unusable. Similarly, when the prepaid subscriber returns to the home cellular network operator any unused prepaid funds that were paid to the local cellular network operator are likewise unusable. This can result in substantial unusable funds.

SUMMARY

In light of the above, it is highly desirable to provide a system and method for addressing the above mentioned drawbacks. The system and method described herein allows travelers to seamlessly transition from a home cellular network operator to one or more local cellular network operators. In particular, the system and method herein allows the mobile device to receive communications at a home phone number while outside of the home cellular network operator's network and to receive communications at a local (roaming) phone number when the device is connected to the home cellular network operator's network. The system is cheaper, more efficient, and more convenient for subscribers than the options currently available to mobile communication (e.g., mobile telephone) subscribers.

The described embodiments also provide a system and method for seamlessly transitioning a mobile device from one cellular network operator to another cellular network operator through over-the-air provisioning of communication profiles, and call and message routing logic that enables a single mobile device to receive calls and messages directed to multiple different communication profiles, even though the mobile device may only be actively using a single one of those multiple communication profiles at any given time. The described embodiments also provide a system and method for managing a single central prepaid account where funds from the central prepaid account can be accessed by the mobile device using any of the multiple communication profiles, and where funds can be added to the central prepaid account using local payment protocols associated with local cellular network operators.

In one aspect of the invention, a method of dynamically receiving a local communication profile at a mobile device is performed, the method comprising: at a mobile device having one or more processors and memory, the memory storing a plurality of communication profiles comprising one or more local communication profiles and a global communication profile, determining local access requirements for connecting to a local cellular network operator are, determining whether the plurality of communication profiles comprises a local communication profile that satisfies the local access requirements. When the plurality of communication profiles does not comprise a local communication profile that satisfies the local access requirements the method further comprises connecting to a global cellular network operator using the global communication profile, receiving, from the global cellular network operator, a new local communication profile that satisfies the local access requirements; connecting to the local cellular network operator using the new local communication profile; and communicating with another device via the local cellular network operator as if the mobile device was a local mobile device. In some embodiments instructions for performing the operations described above are stored in a computer readable storage medium of the mobile device for execution by one or more processors of the mobile device. In some embodiments, the mobile device has one or more processors, memory, and one or more programs having instructions for performing the operations described above, wherein the one or more programs are stored in the memory and configured to be executed by the one or more processors so as to perform the instructions.

In another aspect of the invention, a method for dynamically providing a local communication profile to a mobile device is performed, the method comprising: at a communication management system having one or more processors and memory: receiving, from a global cellular network operator, a request to connect a mobile device to the global cellular network operator using a global communication profile; enabling the mobile device to connect to the global cellular network operator; sending, to the mobile device, via the global cellular network operator, a local communication profile that enables the mobile device to obtain access to a local cellular network operator. The method further comprises receiving, from the local cellular network operator, a request to connect the mobile device to the local cellular network operator using the local communication profile; and enabling the mobile device to connect to the local cellular network operator. In some embodiments instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for routing messages in a cellular network using network-specific addressing schemes, the method comprising: providing a communication management system comprising a server module and a signal routing gateway that is connected to a plurality of different cellular network operators; at the signal routing gateway: receiving a first request from a first cellular network operator of the plurality of cellular network operators. The first request is addressed to a first network-specific address assigned to the server module in accordance with a first addressing scheme of the first cellular network operator. The method further comprises, in response to the first request: replacing the first network-specific address with an internal address assigned to the server module in accordance with an internal addressing scheme of the communication management system; obtaining from the server module a first response to the first request, wherein the first response is addressed from the internal address; replacing the internal address with the first network-specific address; sending the first response to the first cellular network operator. The method further comprises receiving a second request from a second cellular network operator of the plurality of cellular network operators. The second cellular network is distinct from the first cellular network and the second request is addressed to a second network-specific address assigned to the server module in accordance with a second addressing scheme of the second cellular network operator. The method further comprises, in response to the second request: replacing the second network-specific address with the internal address; obtaining from the server module a second response to the second request, wherein the second response is addressed from the internal address; replacing the internal address with the second network-specific address; and sending the second response to the second cellular network operator. In some embodiments instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for providing routing information to a first cellular network operator for an incoming call: at a communication management system having one or more processors and memory: receiving, from a first cellular network operator, a request for routing information associated with a first communication profile of a mobile device; identifying, based on the first communication profile, a second communication profile that is an active communication profile for the mobile device. The second communication profile is associated with a second cellular network operator. The method further comprises determining routing information associated with the second communication profile; and sending, to the first cellular network operator, a reply comprising the routing information associated with the second communication profile. In some embodiments instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for providing routing information for a mobile device to a cellular network operator through an emulated device register, the method comprising: at a communication management system having one or more processors and memory: registering a mobile device for connection to a first cellular network operator, wherein the mobile device was previously connected to a second cellular network operator; sending to the second cellular network operator, a notification that indicates the presence of an emulated device register with which the mobile device is connected. The emulated device register appears, to the second cellular network operator, to be a native device register associated with the second cellular network operator. The method further comprises receiving, at the emulated device register, from the second cellular network operator, a request for routing information for the mobile device; and in response to the request: determining routing information for the mobile device; and providing, to the second cellular network operator, the routing information for the mobile device so as to enable the second cellular network operator to communicate with the mobile device. In some embodiments instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for routing a message from a cellular network operator to a mobile device, the method comprising: at a communication management system having one or more processors and memory: receiving, from a first cellular network operator, a request for routing information for a message that is addressed to a mobile device using a first communication profile. When the communication management system determines that the mobile device is connected to a second cellular network operator using a second communication profile, the communication management system responds to the request by: requesting, from the first cellular network operator, delivery of the message to the communication management system; receiving the message from the first cellular network operator; and sending the message to the second cellular network operator. The message is addressed to the mobile device using the second communication profile. In some embodiments, instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for managing a message that is forwarded from a cellular network operator, the method comprising: at a communication management system having one or more processors and memory, wherein the communication management system manages a plurality of communication profiles for a mobile device: receiving, from a home cellular network operator, a forwarded message addressed to a mobile device using a home communication profile for the mobile device; when the communication management system determines that the mobile device is actively using a respective local communication profile of the plurality of communication profiles, sending the message to the mobile device using the local communication profile; and when the communication management system determines that the mobile device is not actively using any of the plurality of communication profiles for the mobile device, notifying the home cellular network operator that the forwarded message will not be sent to the mobile device. In some embodiments, instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

In another aspect of the invention, a method for adding funds to a prepaid account at a home cellular network operator of a mobile device comprising: at a communication management system having one or more processors and memory: receiving, from a local cellular network operator, a communication indicating that a payment has been made to the local cellular network operator for a mobile device using a local communication profile; identifying, based on the local communication profile, a home communication profile of the mobile device. The home communication profile is associated with a home cellular network operator that is distinct from the local cellular network operator. The method further comprises sending, to the home cellular network operator, a request to add funds to a prepaid account that is associated with the home communication profile of the mobile device. In some embodiments, instructions for performing the operations described above are stored in a computer readable storage medium of the communication management system for execution by one or more processors of the communication management system. In some embodiments, the communication management system has one or more processors, memory, and one or more programs having instructions for performing the operations described above, wherein the one or more programs are stored in the memory and configured to be executed by the one or more processors so as to perform the instructions.

Thus, the system and methods described herein improve the efficiency, convenience and cost of using a mobile device on cellular networks operated by multiple different cellular network operators by dynamically provisioning communication profiles to the mobile device and seamlessly transitioning the mobile device from one cellular network operator to another. Moreover, the disclosed system and methods provide improved communication routing logic, which enables the mobile device to receive calls and messages from multiple cellular network operators, thereby minimizing the adverse consequences (e.g., missed calls and missed messages) that are attendant with switching between communication profiles for different cellular network operators. Finally, the disclosed system and methods enable prepaid subscribers to use local payment protocols to add funds to a central prepaid account, thereby mitigating or eliminating the problems faced by prepaid subscribers when switching between different cellular network operators.

BRIEF DESCRIPTION OF THE DRAWINGS

For a better understanding of the aforementioned embodiments of the invention as well as additional embodiments thereof, reference should be made to the Description of Embodiments below.

FIGS. 6A-6B are flow diagrams illustrating a process for routing signals using network-specific identifiers for a common server module in accordance with some embodiments.

FIGS. 7A-7D are flow diagrams illustrating a process for routing a call to a mobile device associated with multiple communication profiles using a communication management system in accordance with some embodiments.

FIGS. 9A-9C are flow diagrams illustrating a process for routing a message to a mobile device associated with multiple communication profiles by replacing communication profile information in the message in accordance with some embodiments.

Like reference numerals refer to corresponding parts throughout the drawings.

DESCRIPTION OF EMBODIMENTS

Figure 1A:
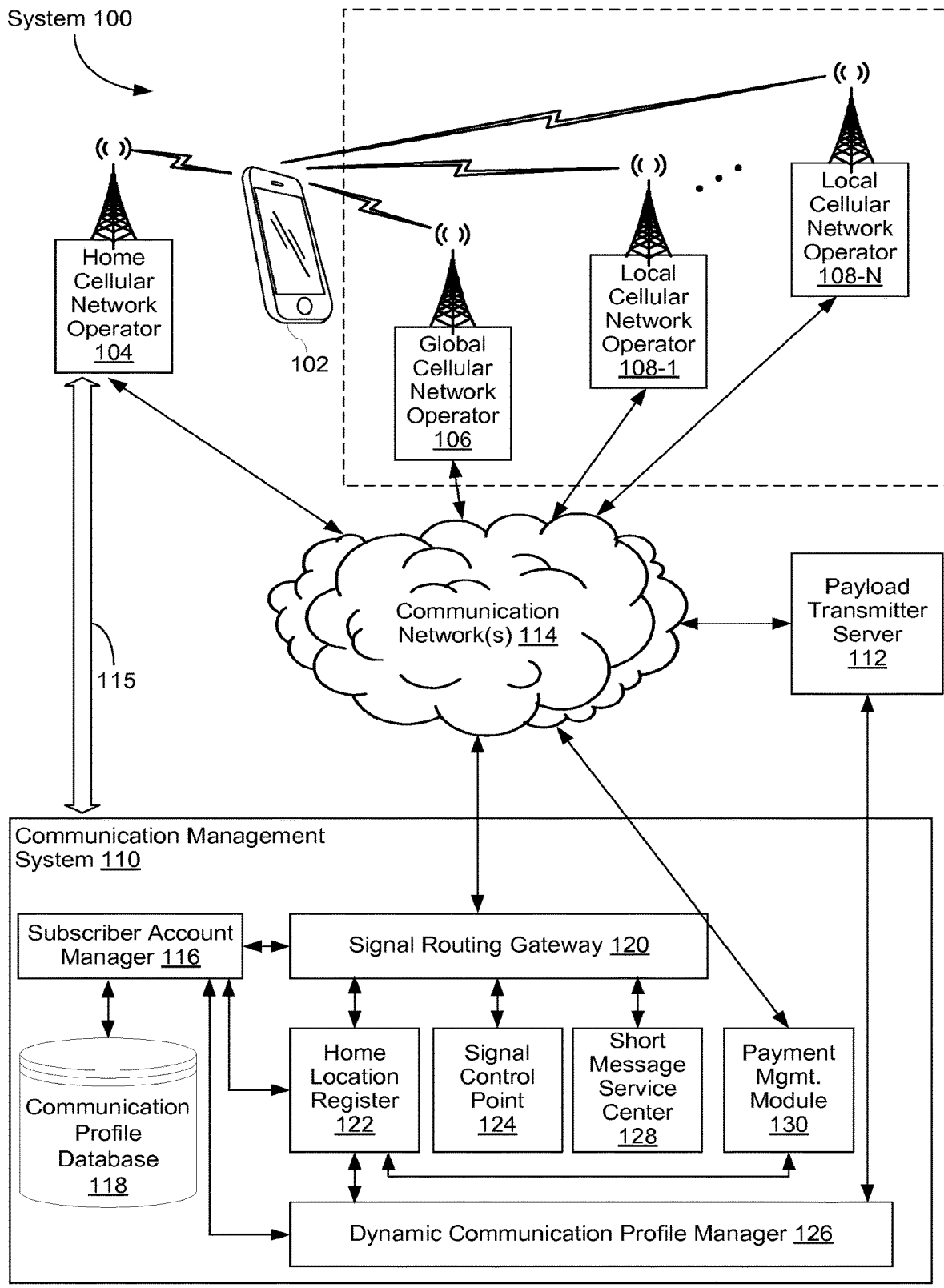
FIG. 1A is a block diagram illustrating an overview of a system for dynamically provisioning local communication profiles, in accordance with some embodiments.

Attention is now directed to FIG. 1A, which illustrates an overview of a distributed system 100 for processing phone calls and dynamically switching communication profiles in accordance with some embodiments. The distributed system 100 includes a mobile device 102, a plurality of cellular network operators (e.g., home cellular network operator 104, a global cellular network operator 106 and/or one or more local cellular network operators 108-1, 108-N, etc.), a communication management system 110, and a payload transmitter server 112. In this distributed system 100 the mobile device 102 is capable of being configured to connect to a plurality of cellular telephone network operators (e.g., home cellular network operator 104, a global cellular network operator 106 and/or one or more local cellular network operators 108-1, 108-N, etc.), and the cellular network operators are linked to the communication management system 110 and the payload transmitter server 112 through a communication network 114 (e.g., the Internet, other wide area networks, local area network, etc.) so that these components can communicate with each other. Typically, communications are transmitted using a Signaling System Seven (SS7) protocol or other similar standard signaling protocol. However, in some embodiments various communications are transmitted using other protocols (e.g., IP based protocols). In some embodiments, the communication management system 110 has a relationship 115 with the home cellular network operator 104 to provide the mobile device 102 with cellular network access when the mobile device 102 is outside of the service area of the home cellular network operator 104. In some embodiments, the communication management system 110 provides the cellular network operators with access to the mobile device 102 by dynamically providing communication profiles to the mobile device 102 via a global cellular network operator 106; where the dynamically provided communication profiles allow the mobile device 102 to connect with local cellular network operators 108 as described in greater detail below.

A communication profile is an identifier or set of identifiers which identifies a mobile device 102 to a cellular network operator. Communication profiles may be globally unique or may be unique to a respective cellular network operator. Communication profiles typically include an international mobile subscriber identity (IMSI), however a communication profile may also include a mobile station integrated services digital network number (MSISDN) that has been associated with an IMSI in addition to the IMSI. Similarly any other identifier that is used to permanently or semi-permanently identify a mobile device 102 to a cellular network operator may be used as communication profile.

Examples of suitable mobile devices 102 include a cellular telephone, a smartphone, a personal digital assistant, a portable email client, a portable computer, a netbook, a tablet computer, or any other device that can be configured to receive or transmit voice, messages or data through a cellular network. In some embodiments, the mobile device 102 includes a subscriber identity module (SIM) card that stores a plurality of communication profiles associated with respective cellular network operators. The mobile device 102 is initially configured to be used by the subscriber (e.g., the user of the mobile device 102) to connect to a cellular network operator using an active communication profile (e.g., a home communication profile associated with home cellular network operator 104), upon leaving a service area of the home cellular network operator 104, the mobile device 102 is configured to access a global cellular network operator 106 so as to receive a communication profile for one of the local cellular network operators (e.g., local cellular network operator 108-1).

In some embodiments a cellular network operator is an entity (e.g., a server system) that manages a wireless communication network made up of multiple (often hundreds or thousands) of cellular antennae that transmit and receive wireless signals. Such cellular antennae typically communicate with mobile devices using a standard communication protocol such as GSM, CDMA, EV-DO, WCDMA, HSDPA, HSPA, UMTS, LTE, etc. In accordance with some embodiments, each respective cellular network operator has its own native set of modules (e.g., a native home location register, visiting location register, mobile switching center, etc.) for managing mobile devices that are connected with the respective cellular network operator, as described in greater detail below with reference to FIG. 1B. In some embodiments, the global cellular network operator 106 has a cellular signal service area that is larger than the cellular signal service area for any of the local cellular network operators 108, as described in greater detail below with reference to FIG. 1C. Typically the global cellular network operator 106 also charges a price for transmitting and receiving communications that is higher than the price charged by the local cellular network operators 108 for transmitting and receiving analogous communications received and/or transmitted from analogous geographic locations. In some embodiments the global cellular network operator 106 has one or more non-roaming geographical regions where the price charged by the global cellular network 106 operator is comparable to the prices charged by local cellular network operators 108 for analogous communications.

The communication management system 110 is responsible for managing the transfer of communication profiles to the mobile device 102. In some embodiments, the communication management system 110 is also responsible for servicing all of the requests of the mobile device 102 to connect with cellular network operators (e.g., global cellular network operator 106 and any local cellular network operators 108) other than the home cellular network operator 104. In some embodiments, the communication management system 110 is also responsible for servicing requests from the cellular network operators for routing information to the mobile device 102. In some embodiments, the communication management system 110 includes one or more modules such as: a communication profile database 118, a signal routing gateway 120, a home location register (HLR) 122, a dynamic communication profile manager 126, a signal control point (SCP) 124, a short message service center (SMSC) 128 and/or a payment management module 130.

The subscriber account manager 116 maintains an account for the mobile device 102 (or a SIM card that is inserted into the mobile device 102) and provides information about the account to the other modules within the communication management system 110. For example, in response to input from a subscriber (e.g., via a web interface) the subscriber account manager 116 creates a service plan in the subscriber account associated with the mobile device 102 (e.g., specifying roaming charges, message and call forwarding preferences, countries in which the subscriber will be provided with local communication profiles etc.). The account for a mobile device 102 may also include system identified parameters such as communication profile data (e.g., one or more previously provided communication profiles for local cellular network operators, a communication profile for the home cellular network operator, etc.) retrieved from the communication profile database 118. The subscriber account manager 116 also communicates with the HLR 122 to provide the HLR 122 with information regarding the communication preferences of the mobile device 102.

The communication profile database 118 includes communication parameters that are associated with communication profiles for the global cellular network operator 106 and/or one or more local cellular network operators 108, such as: International IMSI numbers and MSISDN numbers. In some embodiments, the communication management system 110 is assigned a range of communication parameters (e.g., IMSIs/MSISDNs) by the global cellular network operator 106 and by one or more of the local cellular network operators 108. The cellular network operators use the assigned ranges of communication parameters (e.g., IMSIs/MSISDNs) to route communications (e.g., calls and messages) associated with one of the assigned communication parameters (e.g., IMSIs/MSISDNs) to the communication management system 110. In some embodiments, the communication parameters are only temporarily assigned to a mobile device (or SIM card) 102, and after a predetermined amount of time has elapsed since the communication parameter was last used by the mobile device 102 (e.g., one month), the communication profile database recycles the communication parameter (e.g., the communication parameter is made available or assigned to one or more other subscribers and/or assigned to another subscriber). In some embodiments a subscriber can set a preference to change the predetermined amount of time. In some embodiments, the subscriber can pay to extend the predetermined amount of time or make the assigned communication profile a permanent communication profile for the mobile device 102. For example, a subscriber who often travels to China may pay a small monthly fee to keep a "local" Chinese communication profile and associated phone number.

In some embodiments, the communications are routed to and from the cellular network operators (e.g., the global cellular network operator 106 or one of the local cellular network operators 108) to the communication management system 110 using network-specific addresses for server modules (e.g., the HLR 122, the SCP 124, the SMSC 128, etc.) of the communication management system 110. The signal routing gateway 120 at the communication management system 110 translates the network-specific addresses to internal addresses, so that the server modules within the communication management system 110 can be treated by each cellular network operator as a native component of the cellular network operator. In other words, the addressing conventions used by a respective cellular network operator for its own HLR(s) and SMSC(s) can be applied to the HLR and SMSC controlled by the communication management system 110, as described in greater detail below with reference to FIG. 1D.

The home location register (HLR) 122 is a database that contains registration information for each mobile phone 102 that is authorized to connect to one of the cellular network operators (e.g., global cellular network operator 106 or one of the local cellular network operators 108) through the communication management system 110. The HLR 122 receives requests from the mobile device 102 to connect with one of the cellular network operators (e.g., the global cellular network operator 106 or one of the local cellular network operators 108) and responds with registration information for the requested network (e.g., an MSISDN that is associated with the cellular network operator). Once the mobile device 102 is connected with one of the cellular network operators, the HLR 122 provides current registration information and/or routing information for the mobile device 102 to other cellular network operators and server modules within the communication management system 110.

In some embodiments, the communication management system 110 also includes a signal control point 124, which controls the mobile services for those subscribers that have a pre-paid service plan. The signal control point includes a database of such user groups and a rating engine with a variety of rating plans that control how each user can use the mobile services. For example, after receiving a request from a mobile device to make a phone call, the signal control point would allow the phone call to be completed after determining that the balance in an account associated with the mobile device (e.g., the account associated with the communication profile currently in use by the mobile device) is sufficient to pay for the communication (e.g., determining that the communication profile is associated with an account that has a balance that is sufficient to make a phone call at $0.10 per min).

The dynamic communication profile manager 126 maintains status information for the mobile device 102 including information indicating the cellular network operator (e.g., home cellular network operator 104, global cellular network operator 106 or one of the local cellular network operators 108) with which the mobile device 102 is currently connected. Additionally, when the mobile device 102 requires a new communication profile for one of the cellular network operators (e.g., one of the local cellular network operators 108), the dynamic communication profile manager 126 determines an appropriate communication profile and prepares a payload including the new communication profile. In some embodiments, the dynamic communication profile manager 126 sends the payload to a payload transmitter server 112, which transmits the payload to the mobile device 102 through a cellular network operator (e.g., global cellular network operator 106 or one of the local cellular network operators 108) with which the mobile device 102 is currently connected. In some embodiments, the dynamic communication profile manager 126 provides the payload transmitter server 112 with a current communication profile of the mobile device 102. In some embodiments, the payload transmitter server 112 is distinct from the communication management system 110. In other embodiments, the payload transmitter server 112 is a module within the communication management system 110.

The short message service center 128 manages messages (e.g., short message service or "SMS" messages) that are sent from the mobile device 102 while the mobile device 102 is connected to a cellular network operator using a communication profile managed by the communication management system 110. The short message service center 128 relays messages from the cellular network operator with which the mobile device 102 is currently attached to other cellular network operators. The short message service center 128 also manages messages that are sent to the mobile device 102 by relaying messages from other cellular network operators to a cellular network operator to which the mobile device 102 is currently connected. It should be understood that, the short message service center 128 or an analogous server module may be used in an analogous fashion to handle other types of messages such as enhances message service messages (EMS messages). Similarly, in some embodiments, messages include one or more of SMS and EMS messages.

The payment management module 130 facilitates adding funds to prepaid accounts using local payment protocols. For example, when the mobile device 102 is associated with a prepaid account that is in need of additional funds, the subscriber can simply purchase a local prepaid wireless card and follow the instructions for the local prepaid wireless card to add funds to the prepaid account. The payment management module 130 receives a communication from the local cellular network operator indicating that a payment has been made to the local cellular network operator for the mobile device 102 using a local communication profile. The payment management module 130 determines a home communication profile associated with the local communication profile (e.g., by querying the dynamic communication profile manager 126 in the communication management system 110) and requests that funds be added to a prepaid account associated with the home communication profile. In some embodiments, the payment management module 130 also manages transfers and/or conversion of currency from the local cellular network operator 108 to the home cellular network operator 104 so as to complete a prepaid fund addition operation.

It should be understood that the description above is merely for illustrative purposes, and that the various modules/components within the communication management system 110 could be rearranged, separated from and/or combined with other modules/components of the communication management system 110 without departing from the scope of the system and method disclosed herein.

Figure 1B:
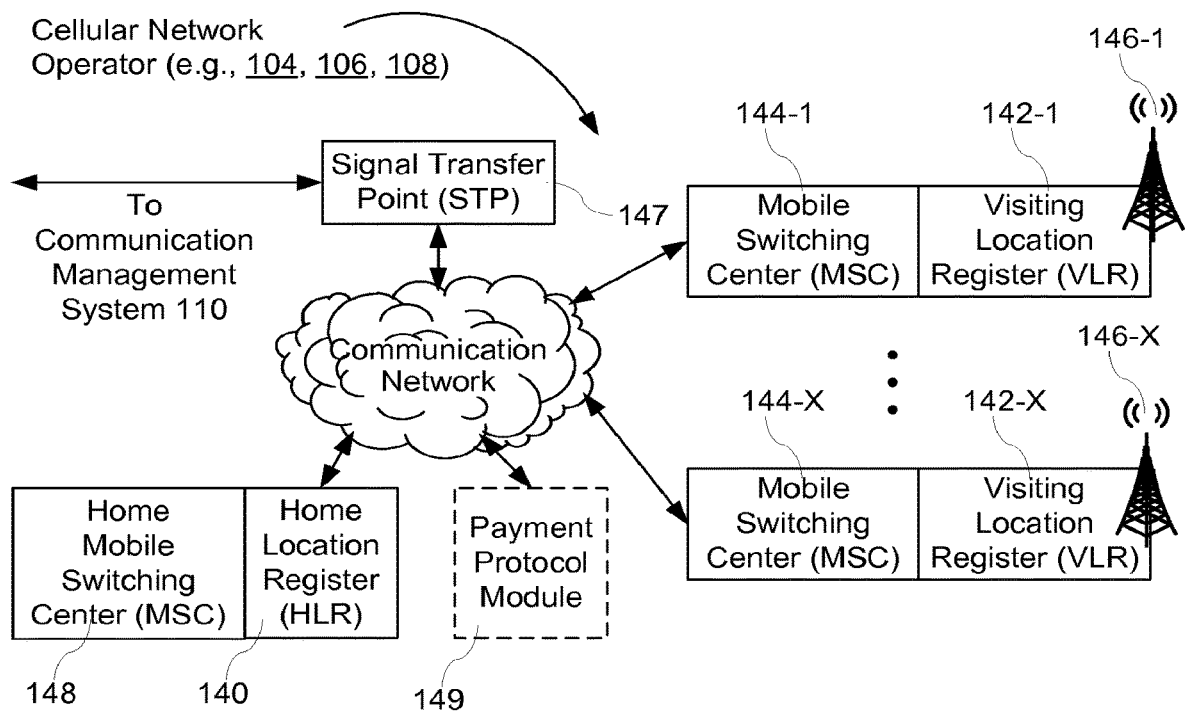
FIG. 1B is a block diagram illustrating an overview of a typical cellular network operator in accordance with some embodiments.

Attention is now directed towards FIG. 1B, which illustrates a typical (generic) cellular network operator (e.g., home cellular network operator 104, global cellular network operator 106 and/or local cellular network operator 108) with which the communication management system 110 interacts. For example, a cellular network operator typically has a local home location register 140 (HLR) and a plurality of visiting location register 142 (VLR)/mobile switching center 144 (MSC) pairs, which are typically associated with a cellular tower 146 (also called a "cellular node" herein). When a mobile device 102 is connected with the cellular network operator, the HLR 140 of the cellular network operator records the IMSI of the mobile device 102, the MSISDN of the mobile device 102 and the VLR (e.g., 142-1) with which the mobile device 102 is currently registered. When the mobile device 102 moves to a new service location (e.g., moving from a first cellular tower 146-1 to a new cellular tower 146-X) within the service area of the cellular network operator that is serviced by a new VLR, the new VLR creates a temporary record for the mobile device 102 and informs the HLR that the mobile device 102 is registered with the new VLR. Communications from the cellular network operator are transmitted to and from the communication management system 110 (and other cellular network operators) through a signal transfer point 147 (STP). In some embodiments, the cellular network operator includes a payment protocol module 149 for managing payments to prepaid accounts using a payment protocol that is specific to the cellular network operator.

In accordance with these embodiments, communications for a mobile device 102 are typically routed to a home MSC 148 for the mobile device 102. A call is received for the mobile device 102 (e.g., from an MSC that is associated with an initiating phone), the HLR 140 of the cellular network operator receives a query for routing information to the mobile device 102 from the home MSC 148 of the mobile device 102, and in response to the query, the HLR 140 of the cellular network operator maps the MSISDN to the IMSI and retrieves the current information for the mobile device 102 (e.g., the current VLR 142 at which the mobile device 102 is currently registered). The HLR 140 of the cellular network operator then queries the VLR 142 that is currently associated with the mobile device 102 for routing information. The VLR 142 determines a Mobile Station Roaming Number (MSRN) (e.g., routing information) for the mobile device 102. The MSRN is essentially an ISDN telephone number at which the subscriber can currently be reached. In some embodiments, MSRN is a temporary number that is valid only for the duration of a single call. The HLR 140 of the cellular network operator generates a response message, which includes the MSRN, and sends it back across to the source of the request (e.g., to the MSC that is associated with the initiating phone). Finally, the source of the request attempts to complete the call using the MSRN of the mobile device 102. Various ones of these modules and/or functions performed by these modules are replaced and/or augmented by the communication management system 110 described in greater detail herein.

Figure 1C:
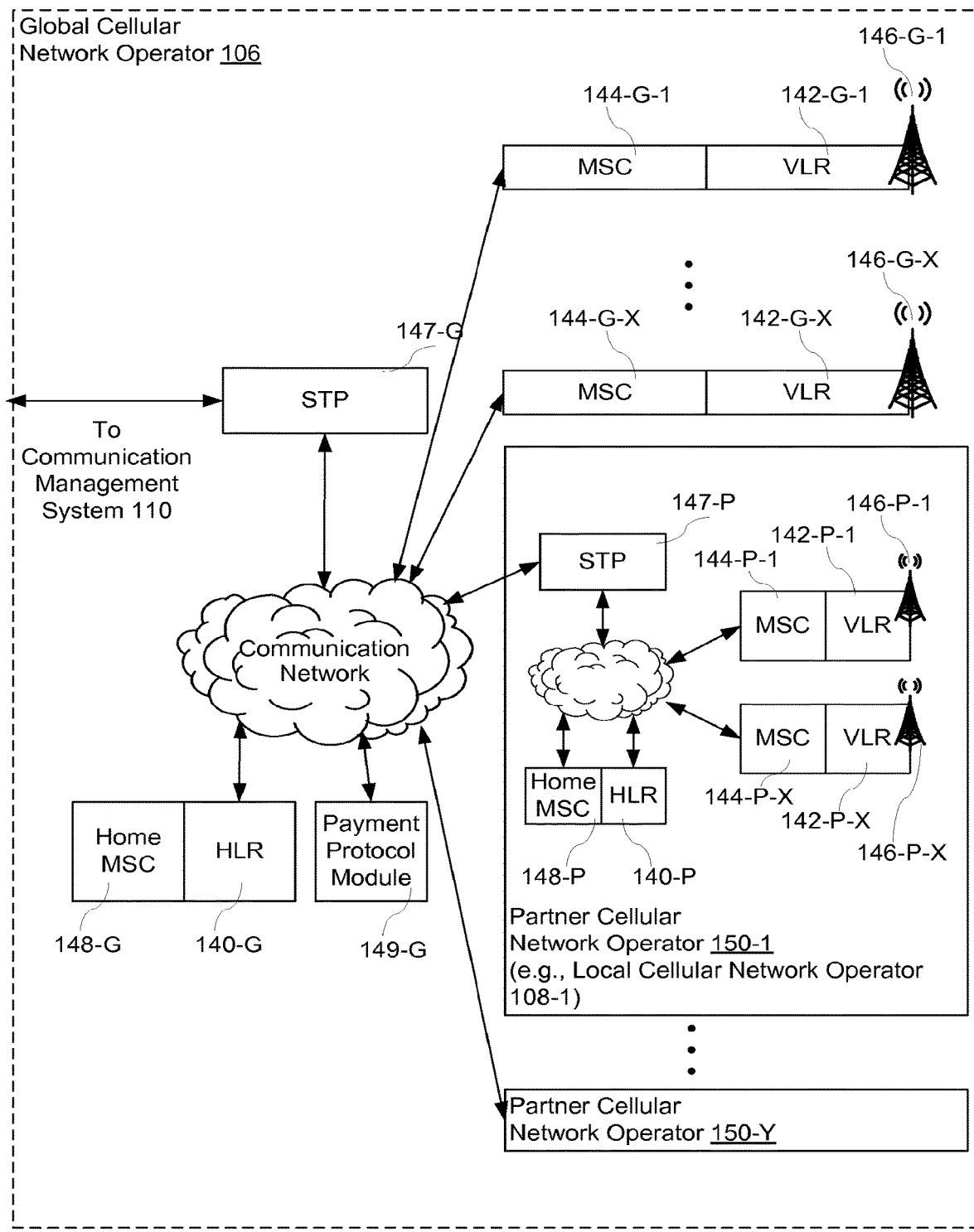
FIG. 1C is a block diagram illustrating an overview of a global cellular network operator in accordance with some embodiments.

Attention is now directed towards FIG. 1C, which illustrates an overview of a global cellular network operator 106 in accordance with some embodiments. A global cellular network operator 106 has a larger cellular signal service area (e.g., greater cellular network coverage) than the cellular signal service area of any of the local cellular network operators 108, as discussed above. In some embodiments the global cellular network operator 106 directly controls a primary communication network (e.g., with a home location register 140-G, a home mobile switching center 148-G, one or more visiting location register 142-G/mobile switching center 144-G pairs coupled to cellular towers 146-G, a signal transfer point 147-G and a payment protocol module 149-G, which are used in an analogous fashion to the similarly named modules described above for a generic cellular network operator). In some embodiments the global cellular network operator merely has more cellular towers 146-G than any of the local cellular network operators 108 and thus the global cellular network operator 106 has a larger service area.

However, in some embodiments, the global communication network 106 has negotiated roaming agreements with one or more partner cellular network operators 150, which may include some or all of the local cellular network operators 108 described above and/or additional partner cellular network operators (e.g., cellular network operators with which the communication management system 110 does not have any relationship). In other words, while some of the partner cellular network operators may be the same as the local cellular network operators 108 described above, typically the global cellular network operator 106 will have roaming agreements with additional partner local cellular network operators 150 that are distinct from the local cellular network operators 108. The partner cellular network operators 150 typically have all of the same modules as the generic cellular network operator described above (e.g., a home location register 140-P, a home mobile switching center 148-P, one or more visiting location register 142-P/mobile switching center 144-P pairs coupled to cellular towers 146-P, and a signal transfer point 147-P which are used in an analogous fashion to the similarly named modules described above for a generic cellular network operator). In some embodiments, messages for mobile devices registered with the global cellular network operator 106 that are roaming in a partner cellular network operator 150 are forwarded to the global cellular network operator 106 for processing in accordance with the roaming agreements between the global cellular network operator 106 and the partner cellular network operator 150.

Frequently, the global cellular network operator 106 charges higher fees for a call than the partner cellular network operator 150 would charge for the call if the call were placed by the mobile device 102 directly through the partner cellular network operator 150. Moreover, typically, the global cellular network operator 106 also charges higher fees for connecting a call in a geographic location than a local cellular network operator 108 would charge for the call if the call were placed by the mobile device 102 directly through the local cellular network operator 108. Thus, by performing the operations described herein to switch the mobile device 102 from a connection with the global cellular network operator 106 to a connection with one of the local cellular network operators 108, calls to and from the mobile device 102 can be connected as local phone calls and thus be connected at lower rates than phone calls connected directly through the global cellular network operator 106, thereby saving money for the subscriber.

Figure 1D:
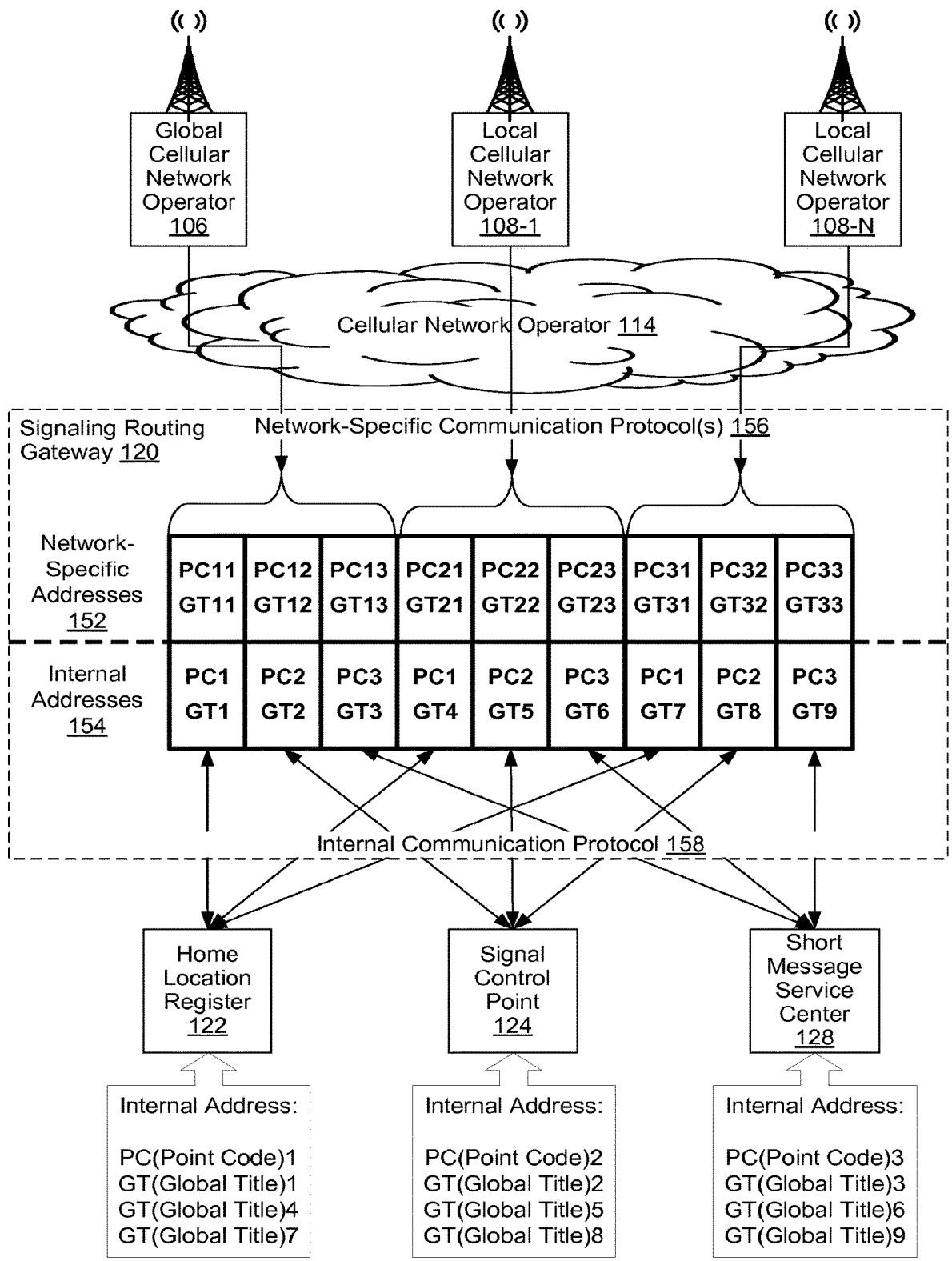
FIG. 1D is a block diagram illustrating the operation of a signal routing gateway for routing communications between multiple cellular network operators and server modules within a communication management system, in accordance with some embodiments.

Attention is now directed towards FIG. 1D, which illustrates a detailed overview of a signal routing gateway (e.g., 120 in FIG. 1A) for routing messages from one or more different cellular network operators (e.g., home cellular network operator 104, global cellular network operator 106, and local cellular network operator 108) to modules (e.g., HLR 122, SCP 124 and/or SMSC 128) within the communication management system 110. In some embodiments, each cellular network operator assigns a network-specific address 152 (e.g., a point code (PC) or a global title (GT)) to one or more of the server modules (e.g., HLR 122, SCP 124 and/or SMSC 128) within the communication management system 110. For each cellular network operator, the network-specific addresses are part of a network-specific addressing scheme that the cellular network operator uses to communicate between components of that cellular network operator. By using the network-specific addresses a cellular network operator can natively communicate with server modules within the communication management system 110. In some embodiments, the signal routing gateway 102 translates the network-specific addresses of multiple independent local cellular network operators into internal addresses and vice versa. This address translation performed at the signal routing gateway 120 allows multiple respective cellular network operators to each send requests to the modules (e.g., HLR 122, SCP 124 and/or SMSC 128) within the communication management system 110 as though the server modules were a native part of each of respective cellular network operators.

The signal routing gateway 120 stores relation information that allows the signal routing gateway 120 to map network-specific addresses 152 to internal addresses 154, and translates a message by replacing the network-specific address 152 (e.g., PC11, GT11) with a internal address 154 (e.g., an internal hardware address such as PC1) and optionally an internal communication address (e.g., internal communication address GT1). In some embodiments, the signal routing gateway 120 also translates the messages from network-specific communication protocols 156 (e.g., an American National Standards Institute (ANSI) based message or an International Telecommunications Union (ITU) based message) to a internal communication protocol 158 (e.g., an IP based SS7 telephone signaling protocols, such as SIGTRAN or TDM based SS7 signaling protocols). The signal routing gateway 120 receives a reply to the message from the server module (e.g., HLR 122, SCP 124 and/or SMSC 128) to which it was addressed, and retranslates the message by replacing the internal address 154 (e.g., PC1) for the server module with the network-specific address 152 (e.g., PC11) for the server module and transmits the reply to the requesting cellular network operator using the network-specific communication protocol 156 associated with the requesting cellular network operator. In some embodiments, one or more of the cellular network operators uses the internal addresses 154 and/or the internal communication protocol 158 of the communication management system 110, and bypass the signal routing gateway 120 entirely. An advantage of allowing each of the cellular network operators to use its own native network-specific addresses 152 and network-specific communication protocol 156 is that the cellular network operators do not need to modify their own operations to integrate with the communication management system 110. Consequently, it allows cellular network operators to easily integrate with the communication management system 110.

Figure 2:
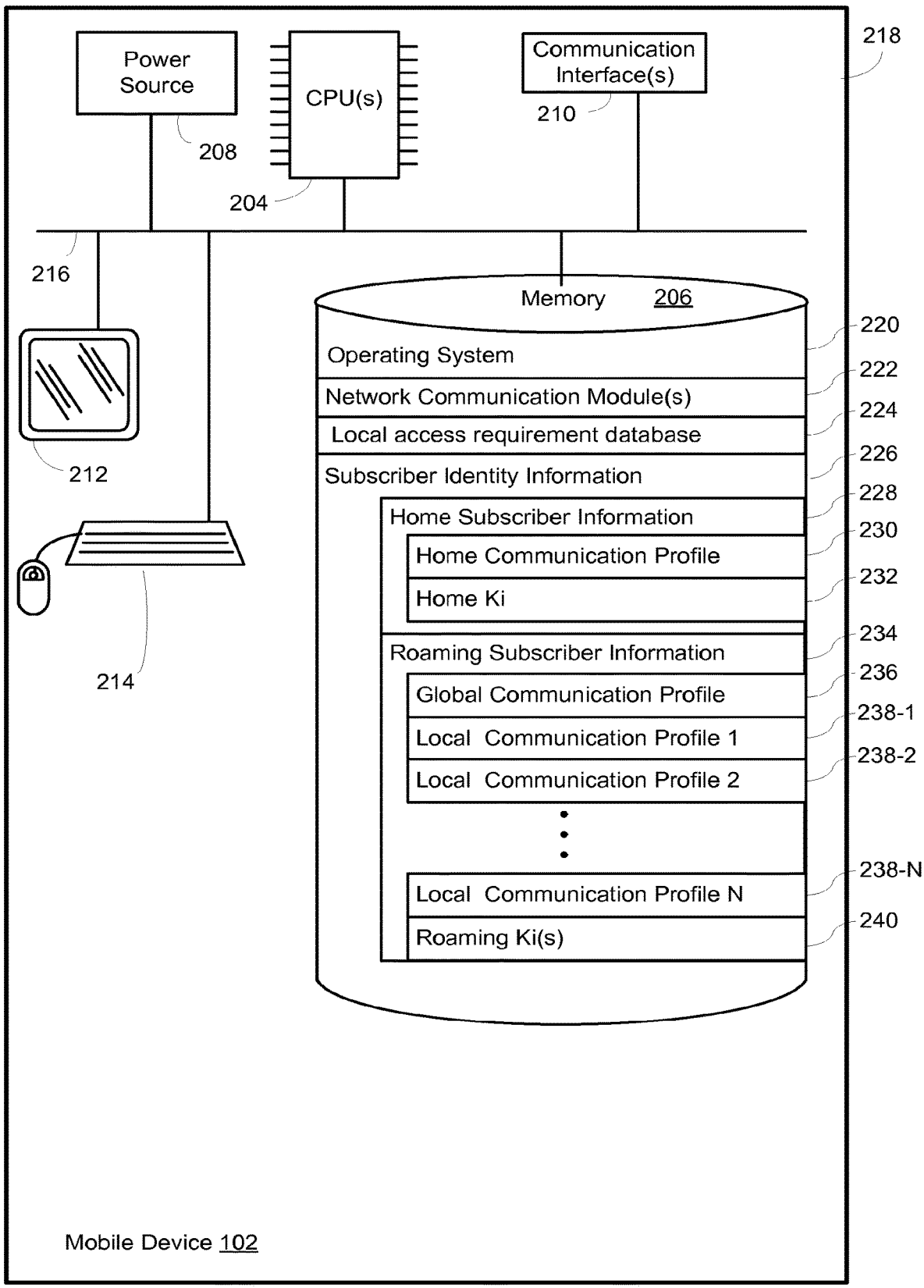
FIG. 2 is a block diagram of a mobile device, in accordance with some embodiments.

FIG. 2 is a block diagram illustrating a mobile device 102 in accordance with one embodiment. The mobile device 102 typically includes one or more processing units (e.g., CPUs) 204, one or more power sources 208, one or more network or other communications interfaces 210 (e.g., a coaxial cable port, an Ethernet port, and/or a wireless port, a GSM, CDMA, 3G, LTE or other cellular antenna), memory 206, one or more communication buses 216 for interconnecting these components, and a housing 218. The mobile device 102 optionally may include a subscriber interface such as a display device 212, a keyboard 214 a touchscreen, a touch pad, a scroll wheel, etc. The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 204. The memory 206, or alternately the non-volatile memory device(s) within memory 206, comprises a computer readable storage medium. In some embodiments, memory 206 or the computer readable storage medium of memory 206 stores the following programs, modules and data structures, or any subset thereof:

An operating system 220 that includes procedures for handling various basic system services and for performing hardware dependent tasks.

One or more network communication module(s) 222 that are used for connecting the mobile device 102 to other computers via the communication network interface(s) 210 (wired or wireless) to one or more communication networks, such as cellular phone/data networks (e.g., GSM, CDMA, 3G, LTE etc.), the Internet, other wide area networks, local area networks, metropolitan area networks, satellite links, cable networks, and so on.

A local access requirement database 224 for determining whether any of the subscriber communication profiles are suitable for accessing any currently available cellular network operators (e.g., global cellular network operator 106 and/or one of the local cellular network operators 108).

Subscriber identity information 226 for identifying the mobile device 102 to the cellular network operators. In some embodiments, the subscriber identity information 226 is stored on a SIM card that is removable from the mobile device 102. In some embodiments the subscriber identity information 226 is stored in non-removable memory of the mobile device 102. In some embodiments, the subscriber identity information 226 includes one or more of:

Home subscriber information 228 including a home communication profile 230 (e.g., an IMSI from the home cellular network operator) for identifying the mobile device 102 to the home cellular network operator (e.g., 104 in FIG. 1A) of the mobile device 120 and a home ki (e.g., an authentication key such as a private encryption key) 232 for authenticating the mobile device to the home cellular network operator; and Roaming subscriber information 234 including: a global communication profile 236 (e.g., an IMSI from the global cellular network operator) for identifying the mobile device 102 to the global cellular network operator (e.g., 106 in FIG. 1A), one or more local communication profiles (e.g., 238-1, 238-2, 238-N) (e.g., IMSIs from one of the local cellular network operators 108) for identifying the mobile device 102 to the local cellular network operators (e.g., 108-1, 108-N, etc. in FIG. 1A), and one or more roaming ki(s) (e.g., an authentication key such as a private encryption key) 240 for authenticating the mobile device 102 to the global cellular network operator(s) 106 or the local cellular network operator(s) 108. In some embodiments, the roaming subscriber information 234 is independent from the home subscriber information 228 (e.g., the home ki 232 is distinct from the roaming ki 240). In some embodiments, all of the communication profiles in the roaming subscriber information 234 are managed by (e.g., authenticated through) a single communication management system (e.g., 110 in FIG. 1A), and thus share a single common ki (e.g., roaming ki 240). In some embodiments, the global communication profile 236 is fixed and is permanently or semi-permanently maintained in memory 206 of the mobile device 102. In some embodiments, the local communication profiles are dynamic and are maintained in memory 206 of the mobile device only so long as they are actively being used and are removed from memory 206 if they are not used for more than a predetermined period of time (e.g., one month).

Each of the above identified programs, modules and/or data structures may be stored in one or more of the previously mentioned memory devices, and corresponds to a set of instructions for performing the functions described above. It should be understood that the above identified modules or programs (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above. Similarly, while the above identified memory devices are shown in a single computing device in a single housing, it should be understood that each of the modules could be implemented on more than one separate hardware devices. In particular, one or more of the items in the subscriber identity information 226 and/or the local access requirements database 224 may be stored as part of a removable subscriber identity module (SIM) card that includes one or more processors that is removable from the mobile device 102. In these embodiments, the mobile device 102 described herein refers to whatever mobile device the SIM card is inserted into. In other words, if the SIM card is moved from a first cellular phone to a second cellular phone: before the SIM card is moved, the first cellular phone is the mobile device 102 and after the SIM card is moved the second cellular phone is the mobile device 102.

Additionally, it should be understood that, in some embodiments, a mobile device 102 only reads from a single active location in the SIM card. Thus, in these embodiments, when a respective communication profile is in use by the SIM card, the respective communication profile must be stored in the active communication profile region of the SIM card. Typically, one of the communication profiles (e.g., a home communication profile) is stored in the active location of the SIM card by default. In some embodiments, when a new communication profile (e.g., a local communication profile) is moved to the active location of the SIM card, the previous communication profile (e.g., the home communication profile) is moved to (i.e., temporarily stored in) another location on the SIM card for later use.

Figure 3:
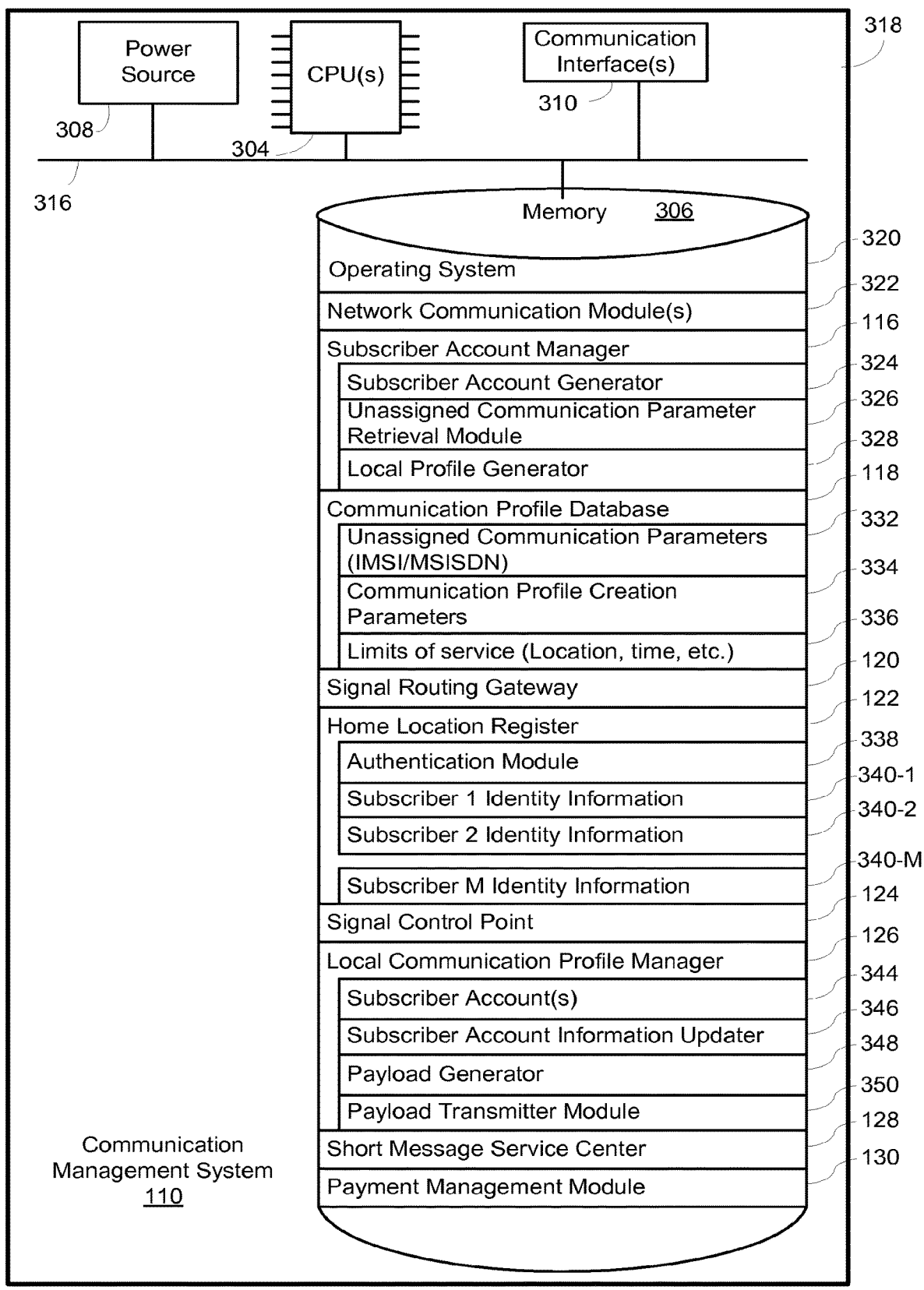
FIG. 3 is a block diagram of a communication management system, in accordance with some embodiments.

FIG. 3 is a block diagram illustrating a communication management system 110 in accordance with some embodiments. The communication management system 110 typically includes one or more processing units (CPUs) 304, one or more power sources 308, one or more network or other communications interfaces 310 (e.g., a coaxial cable port, an Ethernet port, and/or a wireless port), memory 306 and one or more communication buses 316 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 304. Memory 306, or alternately the non-volatile memory device(s) within the memory 306, comprises a computer readable storage medium. In some embodiments, memory 306 or the computer readable storage medium of the memory 306 stores one or more of the following programs, modules and data structures, or a subset thereof:

An operating system 320 that includes procedures for handling various basic system services and for performing hardware dependent tasks.

One or more network communication module(s) 322 that are used for connecting the communication management system 110 to other computers via the communication network interface(s) 310 (wired or wireless) to one or more communication networks, such as the Internet, other wide area networks, local area networks, metropolitan area networks, satellite links, cable networks, and so on.

A subscriber account manager 116 for managing subscriber accounts, including a subscriber account generator 324 for generating/modifying subscriber accounts based on subscriber input (e.g., received via a web interface); an unassigned communication parameter retrieval module 326 for retrieving communication parameters from the communication profile database 118; and a local profile generator 328 for aggregating the communication profile information needed for a subscriber account and creating a communication profile for a respective network for that subscriber account in accordance with the communication profile creation parameters 334 from the cellular network operators.

Communication profile database 118 for storing unassigned communication parameters and network preferences, including a plurality of unassigned communication parameters 332 (e.g., IMSIs, MSISDNs, etc.) provided by the cellular network operators (e.g., global cellular network operator 106 or local cellular network operators 108); communication profile creation parameters 334 from respective cellular network operators that determine how communication profiles are to be generated for each respective cellular network operator; and limits of service 336 for indicating the geographical and/or time and date limits for the unassigned communication parameters supplied to the communication management system 110 by the cellular network operators (e.g., the limits of service indicate an expiration date for a communication parameter, or a geographic area in which the communication parameter will be effective).

A signal routing gateway 120 for translating requests from the cellular network operators (e.g., global cellular network operator 106 and/or local cellular network operators) to server modules (e.g., HLR 122, SCP 124 and/or SMSC 128) within the communication management system 110 and replies from the various modules to the cellular network operators, as described in greater detail above with reference to FIG. 1B.

A home location register 122 for tracking current communication profile information for a plurality of mobile devices (e.g., 102 in FIGS. 1A, 2) registered with the communication management system 110, including an authentication module 338 for authenticating mobile devices 102 in response to requests received via the cellular network operators (e.g., global cellular network operator 106 and/or local cellular network operators 108) by providing registration information (e.g., MSISDNs) associated with the requesting network. The home location register 122 also stores subscriber identity information (e.g., 340-1, 340-2, 340-M, etc.), which, in accordance with some embodiments, includes one or more records of a current cellular network operator with which the mobile device is connected and/or a current communication profile (e.g., IMSI/MSISDN) that is being used by the device.

A signal control point 124 for controlling the mobile services for those subscribers that have pre-paid service plan (e.g., by determining whether sufficient funds are available to allow a communication to be completed).

A local communication profile manager 126 for managing local communication profiles stored on the mobile device 102 in FIG. 2. The local communication profile manager 126 includes subscriber accounts 344 (e.g., generated using information from the account manager 324) which store subscriber cellular network operator subscription preferences, and maintains information about the communication profiles that are associated with a subscriber (e.g., with the mobile device 102 of the subscriber). The local communication profile manager 126 also includes a subscriber account information updater 346 for updating account information as changes occur at the communication management system 110. For example, when a mobile device 102 is provided with a new local communication profile by the communication management system 110, the subscriber account associated with the mobile device 102 is updated to reflect the association of the new local communication profile with the subscriber account; additionally, when the mobile device 102 connects to a new cellular network operator, the subscriber account associated with the mobile device 102 is updated to reflect the current active communication profile of the mobile device 102. In accordance with some embodiments, the local communication profile manager 126 also includes a payload generator 348 for selecting new local communication profile(s) for the subscriber, as needed, and preparing a data payload, for delivery to the mobile device 102 that will, when delivered to the mobile device 102, enable the mobile device 102 to use the new local communication profile. The local communication profile manager 126 also includes a payload transmitter module 350 for transmitting the data payload with the new local communication profile to a payload transmitter server (e.g., 112 in FIG. 1A) that repackages the payload (e.g., as a data message that instructs the mobile device 102 to load the new local communication profile on the mobile device 102) and sends the payload to the mobile device 102. In some embodiments, the payload transmitter server 112 is part of the communication management system 110.

A short message service center 128 for processing outgoing messages (e.g., SMS, EMS, etc.) from mobile devices 102 that are using communication profiles that are managed by the communication management system 110 and processing incoming messages for mobile devices 102 using communication profiles that are managed by the communication management system 110.

A payment management module 130 for managing payments received by cellular network operators for mobile devices 102 that have communication profiles that are managed by the communication management system 110, and managing the transfer of funds to a central prepaid account, as necessary.

Each of the above identified programs, modules and/or data structures may be stored in one or more of the previously mentioned memory devices, and corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, the memory 306 may store a subset of the modules and data structures identified above. Furthermore, the memory 306 may store additional modules and data structures not described above. Similarly, while the above identified memory devices are shown in a single computing device, it should be understood that each of the modules could be implemented on a separate hardware device (e.g., as one or more distinct computer servers) in some embodiments.

Figure 4:
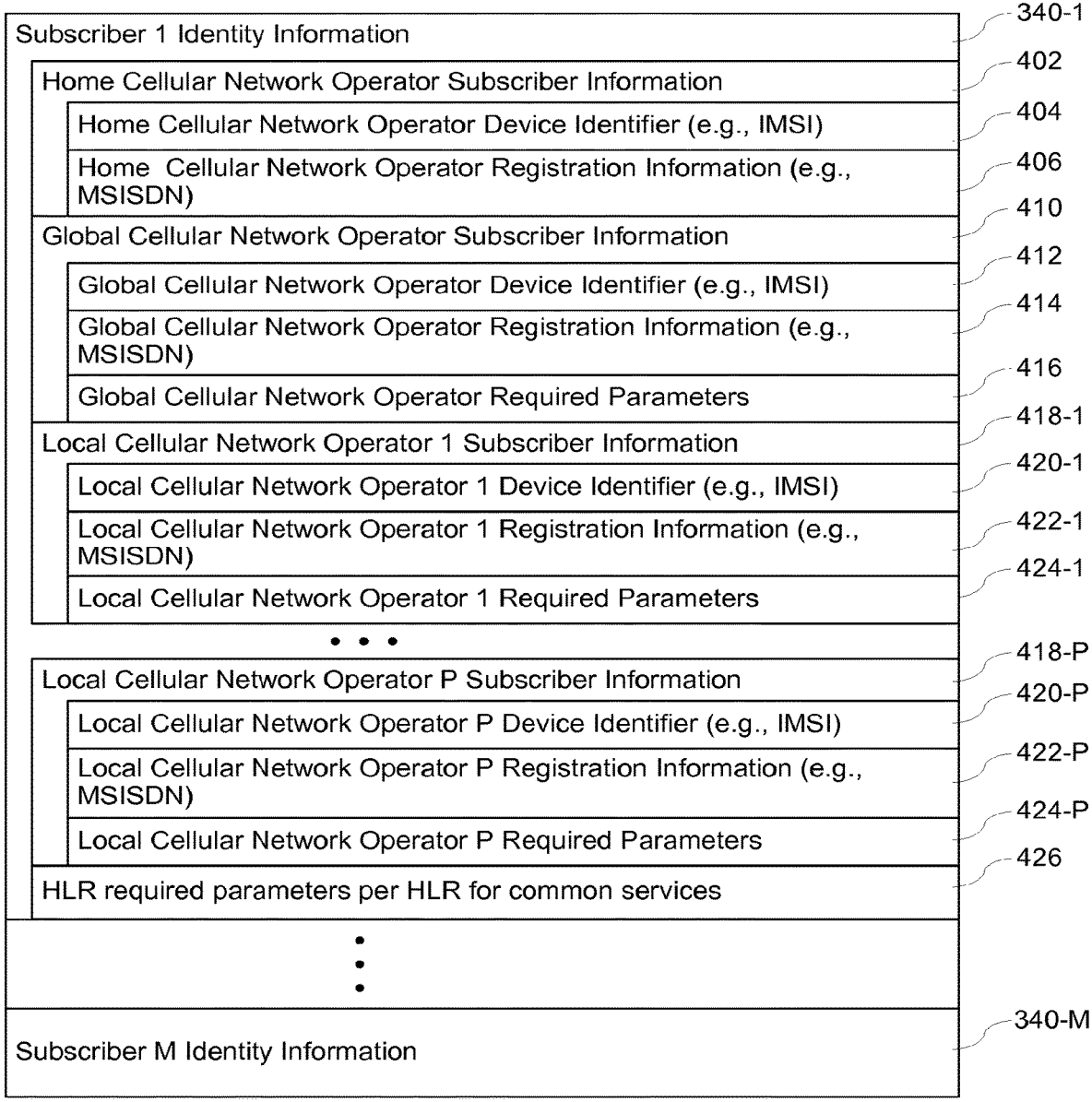
FIG. 4 is a block diagram representing a data structure for storing registration information for subscribers in accordance with some embodiments.
Figure 5A:
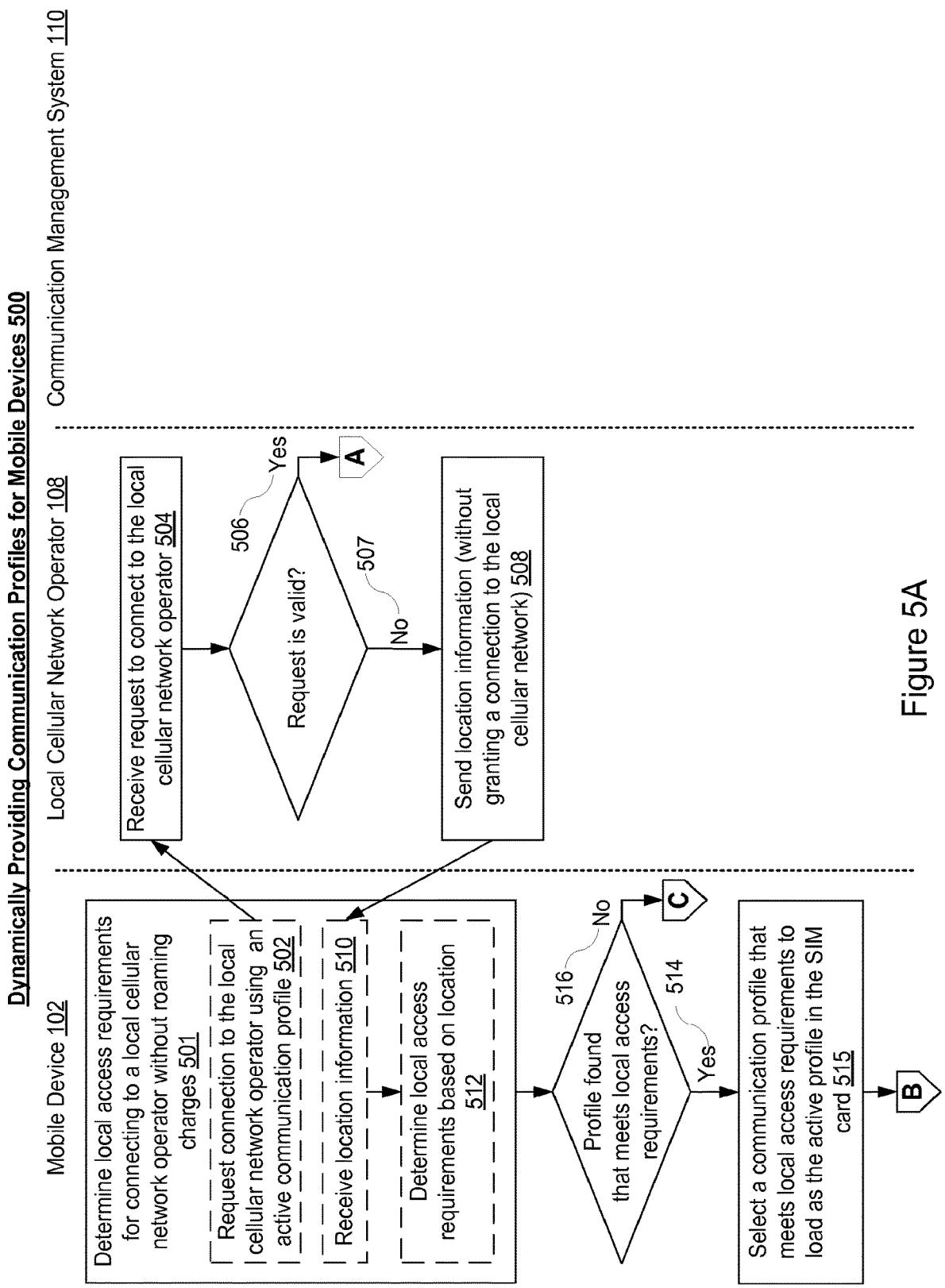
FIGS. 5A-5D are flow diagrams illustrating a process for dynamically providing communication profiles to a mobile device in accordance with some embodiments.
Figure 5B:
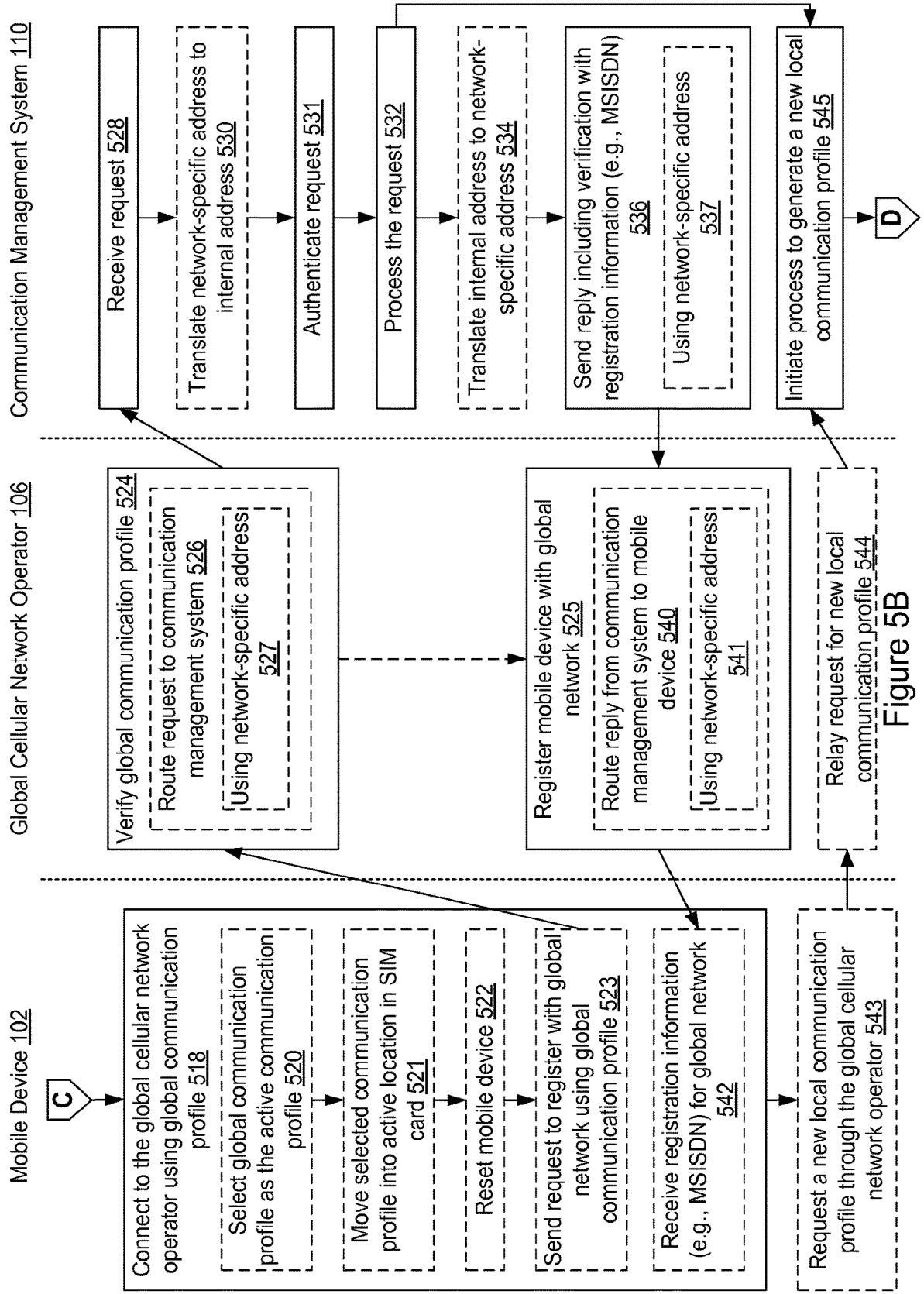
Figure 5C:
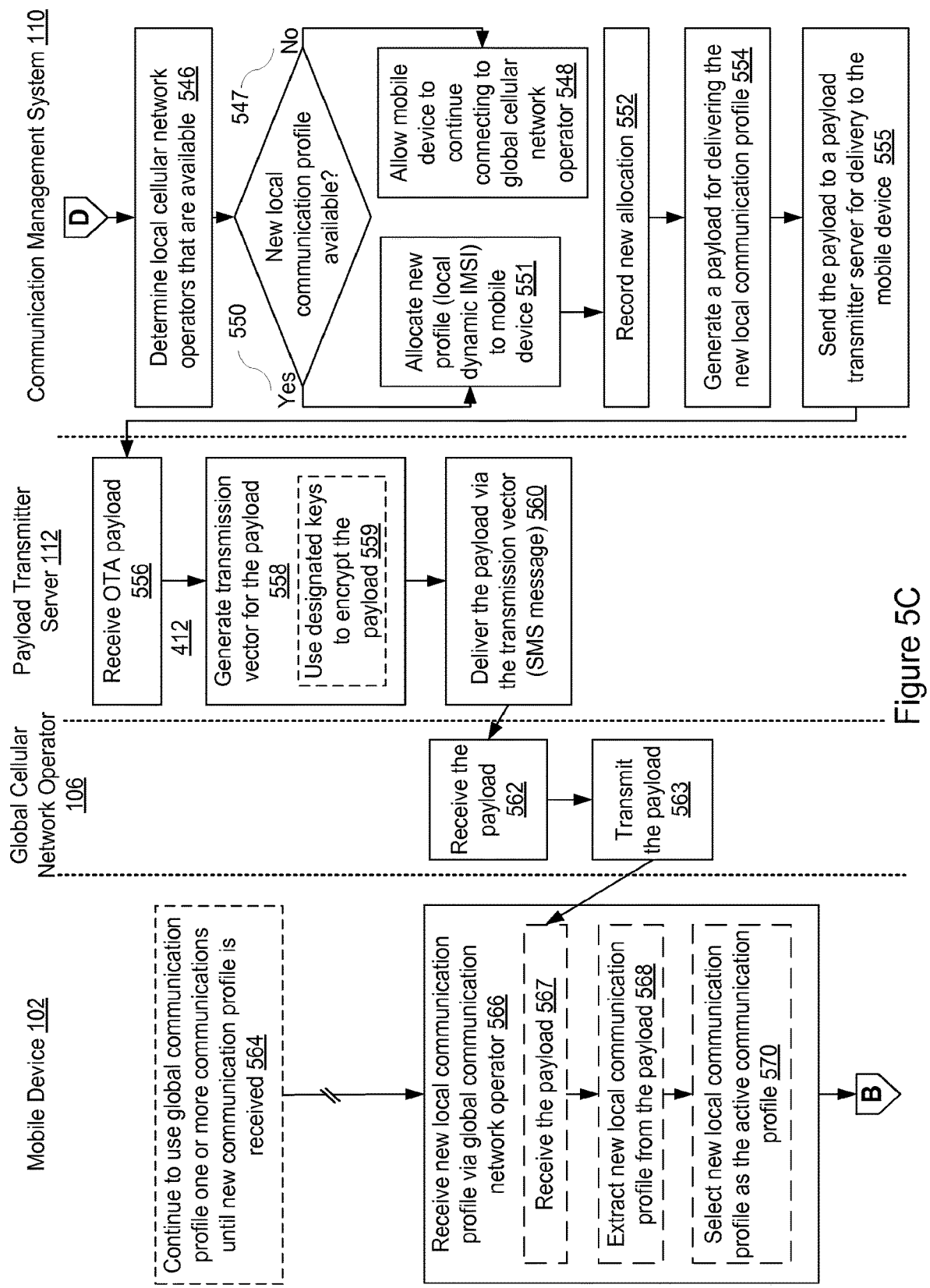
Figure 5D:
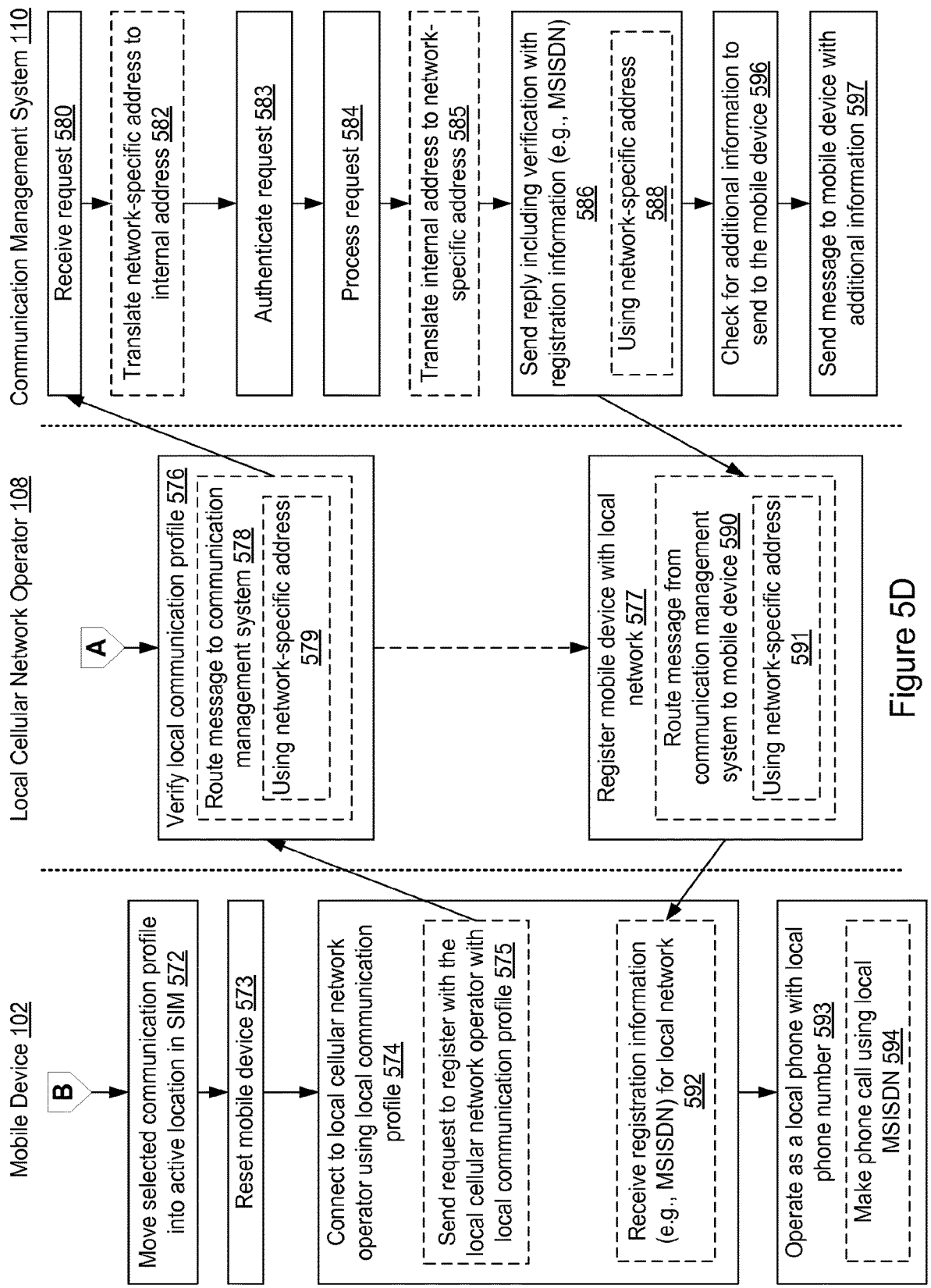

Attention is now directed towards FIG. 4, which illustrates an exemplary data structure for storing subscriber identity information 340 at the communication management system (e.g., 110 in FIGS. 1A, 3). In some embodiments, this exemplary data structure, or an analogous data structure, is stored in the HLR (e.g., 122 in FIGS. 1A, 3) of the communication management system 110. Typically, this data structure relates together all of the communication profiles for a subscriber so that messages received from the mobile device (e.g., 102 in FIGS. 1A, 2) are associated with the subscriber and so that messages received at the communication management system 110 for the subscriber can be forwarded to the mobile device 102 even when the mobile device 102 switches from being connected with a first cellular network operator to being connected with a second cellular network operator. In other words, even though typically, only a single communication profile is active at the mobile device 102 at any given time, multiple communication profiles for the mobile device 102 can be actively monitored at the communication management system 110, and communications using one of the communication profiles that is associated with the mobile device 102, but is not actively in use by the mobile device 102, can be received at the communication management system 110, and subsequently forwarded to the mobile device 102, as described in greater detail below. The stored subscriber identity information 340 relates the various communication profiles associated with the subscriber (e.g., the mobile device/SIM card of the subscriber), thereby enabling the communication management system 110 to forward messages for the subscriber to the mobile device 102, as necessary.

The subscriber identity information for a respective subscriber (e.g., Subscriber 1 Identity information 340-1) includes device identifiers (e.g., IMSIs) and registration information (e.g., MSISDNs) for a plurality of different cellular network operators that are associated with the subscriber. The subscriber identity information includes home cellular network operator subscriber information 402, including communication parameters such as: a home cellular network operator device identifier (e.g., IMSI) 404 and home cellular network operator registration information (e.g., MSISDN) 406. It should be understood that the home MSISDN of a subscriber is more commonly known as a primary phone number of the subscriber.

The subscriber information also includes global cellular network operator subscriber information 410, including communication parameters such as: a global cellular network operator device identifier (e.g., IMSI) 412, a global cellular network operator registration (e.g., MSISDN), which is either preassigned or selected by the communication management system 110, as needed, and any global cellular network operator parameters 416 that indicate access requirements or limitations for the global cellular network operator (e.g., 106 in FIG. 1A). The subscriber information also includes local cellular network operator subscriber information (e.g., 418-1, 418-P, etc.) for one or more local cellular network operators 108; the local cellular network operator information for each local cellular network operator 108 includes communication parameters such as: a local cellular network operator device identifier (e.g., IMSI) (e.g., 420-1, 420-P, etc.); a local cellular network operator registration information (e.g., MSISDN) (e.g., 422-1m 422-P, etc.) that is selected by the communication management system 110, as needed; and any local cellular network operator parameters (e.g., 424-1, 424-P, etc.) that indicate access requirements or limitations for the local cellular network operator 108.

In some embodiments, one or more of the device identifiers (e.g., IMSIs) in the subscriber identity information is part of a communication profile that is managed by the communication management system 110. In some embodiments the device identifiers that are part of a communication profile in the home communication subscriber information 402 that is managed by a home cellular network operator while a plurality of communication profiles that use global cellular network operator subscriber information 410 and the local cellular network operator subscriber information 418 are managed by the communication management system 110. In other words, a request to register the mobile device 102 for connection to a respective cellular network operator using a home communication profile (e.g., home IMSI and/or MSISDN) will be directly routed to home cellular network operator without going through the communication management system 110 for authentication, while a request to register the mobile device for connection to a respective cellular network operator using a global communication profile (e.g., global IMSI and/or MSISDN) or a local communication profile (e.g., local IMSI and/or MSISDN) is relayed from the respective cellular network operator to the communication management system 110 for authentication. In some of these embodiments, the subscriber identity information also includes common parameters 426 for the home location register 122 at the communication management system 110 that are common for all of the subscriber information that is managed by the communication management system 110.

In some embodiments, home subscriber information that is managed by a home cellular network operator is provided to the communication management system and is stored as home subscriber information 402 in the subscriber identity information 340 at the communication management system, 110. It should be understood that the home subscriber information is not typically modified by the communication management system 110. In some embodiments, the global subscriber information 410 is managed by the communication management system 110 and is static (e.g., while the global subscriber information can be modified by the communication management system 110, it is typically not modified, so that the mobile device 102 can always use the global subscriber information to access the communication management system 110). In some embodiments, the local subscriber information 420 is dynamic subscriber information which is managed by the communication management system 110 and is modified at the mobile device 102 and at the communication management system 110 to match the cellular network operator access requirements of the mobile device 102 (e.g., by adding subscriber information when the mobile device 102 needs to connect to a new cellular network operator and/or removing subscriber information when the mobile device 102 has not connected to one of the local cellular network operators 108 for more than a predetermined period of time, such as one month).

For example, typically, when a subscriber purchases a SIM card, phone or service plan, in accordance with some embodiments, the SIM card is pre-provisioned with home cellular network operator IMSI 404 and home cellular network operator MSISDN 406 as a primary communication profile and global cellular network operator IMSI 412 and (optionally) a global cellular network operator MSISDN 416 as a first alternative communication profile. When a subscriber first accesses the HLR 122 of the communication management system 110 using the global cellular network operator IMSI 412, the HLR 122 notifies the local communication profile manager (e.g., 126 in FIG. 3) of this event and a location of the mobile device 102. The local communication profile manager 126 checks the subscriber identity information (e.g., 340-1 for the subscriber) to determine which local communication profiles 418 have already been sent to the mobile device 102, and determines if another local communication profile (e.g., a local IMSI) is needed in order for the mobile device 102 to connect to a local cellular network operator 108 at the current location of the mobile device 102. If another local communication profile is needed, the new local communication profile is sent to the mobile device 102 as described in greater detail below, and additional local cellular network operator subscriber information is added to the subscriber identity information (e.g., 340-1) for the subscriber associated with the mobile device 102.

Attention is now directed towards FIGS. 5A-5D, which illustrate a process 500 for dynamically providing communication profiles to a mobile device (e.g., 102 in FIGS. 1A, 2). The mobile device 102 stores a plurality of communication profiles comprising one or more local communication profiles (e.g., one of the local communication profiles 238 in FIG. 2) and a global communication profile (e.g., 236 in FIG. 2). In some embodiments, the mobile device 102 also stores a home communication profile (e.g., 230 in FIG. 2). In some embodiments the communication profiles are stored in a SIM card in the mobile device 102. In some embodiments, a communication profile includes an IMSI. In some embodiments a communication profile includes a MSISDN. In some embodiments, the global communication profile (e.g., 236 in FIG. 2) and the new local communication profile are managed by a communication management system (e.g., 110 in FIGS. 1A, 3). It should be understood that, in accordance with some embodiments, the mobile device 102 initially only has a global communication profile (e.g., 236 in FIG. 2) and a home communication profile (e.g., 230 in FIG. 2), and one or more local communication profiles are only stored on the mobile device 102 after they have been provided to the mobile device 102 as described in greater detail below.

The mobile device 102 determines (501) local access requirements for connecting to an available local cellular network operator 108 without roaming charges (e.g., using a local access requirement database 224 in FIG. 2). In some embodiments, determining the local access requirements includes requesting (502) connection to the available local cellular network operator 108 using a respective local communication profile. In some embodiments, the respective local communication profile is a "last used" communication profile that was last used by the mobile device 102 to connect to a cellular network operator. In some embodiments, the respective local communication profile is a currently active communication profile that is loaded in an active region of a SIM card of the mobile device 102. For example, if the mobile device 102 was previously located in China and used a first communication profile to connect to cellular network operator in China (e.g., CHINAMOBILE) and the mobile device 102 is transported to India, the mobile device 102 first attempts to connect to a local cellular network operator 108 (e.g., AIRTEL) in India using the first communication profile that was used to connect to the cellular network operator in China. Typically, this attempt will fail unless the previous cellular network operator (e.g., CHINAMOBILE) has a roaming agreement with the local cellular network operator 108 (e.g., AIRTEL).

The local cellular network operator 108 receives (504) the request to connect to the local cellular network operator 108 and determines whether the request is valid (e.g., whether the communication profile used by the mobile device 102 to connect to the local cellular network operator 108 is a valid communication profile for the local cellular network operator 108). If the request is valid (506), the local cellular network operator 108 verifies the local communication profile, if necessary, or simply registers the mobile device 102 with the local cellular network operator 108, as described in greater detail below with reference to operations 576-594. In other words, if the mobile device 102 is currently using a local communication profile that is recognized by the local communication network operator, then the mobile device 102 will be able to communicate (e.g., send/receive phone calls, messages and/or data) over the local cellular network that is controlled by the local cellular network operator 108. Continuing the example above, if CHINAMOBILE is also available in India, then the mobile device 102 will continue to use CHINAMOBILE while in India. It should be understood that, in some embodiments, even if CHINAMOBILE has a roaming agreement with AIRTEL, it is advantageous to switch to an AIRTEL communication profile so as to enable the mobile device to communicate as a local device on the AIRTEL network, as described in greater detail below.

If the request is not valid (507), the local cellular network operator 108 sends (508) location information to the mobile device 102 without granting the mobile device 102 a connection to the local cellular network operator 108. In other words, in some embodiments, when a cellular tower receives a request for access from a mobile device 102 the cellular tower sends back information that is sufficient for the mobile device 102 to determine a location of the cellular tower and/or an identity of the local cellular network operator 108 (e.g., a mobile country code or a mobile network code). In response to the request, in some embodiments, the mobile device 102 receives (510) information that identifies a location of the mobile device 102 without being connected to the local cellular network operator 108. Continuing the example described above, if the local cellular network operator 108 (e.g., AIRTEL) in India is different from the local cellular network operator 108 (e.g., CHINAMOBILE) in China, then the local cellular network operator 108 (e.g., AIRTEL) in India will provide the mobile device 102 with information indicating that the mobile device 102 is in India (e.g., either by providing explicit location information or by providing an identifier of the local cellular network operator 108).

Alternatively, in some embodiments, the mobile device 102 independently determines a location of the mobile device 102 (e.g., by using a global positioning system receiver to receive satellite positioning signals and determining a current position of the mobile device 102 based on those signals). In some embodiments, the mobile device 102 determines (512) the local access requirements of the local cellular network operator 108 based on the location of the mobile device 102 (e.g., a location that is indicated by the communication from the local cellular network operator 108).

Based on the local access requirements, the mobile device 102 determines whether the plurality of communication profiles include a local communication profile that satisfies the local access requirements. In some embodiments, determining whether the plurality of communication profiles include a local communication profile that satisfies the local access requirements includes searching the plurality communication profiles for a local communication profile that satisfies the local access requirements. In some embodiments, the search comprises comparing one or more of the communication profiles to an identifier of the local cellular network operator 108 to identify a communication profile associated with the local cellular network operator 108. Continuing the example described above, once the mobile device 102 has determined that the communication profile associated with CHINAMOBILE cannot be used to connect to the local cellular network operator 108 in India (e.g., AIRTEL), the mobile device 102 searches within its memory (e.g., within a set of communication profiles stored in a SIM card) for a communication profile that matches the local access requirements (e.g., a communication profile that can be used to connect the mobile device to the AIRTEL cellular network operator).

If one or more communication profiles are found (514) that meet the local access requirements, then the mobile device 102 selects (515) one of the communication profiles that meets the local access requirements to load as an active profile in the SIM card. The communication profile is subsequently loaded as an active communication profile and thereafter used to connect to the local communication network operator, as described in greater detail below with reference to operations 572-594. In other words, when the plurality of communication profiles stored in the mobile device 102 include a respective local communication profile that satisfies the local access requirements, the mobile device 102 connects to the local cellular network operator 108 using the respective local communication profile. Continuing the example described above, the mobile device 102 identifies a communication profile for the AIRTEL cellular network operator and connects to the AIRTEL cellular network.

If no communication profiles are found (516) that meet the local access requirements, then the mobile device 102 retrieves a local communication profile from a communication management system 110, as described in greater detail below with reference to operations 518-542. In other words, operations 518-542 are performed when the plurality of communication profiles does not include a local communication profile that satisfies the local access requirements.

The mobile device 102 connects (518) to the global cellular network operator 106 using a global communication profile. In some embodiments, the mobile device 102 selects (520) a global communication profile that is associated with a global cellular network operator as an active communication profile. In some embodiments the selected communication profile is moved (521) into an active location in the SIM card. It should be understood that, in some embodiments, there is only a single active location in the SIM card (e.g., a location from which the mobile device 102 acquires communication profile information when attempting to connect to a cellular network operator). In some of these embodiments, when the selected communication profile is moved into the active location in the SIM card, the previously active SIM profile is moved to a temporary storage location for later use. Continuing the example described above, when no communication profile exists for AIRTEL, a global communication profile for a global network operator (e.g., AT&T) that has roaming agreements with cellular network operators in many countries (including India) is moved into the active location in the SIM card and the CHINAMOBILE communication profile is moved to another location (e.g., a temporary storage location) on the SIM card.

In some embodiments, the mobile device 102 is reset (522) so that the mobile device 102 begins using the global communication profile. In some embodiments, the mobile device 102 sends (523), to the global cellular network operator 106, a request to connect to the global cellular network operator (e.g., a request to connect to a local partner cellular network operator of the global cellular network operator) using the global communication profile. In some embodiments, the request is transmitted first to a partner cellular network operator (e.g., a cellular network operator with which the global cellular network operator has roaming agreements) and is subsequently forwarded to the global cellular network operator 106 by the partner cellular network operator, as described in greater detail above with reference to FIG. 1C.

After receiving the request from the mobile device 102, the global cellular network operator 106 verifies (524) the global communication profile. In some embodiments (e.g., when the global cellular network operator manages the global communication profile) the global cellular network operator handles the verification of the global communication profile at the global cellular network operator, and registers (525) the mobile device 102 with the global cellular network operator 106 without involving a separate communication management system 110. In other embodiments (e.g., where a communication management system 110 manages the global communication profile), the global cellular network operator 106 routes (526) the request from the mobile device 102 to a communication management system 110. In some embodiments, the request is routed to the communication management system 110 using (527) a network-specific address that is specific to the global cellular network operator 106, as described in greater detail below with reference to FIGS. 6A-6B.

In accordance with some embodiments, the communication management system 110 receives (528), from the global cellular network operator 106, a request to connect the mobile device 102 to the global cellular network operator 106 using a global communication profile. In other words, the communication management system 110 receives a forwarded communication from the mobile device 102 that indicates that the mobile device 102 is attempting to connect to the global cellular network operator 106 using the global communication profile. Continuing the example described above, when the subscriber enters India, the mobile device is unable to connect to any cellular network operator using the CHINAMOBILE communication profile and thus uses an AT&T communication profile to establish a connection to a cellular network operator (e.g., AT&T), where AT&T provides coverage in India as well as many other countries that may be visited by the subscriber. In some embodiments, the request also indicates the location (e.g., India) of the mobile device 102 (e.g., by including a mobile country code or a mobile network code). In some embodiments, the communication management system 110 or a signal routing gateway (e.g., 120 in FIG. 3) within the communication management system 110 translates (530) the network-specific address associated with the request into an internal address for the server module that is associated with the network-specific address.

In some embodiments, the request is generated with the global communication profile (e.g., an IMSI) and an authentication key (e.g., a Ki) (e.g., by using the Ki and the IMSI to generate a random number required by GSM authentication mechanisms). The communication management system 110 or an authentication module (e.g., 338 in FIG. 3) within the communication management system 110 authenticates (531) the request using the same authentication key (e.g., the Ki). It should be understood that both the mobile device 102 and the communication management system 110 have distinct copies of the same authentication key (e.g., so as to enable encryption and decryption of messages between the mobile device 102 and the communication management system 110 using the Ki as a private key to generate other keys or random numbers). If the request cannot be authenticated, then the request is rejected and the process ends. When the request is properly authenticated, then the communication management system 110 proceeds to process (532) the request. In some embodiments, processing the request includes retrieving registration information (e.g., an MSISDN) that is associated with the global cellular network operator 106 (e.g., a global communication profile such as the global IMSI) and preparing to deliver the registration information to the mobile device 102. For example, the home location register (e.g., 122 in FIG. 3) looks through subscriber identity information (e.g., 340 in FIGS. 3-4) and identifies, based on the global communication profile (e.g., the IMSI used by the mobile device 102) registration information (e.g., an MSISDN) that matches the global communication profile. In some embodiments processing the request also includes automatically preparing a new local communication profile for the mobile device 102 as discussed in greater detail below with reference to operations 545-567.

The server module (e.g., HLR 122 in FIG. 3) prepares to send a reply to the mobile device 102, the reply including the registration information. In some embodiments, the communication management system 110 or a signal routing gateway (e.g., 120 in FIG. 3) within the communication management system 110 translates (534) the reply by replacing an internal address for the server module (e.g., home location register 122 in FIG. 3) with the network-specific address for the server module (e.g., home location register 122 in FIG. 3) that was used to address the original request, as described in greater detail below with reference to FIGS. 6A-6B.

The communication management system 110 sends (536) the reply, including verification of the registration request and registration information (e.g., an MSISDN), to the global cellular network operator 106 for delivery to the mobile device 102. In some embodiments, the reply is addressed using (537) a network-specific address for the server module (e.g., the reply appears to be sent from a server module that has the same network-specific address that was used to address the original request). In other words, in some embodiments, the global cellular network operator 106 is completely unaware of the existence of the internal address for the server module (e.g., HLR 122 in FIG. 3). In some embodiments, after receiving the reply from the communication management system 110, the global cellular network operator 106 registers (525) the mobile device 102 with the global cellular network operator 106 by routing (540) the reply from the communication management system 110 to the mobile device 102. In some embodiments, the reply uses (541) the network-specific address for the server module. The mobile device 102 receives (542) the registration information (e.g., an MSISDN) for the global cellular network operator 106 and is thereby enabled to connect to the global cellular network operator as a registered mobile device 102. Continuing the example described above, the mobile device 102 can now make and receive phone calls, make and receive SMS/EMS/MMS messages and/or send and receive data over the AT&T network using the AT&T communication profile, and the mobile device has a phone number associated with the AT&T network.

In some embodiments, after being connected to the global cellular network operator 106 as a registered mobile device 102, the mobile device 102 makes/receives one or more phone calls, sends/receives one or more SMS/EMS/MMS messages and/or sends/receives data using the global communication profile. In other words, once the mobile device 102 is connected with the global cellular network operator 106, the mobile device 102 is capable of performing all of the standard communication functions of a cellular phone.

In some embodiments, the mobile device 102 requests (543) a new local communication profile through the global cellular network operator 106. In other words, in some embodiments, the mobile device 102 determines (e.g., based on the mobile country code or mobile network code of one or more nearby cellular towers) that a new local communication profile is necessary to connect to the local cellular network operators 108 and sends this information to the communication management system 110 via the global cellular network operator 106 using the active and registered global communication profile. When the global cellular network operator 106 receives the request for the new local communication profile, the global cellular network operator 106 relays (544) the request for the new local communication profile to the communication management system 110. Continuing the example above, the mobile device 102 sends a request to the communication management system 110 using the global AT&T communication profile, where the request is for an AIRTEL communication profile for connecting with the AIRTEL local cellular network operator 108 in India.

In other words, in accordance with some embodiments the communication management system 110 receives an explicit request for a new local communication profile from the mobile device 102 after the mobile device 102 is connected to the global cellular network operator 106 using the global communication profile; while in accordance with other embodiments, the communication management system 110 receives an implicit request for a new local communication profile when registration with the global communication network operator is requested (thereby indicating that the mobile device 102 does not have a local communication profile that is valid for any of the available local cellular network operators 108). In either case, the communication management system 110 initiates (545) a process to generate a new local communication profile for the mobile device 102. For example, the communication management system 110 sends identification information for the mobile device 102 (e.g., a current global communication profile of the mobile device 102) and information about the location of the mobile device 102 (e.g., a mobile country code or a mobile network code) that indicates which communication profile(s) are needed by the mobile device 102 (e.g., which local cellular network operators are active at the location of the mobile device 102).

In accordance with some embodiments, the communication management system 110 determines (546) local cellular network operators 108 that are available at the location of the mobile device 102. In some embodiments, the communication management system 110 uses the location reported by HLR 122 (e.g., based on the communication from the VLR with which the mobile device 102 is currently attached) to identify potential local cellular network operators. The communication management system 110 determines whether any new local communication profiles are available for any of the potential local cellular networks operators. If a new local communication profile is not available (547) either because all of the local communication profiles for the potential local cellular network operator are assigned to other mobile devices 102 or because there are no potential local cellular network operators with service at the location of the mobile device 102, then the communication management system 110 may allow (548) the mobile device 102 to continue connecting to the global cellular network operator.

If one or more new local communication profiles are (550) available, the communication management system 110 or the local communication profile manager (e.g., 126 in FIG. 3) within the communication management system 110 allocates (551) one of the new local communication profiles to the mobile device 102. In some embodiments, the communication management system 110 or the local communication profile manager (e.g., 126 in FIG. 3) within the communication management system 110 records the new allocation in a server module that manages the communication profiles (e.g., HLR 122 in FIG. 3). In other words, the server module (e.g., HLR 122 in FIG. 3) within the communication management system 110 that receives requests from the mobile device 102 to connect to communication network operators and that receives requests from other devices to communicate with the mobile device 102 is provided with the most up to date subscriber identification information. Consequently, this server module (e.g., HLR 122 in FIG. 3) is enabled to: (A) authenticate requests by the mobile device 102 to connect to cellular network operators, and (B) properly route incoming communications to and from the mobile device 102.

In some embodiments, the communication management system 110 or a payload generator (e.g., 348 in FIG. 3) within the communication management system 110 generates (554) a payload for delivering the new local communication profile to the mobile device 102. The payload includes a new communication profile (e.g., a device identifier such as an IMSI and, optionally registration information such as a MSISDN) for the new communication profile. The communication management system 110 or a payload transmitter module (e.g., 350 in FIG. 3) in the communication management system 110 sends (555) the payload to a payload transmitter server (e.g., 112 in FIG. 1A) for delivery to the mobile device 102. The payload transmitter server 112 receives (556) the payload. After receiving the payload, the payload transmitter server 112 generates (558) a transmission vector (e.g., an SMS message with a data portion that contains the payload) for the payload. In other words, the payload transmitter server 112 assembles the payload received from the communication management system 110 into a format that can be delivered to the mobile device 102 and will be recognized by the SIM card. In some embodiments the payload transmitter server 112 uses keys designated by the SIM card manufacturer or the communication management system 110 to encrypt (559) the payload.

The payload transmitter server 112 delivers (560) the payload via the transmission vector. For example, when the payload is formatted as an over-the-air SMS message with a data portion containing the payload, the SMS message can be delivered via variety of delivery methods, such as by using short message peer-to-peer protocol, a short message service broker, or SS7 based delivery. It should be understood that, in accordance with some embodiments the payload transmitter server 112 is distinct from the communication management system 110. In other embodiments the payload transmitter server 112 is a part of the communication management system 110. In some embodiments the payload is delivered directly to the mobile device 102. In accordance with other embodiments, the payload is sent to the global cellular network operator 106 for delivery to the mobile device 102. In these embodiments, the global cellular network operator 106 receives (562) the payload from the global cellular network operator 106 and transmits (563) the payload to the mobile device 102 (e.g., in the form of a SMS message). In other words, in some embodiments, the communication management system 110 sends the payload to the mobile device 102 via the global cellular network operator 106, where the payload includes a local communication profile that enables the mobile device 102 to obtain access to a local cellular network operator, as described in greater detail below.

In some embodiments, after connecting to the global cellular network operator 106 and before receiving the new local communication profile (e.g., as a payload from the communication management system 110) from the communication management system 110 the mobile device 102 continues to use the global communication profile to connect to the global cellular network operator 106 to perform one or more communication operations (e.g., making/receiving phone calls, sending/receiving SMS messages, sending/receiving data, etc.).

The mobile device 102 receives (566) the new local communication profile (e.g., a communication profile that satisfies the local access requirements) via the global cellular network operator 106. It should be understood that the new local communication profile is being transmitted to the mobile device 102 using the currently active communication profile of the mobile device 102 (e.g., the global communication profile). In other words, the mobile device 102 must be connected with a cellular network operator in order to receive the new local communication profile. By connecting with the global communication profile (e.g., a communication profile for a cellular network operator that has a large service area) the mobile device 102 is very likely to be able to connect to a cellular network operator, and, thus, is also more likely to be able to receive the new local communication profile.

In some embodiments, receiving the new local communication profile includes receiving (567) the payload from the global cellular network operator. In some embodiments the payload is received as an SMS. In some embodiments the SMS is a binary SMS (e.g., and SMS that is not displayed on the mobile device, but instead causes the mobile device to perform one or more of operations 566-574). In some embodiments, the mobile device 102 extracts (568) the new local communication profile from the payload (e.g., by decrypting the payload using the designated keys). Once the local communication profile is available to the mobile device 102, it is selected (570) by the mobile device 102 as the active communication profile for the mobile device 102. Continuing the example described above, in response to the request for the new local communication profile, the mobile device 102 receives an SMS over the global AT&T network that contains an AIRTEL communication profile.

In some embodiments, after selecting a communication profile (e.g., the new local communication profile) as the active communication profile, the selected communication profile is moved (572) into the active location in the SIM card, as described in greater detail above. After the selected communication profile has been moved into the active location in the SIM card, the mobile device 102 is reset (573). Continuing with the example described above, the mobile device 102 loads the AIRTEL communication profile (e.g., an IMSI associated with AIRTEL) into the active region of the SIM card of the mobile device 102 and, optionally, moves the global AT&T communication profile to a temporary storage area on the SIM card.

The mobile device 102 connects (574) to the local cellular network operator 108 using the new local communication profile that was received via the global cellular network operator 106. In some embodiments, connecting to the local cellular network operator 108 includes performing one or more of operations 575-592. In some embodiments the mobile device 102 sends (575) a request to connect with the local cellular network operator 108 using a local communication profile. Continuing the example from above, the mobile device 102 sends a request to AIRTEL to register the mobile device 102 using the AIRTEL communication profile.

In some embodiments, after receiving the request from the mobile device 102, the local cellular network operator 108 verifies (576) the local communication profile. In some embodiments, such as embodiments where the local cellular network operator 108 manages the local communication profile, the local cellular network operator 108 handles the verification of the local communication profile at the local cellular network operator, and registers (577) the mobile device 102 with the local cellular network operator 108 without involving a separate communication management system 110. In other embodiments, such as embodiments where a communication management system 110 manages the local communication profile, the local cellular network operator 108 routes (578) the request from the mobile device 102 to a communication management system 110. In some embodiments, the request is routed to the communication management system 110 using (579) a network-specific address that is specific to the local cellular network operator 108, as described in greater detail below with reference to FIGS. 6A-6B. It should be understood that typically, this network-specific address will be different from the network-specific address used by the global cellular network operator 106 that was discussed above.

The communication management system 110 receives (580), from the local cellular network operator 108, a request to connect the mobile device 102 to the local cellular network operator 108 using a local communication profile. In other words, the communication management system 110 receives a forwarded communication from the mobile device 102 that indicates that the mobile device 102 is attempting to connect to the local cellular network operator 108 (e.g., AIRTEL) using the local communication profile. In some embodiments, the request also indicates the location of the mobile device 102 (e.g., by including a mobile country code or a mobile network code). In some embodiments, the communication management system 110, or a signal routing gateway (e.g., 120 in FIG. 3) within the communication management system 110, translates (582) the network-specific address associated with the request into an internal address for the server module that is associated with the network-specific address.

In some embodiments, the request is generated with (e.g., an IMSI) and an authentication key (e.g., a Ki) (e.g., a random number generated by using the Ki). The communication management system 110 or an authentication module (e.g., 338 in FIG. 3) within the communication management system 110 authenticates (583) the request using the same authentication key (e.g., the Ki) that is associated with the local IMSI. If the request cannot be authenticated (e.g., if the random number generated by the mobile device 102 and the random number generated by the communication management system 110 are not matched), then the request is rejected and the process ends. When the request is properly authenticated, then the communication management system 110 proceeds to process (584) the request. It should be understood that in some embodiments the authentication key (e.g., Ki) that is used to authenticate the request to connect to the global cellular network operator 106 is identical to the authentication key (e.g., Ki) that is used to authenticate the request to connect to the local cellular network operator 108 (e.g., because the global communication profile and the local communication profile are both managed by the communication management system 110). In some embodiments, processing the request includes retrieving registration information (e.g., an MSISDN) that is associated with the local cellular network operator 108 and preparing to deliver the registration information to the mobile device 102. For example, the HLR (e.g., 122 in FIG. 3) looks through subscriber identity information (e.g., 340 in FIGS. 3-4) and identifies, based on the local communication profile (e.g., the IMSI used by the mobile device 102) registration information (e.g., an MSISDN) that matches the local communication profile.

The server module (e.g., HLR 122 in FIG. 3) prepares to send a reply to the mobile device 102, the reply including the registration information. In some embodiments, the communication management system 110 or a signal routing gateway (e.g., 120 in FIG. 3) within the communication management system 110 translates (585) the reply by replacing an internal address for the server module (e.g., HLR 122 in FIG. 3) with the network-specific address for the server module (e.g., HLR 122 in FIG. 3) that was used to address the original request, as described in greater detail below with respect to FIGS. 6A-6B.

The communication management system 110 sends (586) the reply, including verification of the registration request and registration information (e.g., an MSISDN), to the local cellular network operator 108 for delivery to the mobile device 102. In some embodiments, the reply is addressed using (588) a network-specific address for the server module (e.g., the reply appears to be sent from a server module that has the same network-specific address that was used to address the original request). In other words, in some embodiments, the local cellular network operator 108 is completely unaware of the existence of the internal address for the server module (e.g., home location register 122 in FIG. 3). In some embodiments, after receiving the reply from the communication management system 110, the local cellular network operator 108 registers (577) the mobile device 102 with the local cellular network operator 108 by routing (590) the reply from the communication management system 110 to the mobile device 102. In some embodiments, the reply uses (591) the network-specific address for the server module. The mobile device 102 receives (592) the registration information (e.g., an MSISDN) for the local cellular network operator 108 and is thereby enabled to connect to the local cellular network operator 108 as a registered mobile device 102 (e.g., a mobile device 102 that can make and receive phone calls, make and receive SMS/EMS/MMS messages and/or send and receive data).

In some embodiments, after being connected to the local cellular network operator 108 as a registered mobile device 102, the mobile device 102 makes/receives one or more phone calls, sends/receives one or more SMS/EMS/MMS messages and/or sends/receives data using the local communication profile. In other words, once the mobile device 102 is registered with the local cellular network operator 108, the mobile device 102 is capable of performing all of the standard functions of a cellular phone. In particular, in some embodiments, the mobile device 102 operates (593) as a local phone with a local phone number (e.g., a local MSISDN) of the local cellular network operator 108 by communicating with another device via the local cellular operator. In some embodiments, operating as a local phone includes making a phone call using the local phone number (e.g., the local MSISDN). It should be understood that, in accordance with some embodiments, it is advantageous to operate as a local phone for at least the reason that: while the device is operating as a local phone, communications (e.g., phone calls, messaging, data transfer) that are made and received by the mobile device 102 are handled as local communications (e.g., the communications are not charged additional fees based on roaming agreements between cellular network operators). In other words, while operating as a local phone, communications made by and received at the mobile device 102 are cheaper than analogous communications would be if the mobile device 102 was operating as a roaming phone.

In some embodiments, after sending the reply to the local cellular network 108 for delivery to the mobile device 102, the communication management system 110 checks (596) for additional information to send to the mobile device 102, such as account status information and cellular network operator information. In accordance with some embodiments, the account status information includes one or more of a local phone number of the mobile device 102 (e.g., the new MSISDN), a prepaid account funds balance. In accordance with some embodiments, the cellular network operator information includes one or more of, a local support number, a calling rate for the local cellular network operator 108. When additional information is identified by the communication management system 110, the communication management system 110 sends (597) a message to the mobile device 102 with at least a subset of the additional information. In this way, the subscriber using the mobile device 102 is able to easily determine the current phone number of the mobile device 102, to determine cost of communicating using the mobile device 102 and to receive support for the mobile device 102. For example, when the mobile device 102 enters a new country (e.g., India) and receives a new local communication profile and registers as a local mobile device 102, the communication management system 110 sends an SMS message to the mobile device 102 that provides the subscriber with one or more of their new local phone number, a name of the local cellular network operator 108, a service number for the local cellular network operator 108, a cost per minute of making phone calls, a cost per message of sending SMS messages, and an amount of minutes/SMS messages that are available using funds from prepaid account.

In some embodiments, connecting to the global cellular network operator using the global communication profile includes connecting the mobile device 102 to the global cellular network operator 106 via one of a first plurality of cellular nodes associated with the global cellular network operator 106. In some embodiments, each cellular node in the first plurality of cellular nodes includes a single cellular tower connected to the global cellular network operator 106. Similarly, connecting to the local cellular network operator 108 using the new local communication profile includes connecting the mobile device 102 to the local cellular network operator 108 via one of a second plurality of cellular nodes associated with the local cellular network operator 108. In some embodiments, each cellular node in the second plurality of cellular nodes includes a single cellular tower connected to the local cellular network operator 108. In other words, in some embodiments, the global cellular network operator manages a plurality of cellular towers, and connecting with the global cellular network operator includes connecting to a cellular tower managed by the global cellular network operator; and, in contrast, the local cellular network operator manages a plurality of cellular towers, and connecting with the local cellular network operator includes connecting to a cellular tower managed by the local cellular network operator.

The advantage of connecting to the global cellular network operator is that network coverage provided by the first plurality of cellular nodes (e.g., the cellular towers associated with the global cellular network operator 106) extends over a larger geographical area than network coverage provided by the second plurality of cellular nodes (e.g., the cellular towers associated with the local cellular network operator 108). It should be understood that the first plurality of cellular nodes associated with the global cellular network operator 106 may include one or more cellular nodes operated by the global cellular network operator 106 and one or more cellular nodes operated by partner cellular network operators with whom the global cellular network operator 106 has a cellular node sharing agreement (i.e., a roaming agreement), as described in greater detail above with reference to FIG. 1C. Moreover, in some embodiments, the first plurality of cellular nodes comprises one or more cellular nodes from the second plurality of cellular nodes. In other words, a local cellular network operator 108 may have a cellular node sharing agreement (i.e., a roaming agreement) with the global cellular network operator 106.

However, the large service area of the global cellular network operator 106 is typically counterbalanced by a high cost of connecting with the global cellular network operator 106. In particular, typically, cellular network access fees charged by the global cellular network operator 106 for communications (e.g., making/receiving phone calls, sending/receiving SMS messages, and/or sending/receiving data) from a respective geographic region (e.g., India) are higher than cellular network access fees charged by the local cellular network operator 108 for communications from the respective geographic region (e.g., India). For example, the cost per minute of calling to the US from India using a global communication profile (e.g., the AT&T communication profile) may be x dollars per minute, while the cost of calling to the US from India using a local communication profile (e.g., the AIRTEL communication profile) is 0.5x dollars per minute (or less). Thus, even though the geographic service area of the local cellular network operators 108 is smaller than the geographic service area of the global cellular network operator 106, it is frequently advantageous to connect with a local cellular network operator 108, if possible, so as to reduce the cost of communications. In other words, while the mobile device 102 can connect with either a local cellular network operator 108 or a global cellular network operator 106, as described in greater detail above with reference to FIGS. 5A-5D, frequently it is advantageous (e.g., cheaper) to communicate while connected to a local cellular network operator 108 than it is to communicate while connected to a global cellular network operator 106.

Additionally, it should be understood that, in some embodiments, the mobile device 102 has a home communication profile. The home communication profile is associated with a home cellular network operator (e.g., 104 in FIG. 1A). The home cellular network operator 104 is a primary cellular network operator for the subscriber. For example, the home cellular network operator 104 is the cellular network operator that handles the majority of the subscriber's communications (e.g., the subscriber lives in the US and has a US based cellular network operator as the home cellular network operator 104). Also, a home cellular network operator 104 typically is the cellular network operator that has billing information for the subscriber and thus is the cellular network operator that the subscriber primarily interacts with. In these embodiments, the mobile device 102 further comprises a home communication profile for connecting the mobile device 102 to the home cellular network operator 104. In some of these embodiments, the home communication profile (e.g., a home IMSI) is permanently stored in the mobile device 102 (e.g., in the SIM card of the mobile device 102). In some embodiments, the plurality of communication profiles (e.g., the global communication profile and the one or more local communication profiles) are managed by a communication management system 110, while the home communication profile is managed by the home cellular network operator 104.

Figure 6A:
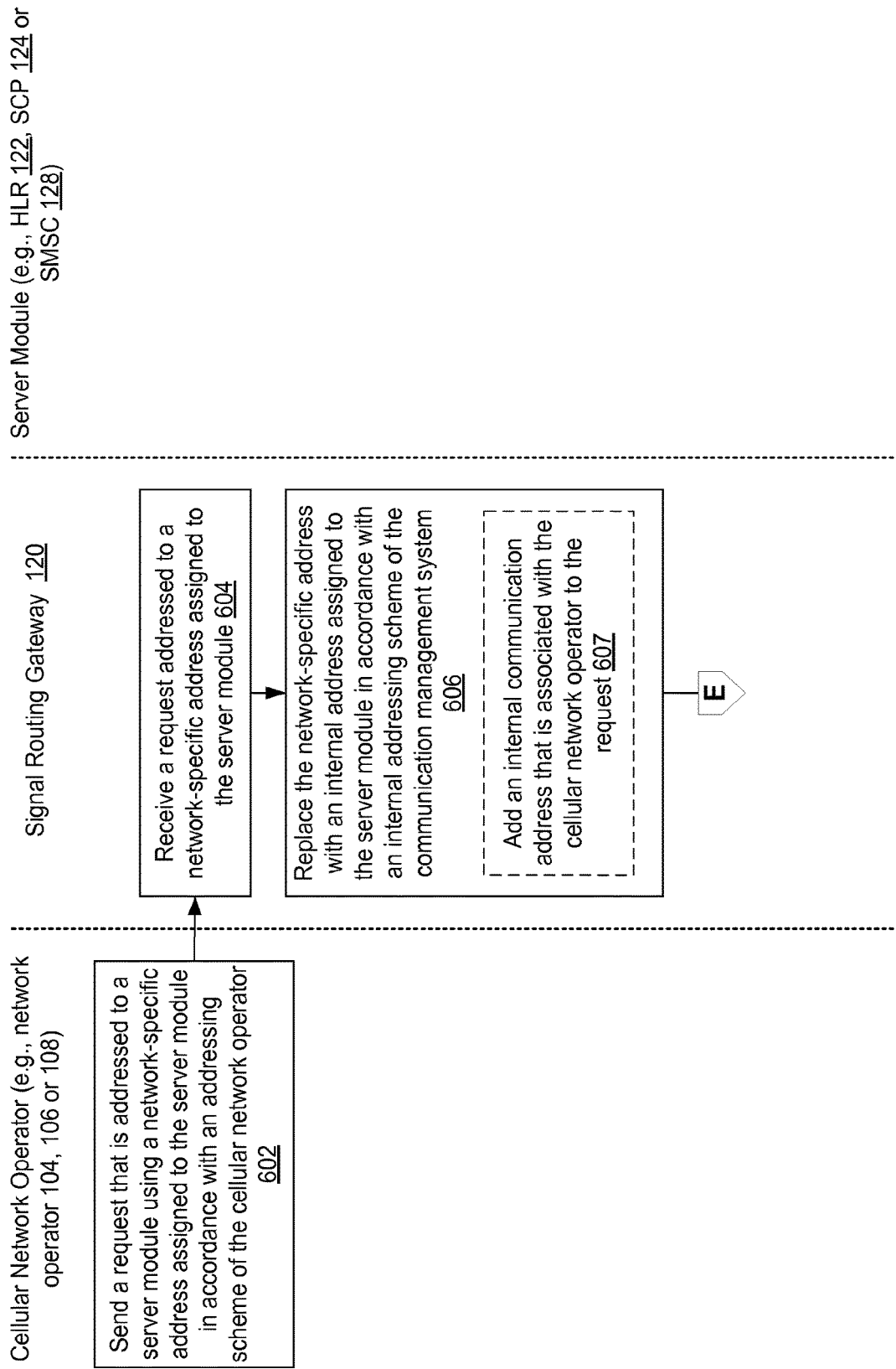
Figure 7A:
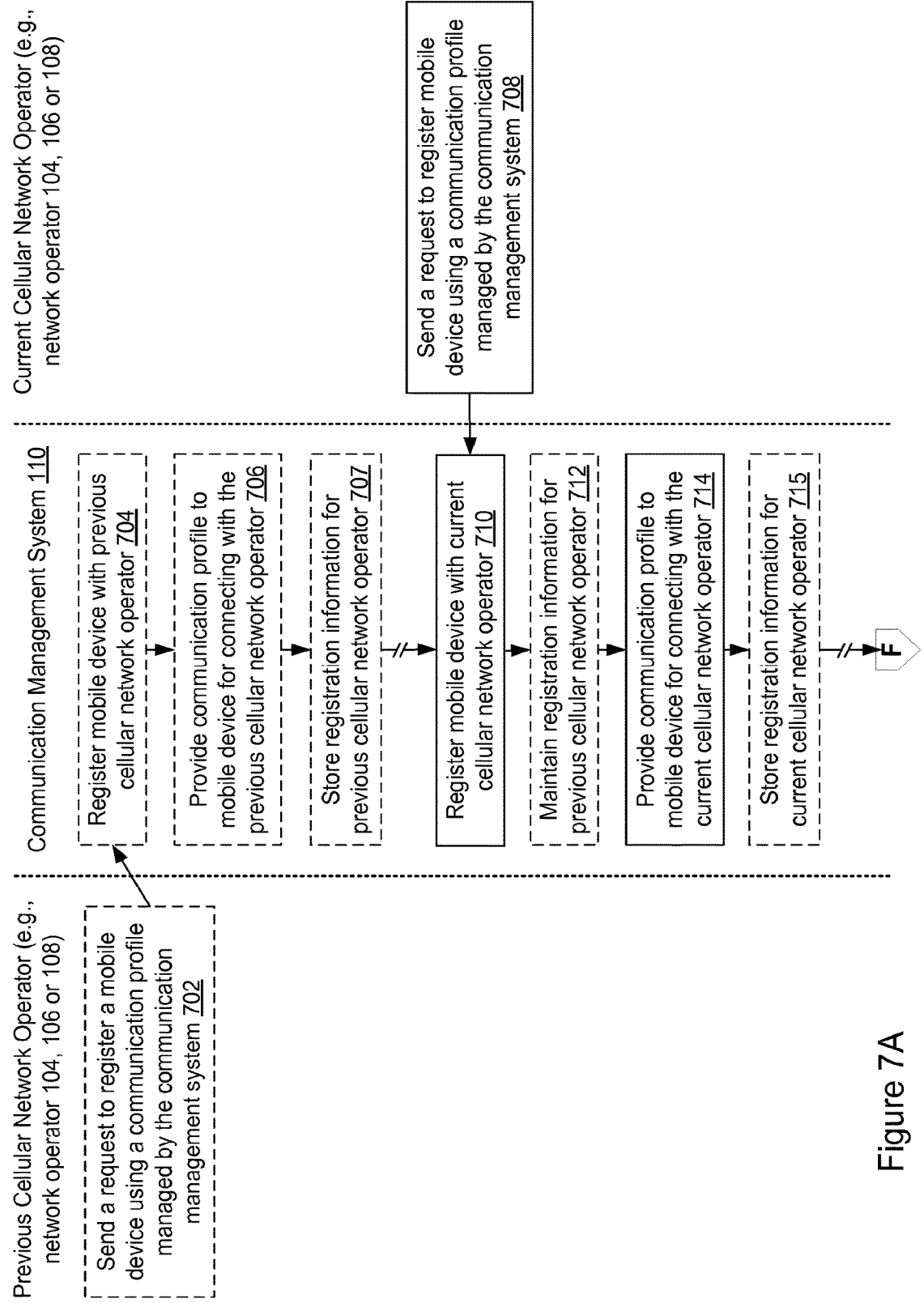
Figure 7B:
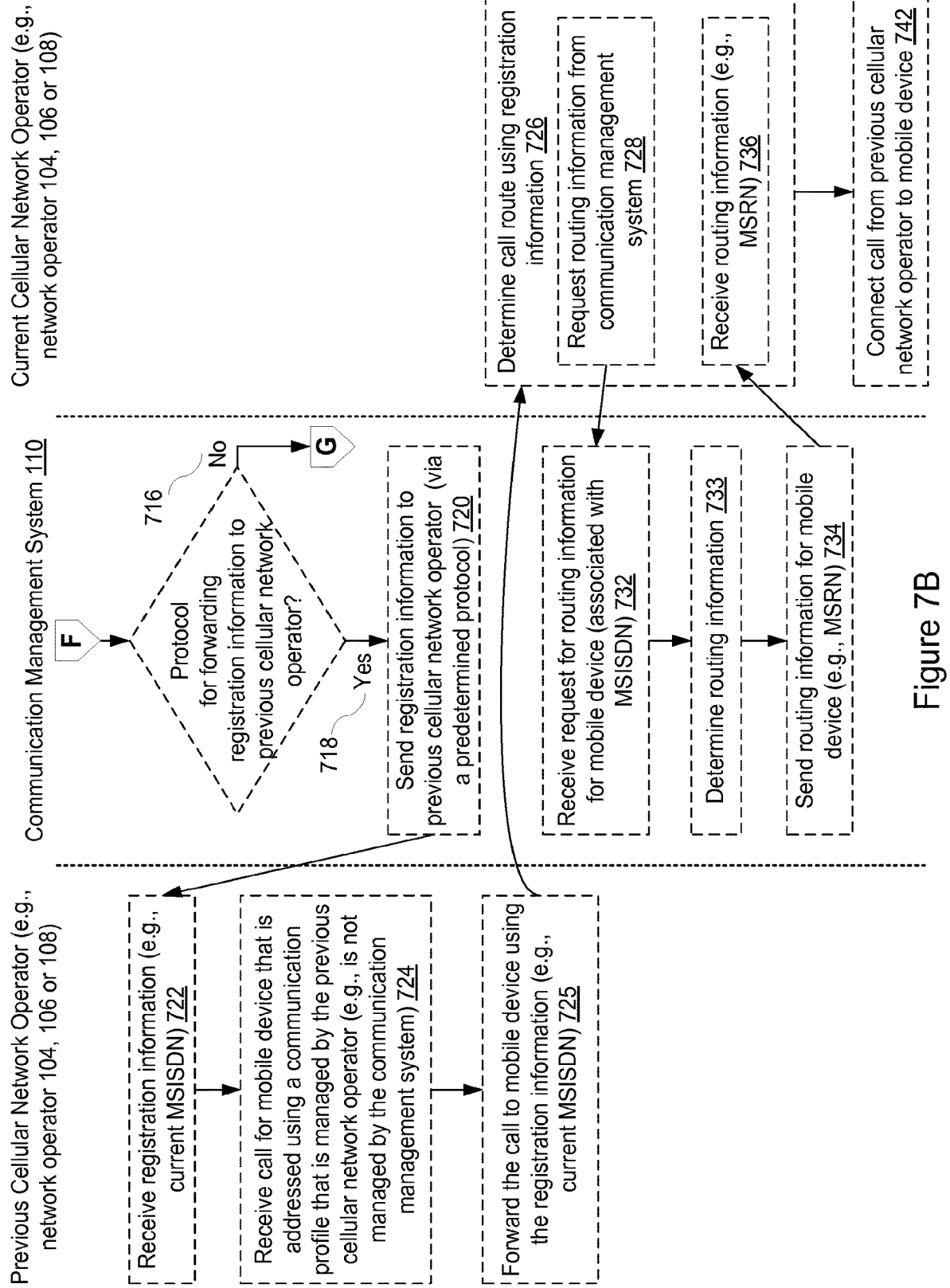

Attention is now directed towards FIGS. 6A-6B, which illustrate a process 600 for dynamically providing communication profiles to a mobile device (e.g., 102 in FIG. 1A, 2) in accordance with some embodiments. As discussed in greater detail above, in some embodiments, the communication management system (e.g., 110 in FIG. 1A, 3) is in communication with a plurality of cellular network operators including one or more of: a home cellular network operator 104, a global cellular network operator 106 and one or more local cellular network operators 108. In some embodiments, a plurality of the cellular network operators communicate with server modules of the communication management system 110 using network-specific addresses for the server modules. In these embodiments, the communication management system 110 includes a signal routing gateway (e.g., 120 in FIGS. 1A, 1D, 3) for managing communication between the cellular network operators and the server modules, as described in greater detail below.

The communication management system 110 includes a server module (e.g., HLR 122 in FIG. 3) and a signal routing gateway 120 that is connected to a plurality of cellular network operators (e.g., home cellular network operator 104, global cellular network operator 106 and/or one of the local cellular network operators 108). In some embodiments, the server module is a server module that provides services for connecting phone calls to and/or from mobile devices 102 via a cellular network operator, such as a home location register (e.g., 122 in FIG. 3). In some embodiments, the server module is a server module that provides services for sending messages to and/or from mobile devices 102 via a cellular network operator that includes a short message service center (e.g., 128 in FIG. 3). In some embodiments the server module is a server module that provides phone number relation information, for connecting phone calls, such as a signal control point (e.g., 124 in FIG. 3). In some embodiments, the communication management system 110 includes the server module and one or more additional server modules, each server module having: an internal address (e.g., 154 in FIG. 1D) that is used by the signal routing gateway 120; a plurality of respective network-specific addresses (e.g., 152 in FIG. 1D) that are used by respective cellular network operators, as illustrated in FIG. 1D.

A first cellular network operator sends (602) a request that is addressed to a server module (e.g., home location register 122 in FIG. 3) using a network-specific address assigned to the server module in accordance with an addressing scheme of the first cellular network operator (e.g., home cellular network operator 104, global cellular network operator 106 and/or one of the local cellular network operators 108). In some embodiments, a first cellular network operator (e.g., home cellular network operator 104, global cellular network operator 106 and/or one of the local cellular network operators 108) has previously assigned, to the communication management system 110, a set of communication profiles to be managed by the communication management system 110; and the first request is sent to the server module (e.g., HLR 122, SCP 124, or SMSC 128 in FIG. 1D) when the first request is associated with a respective communication profile of the set of communication profiles that was assigned to the communication management system 110.

The signal routing gateway 120 of the communication management system 110 receives (604) the first request from the first cellular network operator of the plurality of cellular network operators that is addressed to a first network-specific address assigned to the server module (e.g., home location register 122 in FIG. 3) in accordance with a first addressing scheme of the first cellular network operator (e.g., home cellular network operator 104, global cellular network operator 106 and/or one of the local cellular network operators 108).

In some embodiments, the first network-specific addressing scheme is an addressing scheme of the first cellular network operator for addressing server modules that are configured to perform functions that are analogous to functions performed by the server module. In other words, the network-specific address for the home location register 122 of the communication management system 110 is selected in accordance with the addressing scheme that is used by the first cellular network operator to address a home location register of the first cellular network operator. Thus, requests from the first cellular network operator can be directed to server modules within the communication management system 110 with minimal effort by the cellular network operator. For example, addressing requests to server modules of the communication management system 110 is accomplished by substituting the address of the native home location register of the first cellular network operator for the network-specific address of the home location register 122 of the communication management system 110.

In response to the first request, the signal routing gateway 120 replaces (606) the first network-specific address with an internal address assigned to the server module in accordance with an internal addressing scheme of the communication management system 110. In some embodiments, each network-specific address includes one or more of: a network-specific hardware identifier (e.g., a network-specific point code) and a network-specific communication address (e.g., a network-specific global title). In some embodiments, the internal address is a hardware address (e.g., an internal point code). In some embodiments the internal address is paired with an internal communication address that is associated with a cellular network operator (e.g., an internal global title). In some embodiments, an internal hardware address (e.g., an internal point code) for a respective server module is the same for all requests to the respective server module (e.g., a request relayed from a first cellular network operator to the server module and a request relayed from second cellular network operator to the same server module would both use the same common point code for the server module). In some embodiments, a respective server module has multiple internal communication addresses (e.g., internal global titles) and a respective internal communication address (e.g., internal global title) for the respective server module is the same for all requests to the respective server module from a single cellular network operator but a different internal communication address is used for each different cellular network operator (e.g., a request relayed from a first cellular network operator to the server module would use a first internal global title and a request relayed from second cellular network operator to the same server module would use a second internal global title that is distinct from the first internal global title).

In some embodiments, in conjunction with replacing the first network-specific address with the internal address the signal routing gateway 102 adds (607) a first internal communication address that is associated with the first cellular network operator to the request. In other words, in these embodiments, the modified request includes both an internal hardware address (e.g., the common internal hardware address for the server module) and a first internal communication address (e.g., an internal communication address that is associated with the first cellular network operator).

In some embodiments, the signal routing gateway 120 obtains (608), from the server module, a first response to the first request. The first response is addressed from the internal address. In some embodiments, the first response is obtained by performing operations 610-618. Thus, in some embodiments, the signal routing gateway 120 sends (610) the first request to the server module using an internal address for the server module. In some embodiments, the first request also uses the first internal communication address (e.g., the first internal global title) for the server module. The server module receives (612) the request from the signal routing gateway 120, generates (614) a response, and sends a reply to the signal routing gateway 120 using (616) the internal address for the server module as the "sent from" address. The signal routing gateway 120 receives (618) the reply from the server module.

In some embodiments, after obtaining the first response from the server module, the device determines (619), based on the first internal communication address, that the response is directed to the first network-specific address. In other words, the first internal communication address (e.g., the first internal global title) is used to identify the first request as having originated from the first cellular network operator so that the response can be sent back to the first cellular network operator (e.g., the cellular network operator from which the first request was originally received). After obtaining the first response from the server module, the signal routing gateway 120 replaces (620) the internal address for the server module with the first network-specific address for the server module. The signal routing gateway 120 sends (622) the reply to the first cellular network operator.

As one example of this signal routing process, cellular network operator A (e.g., local cellular network operator 108-1 in FIG. 1D) sends a request addressed from "Operator A" to "PC21, GT21." The signal routing gateway 120 changes the header of the request so that it is addressed from "Operator A" to "PC1, GT4" and passes the request to the server module (e.g., HLR 122 in FIG. 1D). The server module generates a response to the request and sends the response to the signal routing gateway 120 addressed from "PC1, GT4" to "Operator A." The signal routing gateway 120 changes the header of the response so that it is addressed from "PC21, GT21" to "Operator A" and passes the response to cellular network operator A. Thus, network-specific address for the server module is replaced with the internal address (e.g., internal hardware address PC1) for the server module for the incoming request and the internal address (e.g., internal hardware address PC1) for the server module is replaced with the network-specific address for the server module for the outgoing response.

Additionally, it should be understood that this process can be repeated for one or more additional cellular network operators that send requests to the same (or different) server modules. In particular, the signal routing gateway 120 receives (604) a second request from a second cellular network operator of the plurality of cellular network operators, in an analogous manner to that described above with reference to the first cellular network operator. The second request is addressed to a second network-specific address assigned to the server module in accordance with a second addressing scheme of the second cellular network operator. In some embodiments, the second network-specific addressing scheme is an addressing scheme of the second cellular network operator for addressing server modules that are configured to perform functions that are analogous to functions performed by the server module, in an analogous manner to the addressing scheme of the first cellular network operator, as described in greater detail above.

In response to the second request, the signal routing gateway 120 replaces (606) the second network-specific address with the internal address, in an analogous manner to that described above with reference to the first cellular network operator. In some embodiments, in conjunction with replacing the second network-specific address with the internal address the signal routing gateway 102 adds (607) a second internal communication address that is associated with the second cellular network operator to the request. In other words, in these embodiments, the modified request includes both the internal hardware address (e.g., the common internal hardware address for the server module) and a second internal communication address (e.g., an internal communication address that is associated with the second cellular network operator). The signal routing gateway 120 obtains (608) from the server module a second response to the second request, where the second response is addressed using the internal address, in an analogous manner to that described above with reference to the first cellular network operator. However, in some embodiments, instead of using the first internal communication address, the second request includes the second internal communication address for the server module (e.g., the second request includes the global title that is associated with the second cellular network operator).

In some embodiments, after obtaining the second response from the server module, the device determines (619), based on the second internal communication address, that the response is directed to the second network-specific address. In other words, in these embodiments, the second internal communication address (e.g., the second internal global title) is used to identify the second request as having originated from the second cellular network operator so that the response can be sent back to the second cellular network operator (e.g., the cellular network operator from which the second request was originally received). The signal routing gateway 120 replaces (620) the internal address with the second network-specific address; and sends (622) the second response to the second cellular network operator, in an analogous manner to that described above with reference to the first cellular network operator.

While many of the operations performed by the signal routing gateway 120 are analogous for different cellular network operators, they are typically not identical. For example, even when the first cellular network operator and the second cellular network operator described above each send a request to the same server module (e.g., home location register 122), typically each cellular network operator will use a different network-specific address for the server module, and thus the signal routing gateway 120 must have a record (e.g., stored in memory of the communication management system) the network-specific names assigned to a server module by each of the cellular network operators and must also have a record of (e.g., stored in memory of the communication management system) of the cellular network that sent a particular request so that the response that is related to the particular request can be directed back to the cellular network that sent the particular request.

Continuing the example from above, cellular network operator B (e.g., local cellular network operator 108-N in FIG. 1D) sends a request addressed from "Operator B" to "PC31, GT31." The signal routing gateway 120 changes the header of the request so that it is addressed from "Operator B" to "PC1, GT7" and passes the request to the server module (e.g., HLR 122 in FIG. 1D). The server module generates a response to the request and sends the response to the signal routing gateway 120 addressed from "PC1, GT7" to "Operator B." The signal routing gateway 120 changes the header of the response so that it is addressed from "PC31, GT31" to "Operator B" and passes the response to cellular network operator B. Thus, network-specific address for the server module is replaced with the internal address (e.g., internal hardware address PC1) for the server module for the incoming request and the internal address (e.g., internal hardware address PC1) for the server module is replaced with the network-specific address for the server module for the outgoing response, even though the first network-specific address (e.g., PC21, GT21) of cellular network operator A for the server module (e.g., HLR 122 in FIG. 1D) is different from the second network-specific address (e.g., PC 31, GT31) of cellular network operator B for the server module (e.g., HLR 122 in FIG. 1D). Additionally, it should be noted that at least a portion of the internal address (e.g., internal hardware address PC1) is the same for both the first request and the second request.

Additionally, in some embodiments, the signal routing gateway 120 also standardizes communication protocols used by cellular network operators. In some embodiments, the first cellular network operator (e.g., operator A) uses a first communication protocol (e.g., an American National Standards Institute communication protocol) to send the first request, and the second cellular network operator (e.g., operator B) uses a second communication protocol (e.g., an International Telecommunications Union communication protocol) that is different and distinct from the first communication protocol. In some embodiments, the communication management system 110 or the signal routing gateway 120 of the communication management system 110 uses the first communication protocol to send the first response to the first cellular network operator, and uses the second communication protocol to send the second response to the second cellular network operator. In other words, the signal routing gateway 120 interprets multiple communication protocols from multiple different cellular network operators, and transmits responses to each respective cellular network operator using the respective preferred communication protocol of the respective cellular network operator.

It should be understood that, although the terms first, second, etc. may be used herein to describe various elements, these elements should not be limited by these terms. These terms are only used to distinguish one element from another. For example, a first request could be termed a second request, and, similarly, a second request could be termed a first request, without departing from the scope of the disclosed embodiments. In other words, the first request and the second request are both requests, but they are not the same request.

It should be understood that, in accordance with other embodiments described herein, a mobile device 102 may have multiple different communication profiles that are used to connect with multiple different cellular network operators but are managed by a single communication management system 110. Thus, it is advantageous to have a signal routing gateway 120 that effectively allows each cellular network operator to communicate natively with the communication management system 110, thereby simplifying communications with each of the cellular network operators while ensuring that requests associated with different communication profiles of a single mobile device 102 can be managed by the single communication management system 110. Thus, it should be understood that, in some embodiments, the first request is a request associated with a first communication profile for a mobile device 102, and the second request is a request associated with a second communication profile for the mobile device 102. In other words, in some embodiments, requests for multiple different communication profiles for the same mobile device 102 are sent to the server module by two different cellular network operators.

Attention is now directed towards FIGS. 7A-7D, which illustrate a process 700 for routing a call to a mobile device (e.g., 102 in FIGS. 1A, 2) associated with multiple communication profiles using a communication management system (e.g., 110 in FIGS. 1A, 3) in accordance with some embodiments. As described herein, it should be understood that a previous cellular network operator (e.g., a cellular network operator with which the mobile device 102 was previously registered) could be any of a home cellular network operator 104, a global cellular network operator 106 and/or a local cellular network operator 108. Similarly, a current cellular network operator (e.g., a cellular network operator with which the mobile device 102 is currently registered) could be any of a home cellular network operator 104, a global cellular network operator 106 and/or a local cellular network operator 108.

In some embodiments, the previous cellular network operator sends (702) a request to register the mobile device 102 with the previous cellular network operator using a communication profile managed by the communication management system 110. It should be understood that typically a home cellular network operator 104 does not send such a request to the communication management system (e.g., because the home communication profile is managed by the home cellular network operator 104 rather than by the communication management system 110). However, in accordance with some embodiments, the home cellular network operator is the previous cellular network operator for the purposes of the discussion of operations 716-742.

The communications management system 110 registers (704) the mobile device 102 with the previous cellular network operator, and provides (706) a communication profile to the mobile device 102 for connecting with the previous cellular network operator. In some embodiments, the process for registering the mobile device 102 with a previous cellular network operator is analogous to the registration process described in greater detail above with reference to FIGS. 5A-5D. In some embodiments, the communication management system 110 stores (707) registration information associated with the previous cellular network operator, the registration information (e.g., a MSISDN) comprising a first network-specific identifier for the mobile device 102 that is specific to the first cellular network operator (e.g., the registration information is stored in the subscriber identity information 340 of the home location register 122 as illustrated in FIGS. 3-4). In some embodiments, the registration information is a phone number (e.g., a MSISDN) associated with the previous cellular network operator (e.g., a phone number which is used to identify the mobile device 102 by the previous cellular network operator).

In some embodiments, the current cellular network operator sends (708) a request to register the mobile device 102 with the current cellular network operator using a communication profile managed by the communication management system 110. The communications management system 110 registers (710) the mobile device 102 with the current cellular network operator. While maintaining (712) registration information for the previous cellular network operator, the communication management system 110 provides (714) a communication profile to the mobile device 102 for connecting with the current cellular network operator. In some embodiments, the process for registering the mobile device 102 with a current cellular network operator is analogous to the registration process described in greater detail above with reference to FIGS. 5A-5D. In some embodiments, the communication management system 110 stores (715) registration information associated with the current cellular network operator, the registration information (e.g., a MSISDN) comprising a second network-specific identifier for the mobile device 102 that is specific to the current cellular network operator (e.g., the registration information is stored in the subscriber identity information 340 of the home location register 122 as illustrated in FIGS. 3-4).

In some embodiments, the communication management system 110 or the home location register 122 within the communication management system 110 stores subscriber information for the mobile device 102, and the subscriber information comprises a set of communication profiles (e.g., IMSIs) and registration information (e.g., MSISDNs) associated with the mobile device 102. In accordance with some embodiments, the subscriber information includes the first communication profile and first registration information that are associated with a first cellular network operator (e.g., an IMSI and an MSISDN associated with a global cellular network operator). In some embodiments, the set of communication profiles also includes the second communication profile and second registration information that are associated with a second cellular network operator (e.g., an IMSI and an MSISDN associated with a local cellular network operator).

In accordance with some embodiments, the communication management system 110 does not have (716) an established protocol for forwarding registration information of the mobile device 102 to the previous cellular network operator. In these embodiments, the communication management system 110 determines routing information for the mobile device 102 and passes the routing information to the previous cellular network operator, as described in greater detail below with reference to operations 744-774.

In accordance with other embodiments, the communication management system 110 has (718) an established protocol for forwarding registration information to the previous cellular network operator. In other words, in some embodiments, the communication management system 110 has a predetermined arrangement with the previous cellular network operator that specifies that whenever the mobile device 102 is registered with another cellular network operator, the communication management system 110 will send information about the registration of the mobile device 102 to the previous cellular network operator. In other words, after registering the mobile device 102 with the current cellular network operator using the second communication profile, the communication management system 110 sends (720), to the previous cellular network operator, registration information associated with the second communication profile. This registration information enables the previous cellular network operator to request routing information that is associated with the second communication profile directly from the current cellular network operator with which the mobile device 102 is attached. In some embodiments, the registration information is sent to the previous cellular network operator using a predetermined protocol such as an application programmer interface (API) that specifies how such information is to be formatted for use by the previous cellular network operator.

In some embodiments, the previous cellular network operator receives (722) registration information for the mobile device 102 (e.g., an MSISDN and/or IMSI that are associated with the current cellular network operator). It should be understood that in accordance with some embodiments it is the home cellular network operator 104 for the mobile device 102 that has a protocol for forwarding the registration information. At some point in time after the registration information has been received, the previous cellular network operator receives (724) a call for the mobile device 102 that is addressed using a communication profile that is managed by the previous cellular network operator (i.e., a communication profile that is not managed by the communication management system 110). In other words, in some embodiments the previous cellular network operator is a home cellular network operator for the mobile device 102, and thus manages a home communication profile, and consequently the home cellular network operator authenticates all requests for connection to the mobile device 102 that use the home communication profile.

In some embodiments, the previous cellular network operator forwards (725) the call to the mobile device 102 at the current cellular network operator using the registration information (e.g., the current MSISDN for the mobile device 102). After receiving the call from the previous cellular network operator, the current cellular network operator determines (726) a call route to the mobile device 102 using the registration information received from the previous cellular network operator. In some embodiments, determining the call route information includes requesting (728) routing information from the communication management system 110. Typically the request includes the current registration information (e.g. MSISDN) and/or communication profile (e.g., IMSI) for the mobile device 102. In some of these embodiments, the communication management system 110 receives (732) the request for routing information for the mobile device 102, and determines (733) routing information (e.g., by retrieving the routing information from a device register at the current cellular network operator, such as a visiting location register with which the mobile device 102 is currently attached). Typically, the routing information includes a mobile station roaming number (MSRN) and/or other status generated by the mobile switching center (MSC) associated with the device register with which the mobile device 102 is attached. In some of these embodiments, the communication management system 110 sends (734) the routing information (e.g., MSRN) to the current cellular network operator. Thus, in response to the request for routing information, the current cellular network operator receives (736) the routing information from the communication management system 110.

In some embodiments, after receiving the routing information, the current cellular network operator is able to connect (742) the call to the mobile device 102 using the routing information. In accordance with some embodiments, a mobile switching center within the current cellular operator connects the call to the mobile device 102.

In accordance with some embodiments, the communication management system 110 does not have an established protocol for forwarding registration information of the mobile device 102 to the previous cellular network operator, the previous cellular network operator must request routing information when it is required in order to connect a call to the mobile device 102. In some embodiments, the previous cellular network operator receives (744) a call for mobile device 102 that is addressed using a communication profile that is managed by the previous cellular network operator (e.g., is not managed by the communication management system 110). In these embodiments, when the previous cellular network operator receives the call, the previous cellular network operator must determine whether a route is available to the mobile device 102. In some embodiments, this determination is made using a communication profile and registration information managed by the previous cellular network operator. For example, when the previous cellular network operator is the home cellular network, the home cellular network operator checks to determine whether the mobile device 102 is currently connected to a visiting location register of the home cellular network operator before requesting routing information for the mobile device from the communication management system 110.

When a route is available (746) to the mobile device 102 through the previous cellular network operator (e.g., the mobile device 102 is connected to a visiting location register of the home cellular network operator), the previous cellular network operator determines (748) routing information for connecting the call to the mobile device 102 and connects (749) the call to the mobile device 102 using the routing information.

However, if no route to the mobile device 102 is available (750) through the previous cellular network operator (e.g., the mobile device 102 is not connected to any visiting location register of the home cellular network operator), the previous cellular network operator sends (752) a request to the communication management system 110 for routing information for the mobile device 102. The communication management system 110 receives (754), from the previous cellular network operator, a request for routing information associated with a first communication profile of the mobile device 102. In some embodiments the first communication profile is a non-active communication profile for the mobile device 102 (e.g., a communication profile that the mobile device 102 is not currently using to connect with a cellular network operator). In some embodiments the first communication profile is a communication profile that is associated with the previous cellular network operator. For example, if the previous cellular network operator is CHINAMOBILE and the current cellular network operator is AIRTEL, and the mobile device 102 was previously connected as a local mobile phone with a communication profile for CHINAMOBILE, when CHINAMOBILE is unable to locate the mobile device 102, CHINAMOBILE sends a request to the communication management system 110 for a route to the mobile device 102. In this example, the request from CHINAMOBILE uses the communication profile that the mobile device 102 was using while it was connected with CHINAMOBILE, because CHINAMOBILE is not necessarily aware of any other communication profile associated with the mobile device 102.

In some embodiments, after receiving the request, the communication management system 110 determines (755) that the first communication profile is not a currently active communication profile for the mobile device 102. When it is determined that the first communication profile is not a currently active communication profile for the mobile device 102, the communication management system 110 searches (756) for the currently active communication profile for the mobile device 102. In some embodiments there is only a single currently active communication profile for a mobile device 102. In some embodiments, searching for the currently active communication profile includes searching subscriber information (e.g., 340 in FIGS. 3-4) for a subscriber account that is associated with the first communication profile and, after identifying the subscriber account that is associated with the first communication profile, determining a currently active communication profile associated with the subscriber account.

Thus, the communication management system 110 identifies (757), based on the first communication profile, a second communication profile that is an active communication profile for the mobile device 102. In accordance with some embodiments, the second communication profile is associated with a current cellular network operator for the mobile device 102 that is distinct from the previous cellular network operator. For example, the communication management system 110 finds the first communication profile (e.g., the device identifier or registration information) in subscriber identity information (e.g., 340 in FIG. 4) for a first user and identifies the currently active communication profile (e.g., the currently active device identifier or registration information) for the mobile device 102 associated with the subscriber identity information 340 as the second communication profile.

After identifying the second communication profile, the communication management system 110 determines (758) routing information associated with the second communication profile. In some embodiments, determining the call route information includes requesting (760) routing information from the current cellular network operator. Typically the request includes the current communication profile (e.g., device identifier such as an IMSI and/or registration information such as a MSISDN) for the mobile device 102. The current cellular network operator receives (762) the request for routing information for the mobile device 102, retrieves routing information (e.g., from a device register such as a visiting location register with which the mobile device 102 is currently attached). Typically, the routing information includes a mobile station roaming number (MSRN) and/or status associated with the device register with which the mobile device 102 is attached. The current cellular network operator sends (764) the routing information (e.g., MSRN) to the communication management system 110. In response to the request for routing information, the communication management system 110 receives (766) the routing information from the current cellular network operator. In other words, in some embodiments, the routing information that is determined by the communication management system 110 is routing information that was received from the current cellular network operator.

After determining routing information for the mobile device 102, the communication management system 110 sends (768), to the previous cellular network operator, a reply comprising the routing information associated with the second communication profile (e.g., the MSRN received from the current cellular network). The previous cellular network operator receives (770) the current routing information for the mobile device 102 and places (772) a call to the mobile device 102 using the received routing information. In other words, the previous cellular network operator attempts to connect the call that was received for the mobile device 102 using the first communication profile through current cellular network operator by using the current routing information for mobile device 102. The current cellular network operator receives the communication from the previous cellular network operator and connects (774) the call using the current routing information.

It should be understood that, in accordance with some embodiments, the request for routing information is performed directly between the communication management system 110 and the current cellular network operator without any involvement by the previous cellular network operator 110. In fact, in some embodiments, the previous cellular network operator is completely unaware that the mobile device 102 is associated with the second communication profile. Rather, the communication management system 110 keeps track of the various communication profiles of the mobile device 102 and manages the transfer of routing information associated with the mobile device 102 between different cellular network operators. In some embodiments, the routing information is communication profile agnostic (i.e., it is not directly based on any of the communication profiles of the mobile device 102).

Continuing the example from above where CHINAMOBILE receives a phone call for a mobile device 102 that is currently connected with AIRTEL, the communication management system 110 requests routing information to the mobile device 102 from AIRTEL using a communication profile associated with AIRTEL. AIRTEL sends the routing information to the communication management system 110, which forwards the routing information to CHINAMOBILE. In some embodiments, because the routing information is communication profile agnostic, CHINAMOBILE is able to place the phone call without needing to perform any additional operations to account for the fact that the mobile device 102 is currently connected with a different cellular network operator using a different communication profile.

While the operations have been described herein with respect to a single previous cellular network operator, it should be understood that there can be any number of previous cellular network operators, each having a different communication profile that is associated with the mobile device 102. These multiple previous cellular network operators would each process a call received for the mobile device 102 using the respective communication profile of the mobile device 102 that is associated with the respective previous cellular network operator using steps that are analogous to the steps described above with respect to a single previous cellular network operator. In some embodiments at least a plurality these respective communication profiles are each a distinct respective communication profile. Moreover, in addition to all of the operations described above (e.g., the multi-communication profile call routing operations), it should be understood that the mobile device 102 would operate normally for the current cellular network operator (e.g., a phone call that is directed to the mobile device 102 using the communication profile associated with the current cellular network operator would be routed to the mobile device 102 by the cellular network operator using standard call routing procedures). Thus, one advantage of the arrangement described above is that it enables the mobile device 102 to receive phone calls that are sent to the mobile device 102 using multiple different communication profiles associated with multiple different cellular network operators.

Continuing the example above, the mobile device 102 could have multiple communication profiles for previous cellular network operators (e.g., CHINAMOBILE, VODAFONE, T-MOBILE, etc.) and a communication profile for the current cellular network operator (e.g., AIRTEL), where each cellular network operator has a different registration information (e.g., an MSISDN/phone number) for the mobile device 102. A call placed to any of the phone numbers associated with any of previous cellular network operators (e.g., CHINAMOBILE, VODAFONE, T-MOBILE, etc.) is routed to the mobile device 102 at the current cellular network operator (e.g., AIRTEL). Thus, the subscriber using the mobile device 102 would be able to receive calls from any local phone number (e.g., MSISDN) with which the mobile device 102 was previously registered.

Figure 8A:
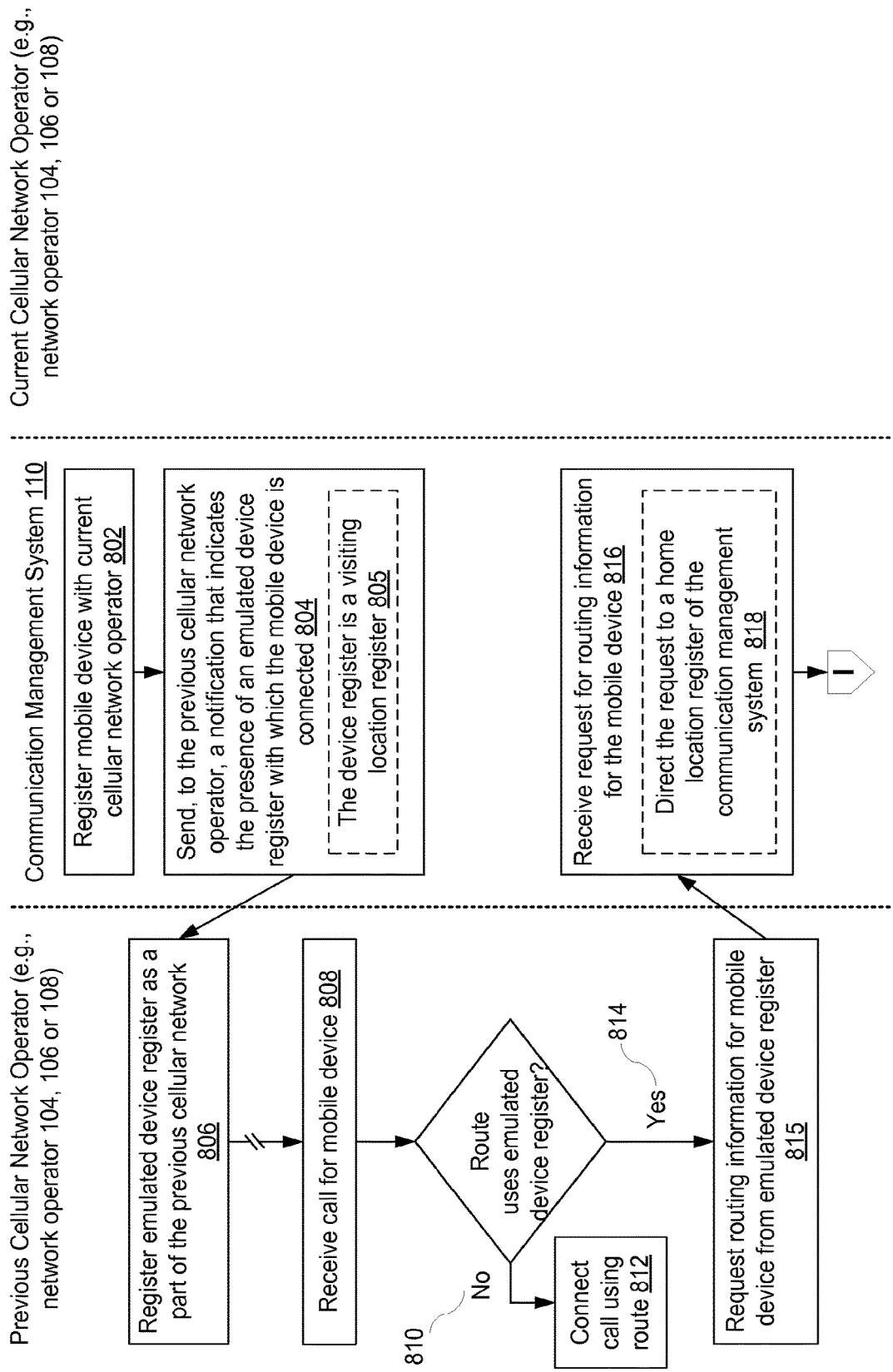
FIGS. 8A-8B are flow diagrams illustrating a process for routing a call to a mobile device associated with multiple communication profiles using an emulated device register in accordance with some embodiments.
Figure 8B:
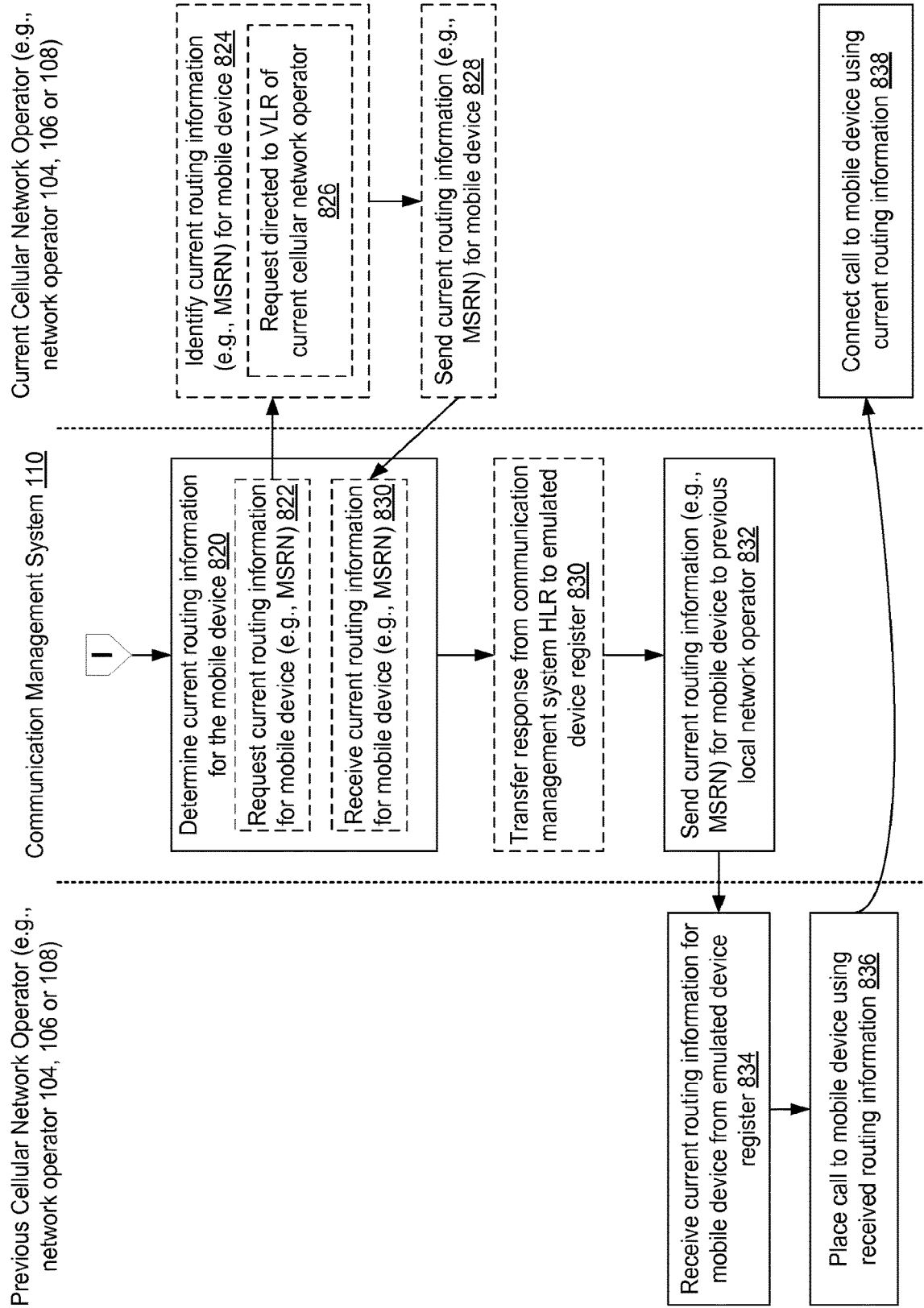

Attention is now directed towards FIGS. 8A-8B, which illustrate a process 800 for routing a call to a mobile device (e.g., 102 in FIGS. 1A, 2) associated with multiple communication profiles using an emulated device register in accordance with some embodiments. In accordance with some embodiments, a mobile device 102 is registered (802) with a current cellular network operator (e.g., global cellular network operator 106, and/or local cellular network operator 108), as described in greater detail above with reference to FIGS. 5A-5D). In some embodiments the mobile device 102 was previously registered with a previous cellular network operator (e.g., home cellular network operator 104, global cellular network operator 106, or local cellular network operator 108).

The communication management system (e.g., 110 in FIGS. 1A, 3) sends (804), to the previous cellular network operator, a notification that indicates the presence of an emulated device register with which the mobile device 102 is connected. In other words, the communication management system 110 appears to the previous cellular network operator as another device register managing a range of communication profiles (e.g., IMSI and MSISDN) assigned to the communication management system 110 by the previous cellular network operator. In some embodiments, the emulated device register appears, to the previous cellular network operator, to be a native device register associated with the previous cellular network operator. It should be understood that a typical cellular network operator has a plurality of native device registers (e.g., a home location register and one or more visiting location registers), as described in greater detail above with reference to FIG. 1B. Thus, the communication management system 110 can emulate one of the native device registers using a server module that can be addressed in a similar fashion to the device registers of the previous cellular network operator and provides responses in the format provided by the native device registers of the previous cellular network operator. In accordance with some embodiments, requests addressed to the server module are processed by a signal routing gateway (e.g., 120 in FIG. 1D), as discussed in greater detail above with reference to FIGS. 1D and 6. In some embodiments, the device register of the previous cellular network operator that is emulated by the emulated device register is (805) a visiting location register (VLR).

The previous cellular network operator registers (806) the emulated device register as a part of the previous cellular network operator, and notes that the mobile device 102 is currently connected to the emulated device register. In other words, the emulated device register is treated by the previous cellular network operator as a native device register (e.g., VLR) within the previous cellular network operator, and it appears to the previous cellular network operator, that the mobile device 102 is connected to the previous cellular network operator at the emulated device register. Thus, when the previous cellular network operator receives (808) a call for the mobile device 102, the previous cellular network operator determines whether the route to the mobile device 102 uses the emulated device register. When route does not use (810) the emulated device register (e.g., when the mobile device 102 is connected to a device register that is operated by the previous cellular network operator), the previous cellular network operator connects (812) the call using the route that does not use the emulated device register. In other words, if the mobile device 102 is connected directly with the previous cellular network operator, the call is routed using the standard routing procedures of the previous cellular network operator (e.g., using one of the native device registers).

However, if the route does (814) use the emulated device register, the previous cellular network operator requests (815) routing information for the mobile device 102 from the emulated device register. The communication management system 110 receives (816) the request for routing information for the mobile device 102. It should be understood that, while the request for routing information is actually transferred to the communication management system 110, the previous cellular network operator is not aware that the request for routing information is being transferred outside of the network operated by the previous cellular network operator. Rather, to the previous cellular network operator, the request appears to have been sent to a device register controlled by the previous cellular network operator. In accordance with some embodiments, the request is directed (818) to the home location register (e.g., 122 in FIG. 3) of the communication management system 110 by the signal routing gateway (e.g., 120 in FIG. 3). It should be understood that, in accordance with some embodiments, the request that is received from the previous cellular network operator uses a second communication profile for the mobile device 102, the second communication profile being associated with the previous cellular network operator.

In some embodiments, after receiving the request, the communication management system 110 determines that the first communication profile is not a currently active communication profile for the mobile device 102. When it is determined that the first communication profile is not a currently active communication profile for the mobile device 102, the communication management system 110 searches for the currently active communication profile for the mobile device 102. In some embodiments there is only a single currently active communication profile for a mobile device 102 at any one time. In some embodiments, searching for the currently active communication profile includes searching subscriber information (e.g., 340 in FIGS. 3-4) for a subscriber account that is associated with the first communication profile and, after identifying the subscriber account that is associated with the first communication profile, determining a currently active communication profile associated with the subscriber account. Thus, the communication management system 110 identifies, based on the first communication profile, a second communication profile that is an active communication profile for the mobile device 102 (e.g., using the subscriber identity information 340 as described in greater detail above). In accordance with some embodiments, the second communication profile is associated with a current cellular network operator for the mobile device 102 that is distinct from the previous cellular network operator.

After receiving the request and, in some embodiments, identifying the second communication profile, the communication management system 110 determines (820) routing information associated with the second communication profile. In some embodiments, determining the call route information includes requesting (824) routing information from the current cellular network operator. In accordance with some embodiments, the request is from a home location register (e.g., 122 in FIG. 3) of the communication management system 110. Typically the request includes the current registration information (e.g. MSISDN) and/or communication profile (e.g., IMSI) for the mobile device 102. The current cellular network operator receives (824) the request for routing information for the mobile device 102, retrieves routing information (e.g., from a device register such as a visiting location register with which the mobile device 102 is currently attached). In some embodiments, the request to the current cellular network operator is directed to (826) a device register such as a visiting location register (VLR) within the current cellular network operator. Typically, the routing information includes a mobile station roaming number (MSRN) and/or device status with the current mobile switching center (MSC) with which the mobile device 102 is attached. The current cellular network operator sends (828) the routing information (e.g., MSRN status) to the communication management system 110. In response to the request for routing information, the communication management system 110 receives (830) the routing information from the current cellular network operator. In other words, in some embodiments, the routing information that is determined by the communication management system 110 is routing information that was received from the current cellular network operator.

It should be understood that the current cellular network operator is typically unaware of the emulated device register. Rather, the interaction of the current cellular network operator has its own device registers, and thus does not need to request routing information from an emulated device register so long as the mobile device 102 is connected to the current cellular network operator (e.g., connected to a device register of the current cellular network operator). Instead, the current cellular network operator responds to requests for routing information to the mobile device 102. Consequently, while the previous cellular network operator and the current cellular network operator both interact with the communication management system 110, the communication management system 110 appears differently to each of the cellular network operators. In particular, in some embodiments, the previous cellular network operator interacts with the communication management system 110 as an emulated device register (e.g., an emulated VLR), while the current cellular network operator interacts with the communication management system 110 by receiving requests from a server module (e.g., HLR 122 in FIG. 1A) of the communication management system 110 and has no interaction with the emulated device register (e.g., the emulated VLR).

In some embodiments, after determining routing information for the mobile device 102, the home location register (e.g., 122 in FIG. 3) of the communication management system 110 transfers (830) the response to the emulated device register, which sends (832), to the previous cellular network operator, a reply comprising the routing information associated with the second communication profile (e.g., the MSRN received from the current cellular network operator). The previous cellular network operator receives (834) the current routing information for the mobile device 102 from the emulated device register as though the emulated device register were a native server module associated with the previous cellular network operator. After receiving the routing information, the previous cellular network operator places (836) a call to the mobile device 102 using the received routing information. In other words, the previous cellular network operator attempts to connect the call that was received for the mobile device 102 using the first communication profile at the previous cellular network operator through current cellular network operator using the current routing information for mobile device 102. The current cellular network operator receives the communication from the previous cellular network operator and connects (838) the call using the current routing information.

It should be understood that, in accordance with some embodiments, the request for routing information is performed directly between the communication management system 110 and the current cellular network operator without any involvement by the previous cellular network operator 110. In fact, in some embodiments, the previous cellular network operator is completely unaware that the mobile device 102 is associated with the second communication profile. Rather, the communication management system 110 keeps track of the various communication profiles of the mobile device 102 and manages the transfer of routing information associated with the mobile device 102 between different cellular network operators (e.g., using the subscriber identity information 340 in the HLR 122 in FIGS. 3-4).

Moreover, in some embodiments, the previous cellular network operator also acts as though it is requesting routing information from a native component of its infrastructure (e.g., a native VLR). In accordance with some embodiments, generating an emulated device register (e.g., an emulated VLR) for communicating routing information to a cellular network operator is advantageous because it enables the cellular network operator to request and receive routing information using the internal procedures that are already in place rather than generating new external procedures to handle requests for routing information to entities (e.g., the communication management system 110) that are outside of the cellular network operator.

As an example of the operation of an emulated device register, a mobile device 102 which was previously connected with CHINAMOBILE while in China is relocated to India and connects with AIRTEL. A communication management system 110 sends a communication to CHINAMOBILE indicating that there is a new device register (the emulated device register) that is a part of the CHINAMOBILE network and that the mobile device 102 is connected with the emulated device register. When CHINAMOBILE receives a phone call for the CHINAMOBILE phone number of mobile device 102, CHINAMOBILE queries the emulated device register for a route to the mobile device 102 as though the emulated device register were a native device register (e.g., a native VLR) of the CHINAMOBILE network. The communication management system 110 receives the request, retrieves the routing information for the mobile device 102 from AIRTEL (e.g., by submitting a request from an HLR of the communication management system 110 to a VLR of AIRTEL), and transmits the routing information to CHINAMOBILE via the emulated device register.

Figure 9A:
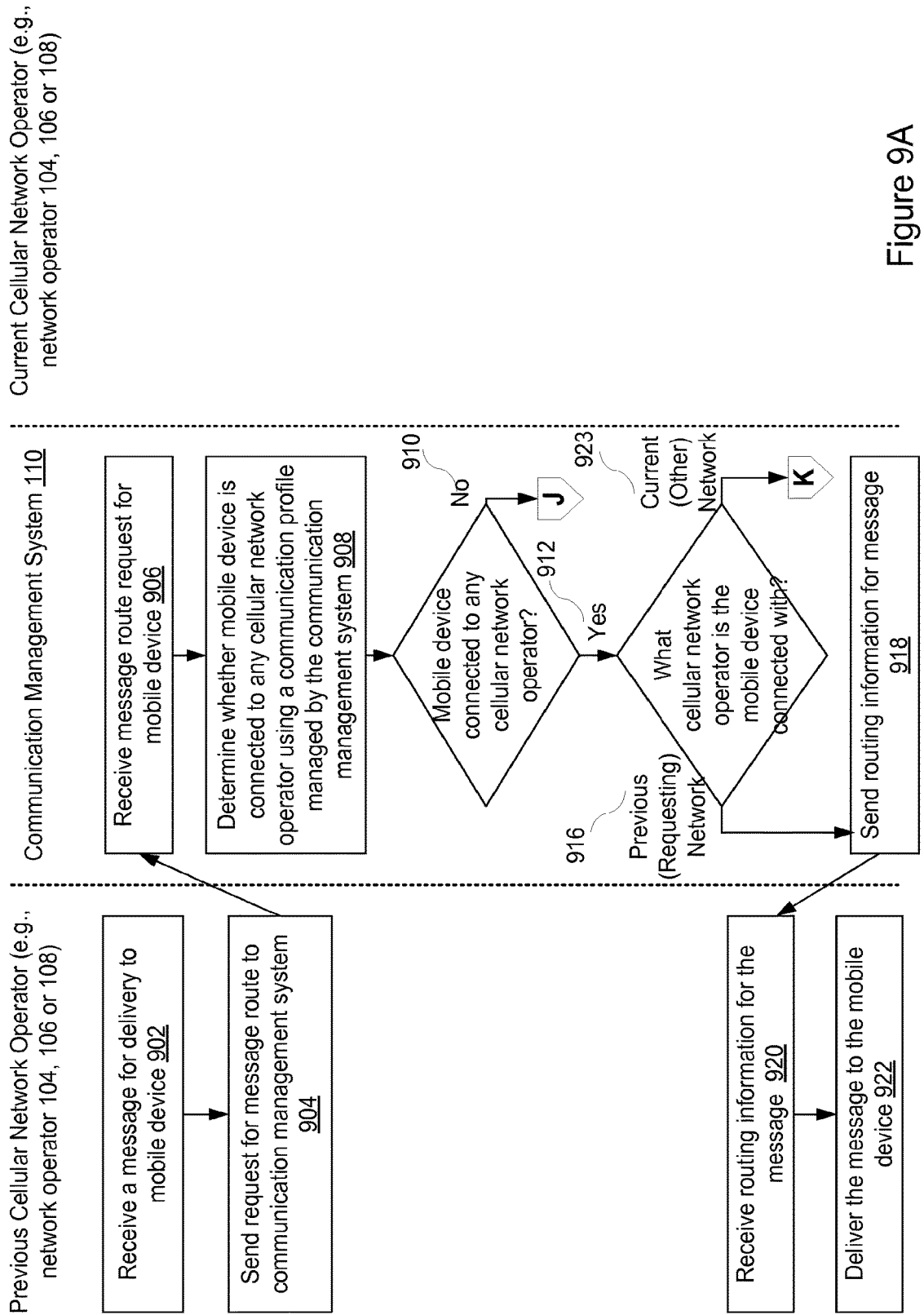
Figure 9C:
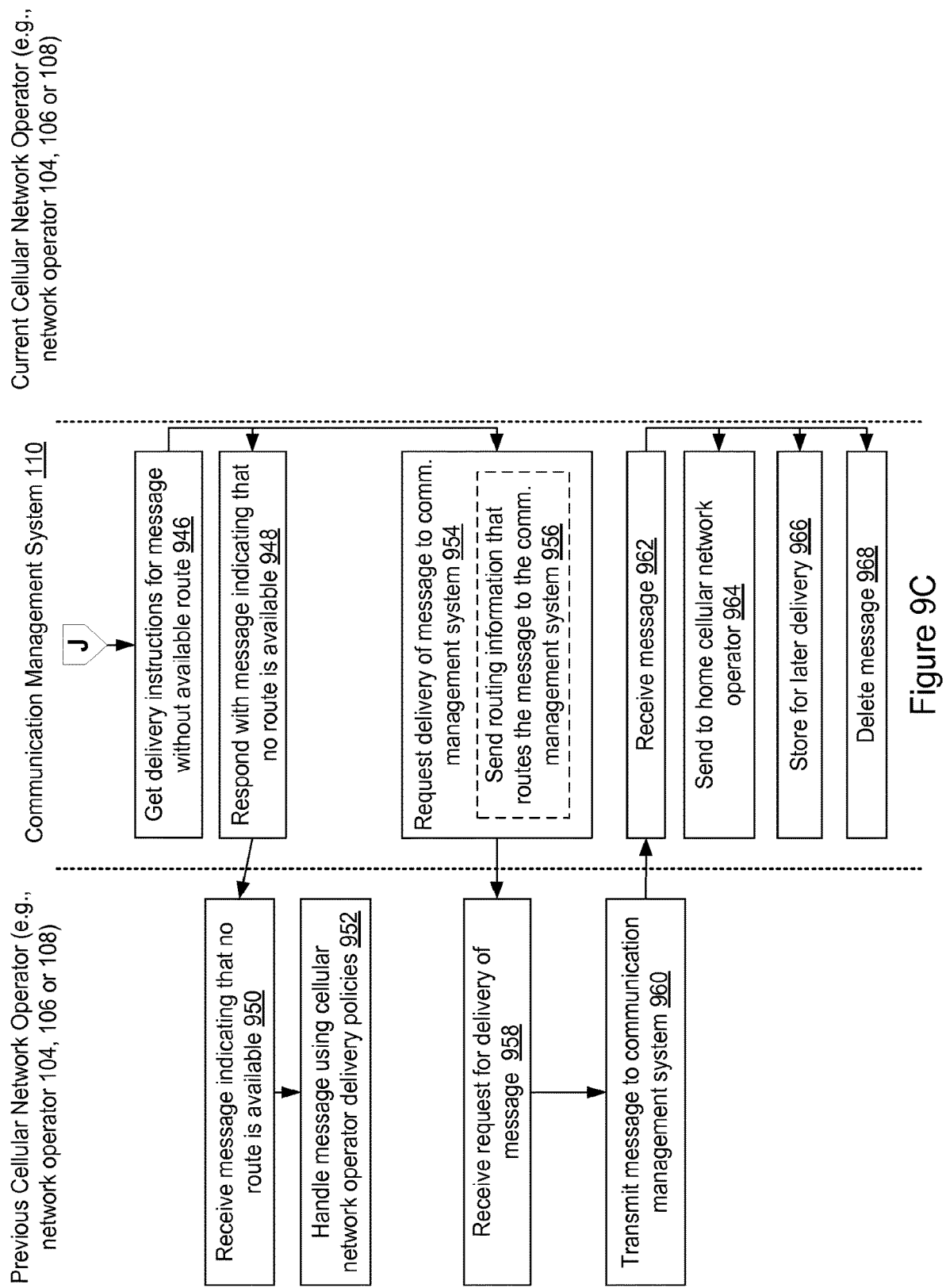

Attention is now directed towards FIGS. 9A-9C, which illustrate a process 900 for routing a message to a mobile device (e.g., 102 in FIGS. 1A, 2) associated with multiple communication profiles by replacing communication profile information in the message in accordance with some embodiments. In accordance with some embodiments, the mobile device 102 is registered with a current cellular network operator (e.g., global cellular network operator 106, and/or local cellular network operator 108), as described in greater detail above with reference to FIGS. 5A-5D). In some embodiments the mobile device 102 was previously registered with a previous cellular network operator (e.g., home cellular network operator 104, global cellular network operator 106, or local cellular network operator 108). In some embodiments, the mobile device 102 is associated with a first communication profile for the previous cellular network operator and is also associated with a second communication profile for the current cellular network operator. In accordance with some embodiments, these communication profiles and other subscriber information is stored in a home location register (e.g., 122 in FIG. 3) of the communication management system 110, as described in greater detail above.

In some embodiments, the previous cellular network operator, or a short message service center within the cellular network operator, receives (902) a message (e.g., an SMS or EMS message) for delivery to the mobile device 102. The previous cellular network operator determines that the mobile device 102 is connected with the communication management system (e.g., 110 in FIGS. 1A, 3), and sends (904) a request for a message route to the communication management system 110. The communication management system 110 receives (906), from a first cellular network operator, a request for routing information for a message (e.g., the SMS or EMS message) that is addressed to a mobile device 102 using a first communication profile (e.g., a communication profile associated with the previous cellular network operator).

In accordance with some embodiments, the communication management system 110 determines (908) whether the mobile device 102 is connected to any cellular network operator using a communication profile managed by the communication management system 110. In some embodiments, when the communication management system 110 determines that the mobile device 102 is not connected with the previous cellular network operator using the first communication profile, the communication management system 110 searches for an active communication profile that is currently being used by the mobile device 102. If the mobile device 102 is not (910) connected to any of the cellular network operators managed by the communication management system 110 (i.e., the communication management system 110 does not have any route to the mobile device 102), then the communication management system 110 performs one or more operations in accordance with subscriber preferences (e.g., from the subscriber accounts 344 in FIG. 3), as described in greater detail below with reference to operations 946-962.

If the mobile device 102 is (912) connected to at least one of the cellular network operators (i.e., the communication management system 110 has at least one available route to the mobile device 102), then the communication management system 110 determines what cellular network operator the mobile device 102 is connected with. In some embodiments, when the communication management system 110 determines that the mobile device 102 is connected to (916) the previous cellular network operator (e.g., the requesting cellular network operator) using the first communication profile, the communication management system 110 responds to the request by sending (918) routing information to route the message to the mobile device 102 within the previous cellular network. The previous cellular network operator receives (920) the routing information for the message and delivers (922) the message to the mobile device 102 using the routing information.

However, in some embodiments, when the communication management system 110 determines that the mobile device 102 is connected to (923) the current cellular network operator (e.g., a cellular network operator other than the requesting cellular network operator) using a second communication profile (e.g., that is distinct from the first communication profile), the communication management system 110 responds to the request by retrieving the message, readdressing the message and forwarding the message to the current cellular network, as described in greater detail below.

Specifically, in some embodiments, the communication management system 110 requests (924), delivery of the message to the communication management system 110 from the previous cellular network operator. In some embodiments, requesting delivery of the message to the communication management system 110 comprises sending (926) routing information to the previous cellular network operator that routes the message to the communication management system 110. In other words, in some embodiments, the communication management system 110 communicates delivery instructions to the previous cellular network that indicate that the mobile device 102 is connected with a SMSC (e.g., 128 in FIG. 3) of the communication management system 110 even when the mobile device 102 is not actually connected with the SMSC of the communication management system 110. The previous cellular network operator receives (928) the request for delivery of the message to the communication management system 110, and in response transmits (930) the message to the communication management system 110.

The communication management system 110 receives (932) the message from the first cellular network operator. In some embodiments, the message is addressed (933) using the first communication profile (e.g., a communication profile that is associated with the previous cellular network operator, such as an MSISDN or phone number used by the previous cellular network operator to identify the mobile device 102). In some embodiments, after receiving the message, the communication management system 110 modifies (934) the message by replacing a first network-specific identifier associated with the first communication profile (e.g., the communication profile associated with the previous cellular network operator) with a second network-specific identifier associated with the second communication profile (e.g., the communication profile associated with the current cellular network operator).

In accordance with some embodiments, once the communication management system 110 has received the message and modified the message, the communication management system 110 sends (940) the message to the second cellular network operator for delivery to the mobile device 102 with a modified address. In some embodiments, the message is addressed using the second communication profile (e.g., a communication profile that is associated with the current cellular network operator, such as an MSISDN or phone number used by the current cellular network operator to identify the mobile device 102). In some embodiments, the second communication profile is distinct from the first communication profile. In other words, the communication management system 110 passes along the content of the message, but readdresses the message using the communication profile that is currently being used by the mobile device 102, so as to ensure that the message will be properly delivered by the current cellular network operator. The current cellular network operator receives (942) the modified message for delivery to the mobile device 102 and delivers (944) the modified message to the mobile device 102.

As one example of this process, an SMS is originally addressed to the mobile device 102 using a phone number (e.g., 130-1390-1111) associated with CHINAMOBILE is received by CHINAMOBILE, however the mobile device 102 is currently connected with AIRTEL and is using phone number 033-15327380. Thus, CHINAMOBILE forwards the SMS to the communication management system 110, the communication management system determines the current phone number (e.g., 130-1390-1111) for the mobile device 102 based on the phone number that was originally used to address the SMS (e.g., 033-15327380). Subsequently, the communication management system 110 replaces the 130-1390-1111 number with 033-15327380 and sends the readdressed SMS to AIRTEL for delivery to the mobile device 102. It should be understood that, in accordance with some embodiments, merely forwarding the message without modifying the address would result in the current cellular network operator (e.g., AIRTEL) being unable to deliver the message to the mobile device 102, because the current cellular network operator (e.g., AIRTEL) does not have any way of matching the first communication profile (e.g., the CHINAMOBILE communication profile) with the mobile device 102.

In accordance with some embodiments, when the mobile device 102 is not connected to any of the cellular network operators managed by the communication management system 110 (i.e., the communication management system 110 determines that the mobile device 102 is not currently using any of the plurality of communication managed by the communication management system 110), the communication management system 110 gets (946) delivery instructions for a message without an available route. In some embodiments the delivery instructions are stored as subscriber preferences in the subscriber accounts (e.g., 344 in FIG. 3) at the communication management system 110.

In some embodiments, the delivery instructions include instructions to respond (948) to the request for a route with a message indicating that no route is available to the mobile device 102. The previous cellular network operator receives (950) the message indicating that no route is available to the mobile device 102 through the communication management system 110 and then handles (952) the message using the delivery policies of the previous cellular network operator. Typically, the previous cellular network operator will hold the message for a period of time, and re-try the procedure as described above, or simply drop the message.

In accordance with some embodiments, even when a route to the mobile device 102 is not available at the communication management system 110, the communication management system 110 requests (954) delivery of the message to the communication management system 110. It should be understood that, in some embodiments, receiving the message at the communication management system 110 even when the mobile device 102 is not connected with a communication network managed by the communication management system 110 is advantageous, because the communication management system 110 typically monitors multiple different communication profiles for the mobile device 102, and is thus more likely than the previous cellular network operator to have a valid route to the mobile device 102 in the future than that the previous cellular network operator will have a valid route to the mobile device 102, because the previous cellular network operator is only aware of a single communication profile for the mobile device 102.

In some embodiments, the communication management system 110 requests (954), delivery of the message to the communication management system 110 from the previous cellular network operator. In some embodiments, requesting delivery of the message to the communication management system 110 comprises sending (956) routing information to the previous cellular network operator that routes the message to the communication management system 110. In other words, in some embodiments, the communication management system 110 communicates delivery instructions to the previous cellular network operator that indicate that the mobile device 102 is connected with an SMSC (e.g., 128 in FIG. 3) of the communication management system 110 even when the mobile device 102 is not actually connected with the SMSC of the communication management system 110. In some embodiments, the previous cellular network operator receives (958) the request for delivery of the message to the communication management system 110, and in response transmits (960) the message to the communication management system 110. In some embodiments, the communication management system 110 receives (962) the message from the first cellular network operator.

In accordance with some embodiments, the communication management system 110 identifies, based on the message, a home communication profile associated with the mobile device 102. In some embodiments, the message is addressed using the first communication profile (e.g., the communication profile associated with the previous cellular network operator), and the communication management system 110 finds the subscriber identity information (e.g., 340 in FIGS. 3-4) associated with the first communication profile and identifies a home communication profile within the subscriber identity information (e.g., a home IMSI and/or home MSISDN).

In some embodiments, the home communication profile is distinct from the communication profiles in the plurality of communication profiles. In some embodiments, the home communication profile is not managed by the communication management system 110. In some embodiments the home communication profile is managed by the home cellular network operator. It should be understood that, in accordance with some embodiments, a respective communication profile is managed by the communication management system 110 when a request to register the mobile device 102 for connection to a respective cellular network operator using the respective communication profile is relayed from the respective cellular network operator to the communication management system 110 for authentication (e.g., as illustrated with both the global communication profile and the local communication profile discussed above with reference to FIGS. 5A-5D).

In some embodiments, the subscriber preferences (e.g., delivery instructions) include instructions to retrieve the message from the previous cellular network operator and process the message by communicating with the home cellular network operator (e.g., the cellular network operator that manages the home communication profile). In some embodiments, communicating with the home cellular network operator includes sending (964) the message to the home cellular network operator for delivery to the mobile device 102 (e.g., the message is modified by replacing the first communication profile in the message with the home communication profile and the modified message is sent to the home cellular network operator). In some embodiments, communicating with the home cellular network operator includes notifying the home cellular network operator that a message has been received and requesting further instructions.

In some embodiments, the plurality of communication profiles (e.g., the first communication profile and the second communication profile) are communication profiles that have been temporarily assigned to the mobile device 102 by the communication management system 110, while the home communication profile is permanently associated with the mobile device 102. As discussed in greater detail above, in some embodiments, the home cellular network operator is a primary cellular network operator for the mobile device 102. Thus, typically, the mobile device 102 will connect to the home cellular network operator on a regular basis. As such, it is advantageous to retrieve a message from the previous cellular network operator and deliver the message to the home cellular network operator, because the mobile device 102 is more likely to receive the message from the home cellular network operator than it is to receive the message from the previous cellular network operator.

In some embodiments, the communication management system 110 stores (966) the message for later delivery to the mobile device 102. For example, the communication management system 110 stores the message for one week, or until the next time that the mobile device 102 connects with a cellular network operator using a respective communication profile managed by the communication management system 110. In these embodiments, when the communication management system 110 detects that the mobile device 102 has connected to a cellular network operator using the respective communication profile, the message is sent to the cellular network operator for delivery to the mobile device 102 (e.g., the message is modified by replacing the first communication profile in the message with the respective communication profile and the modified message is sent to the cellular network operator). In some embodiments the message is deleted (968), either immediately or after a period of time has elapsed without the mobile device 102 connecting with a cellular network operator using a communication profile managed by the communication management system 110.

Figure 10A:
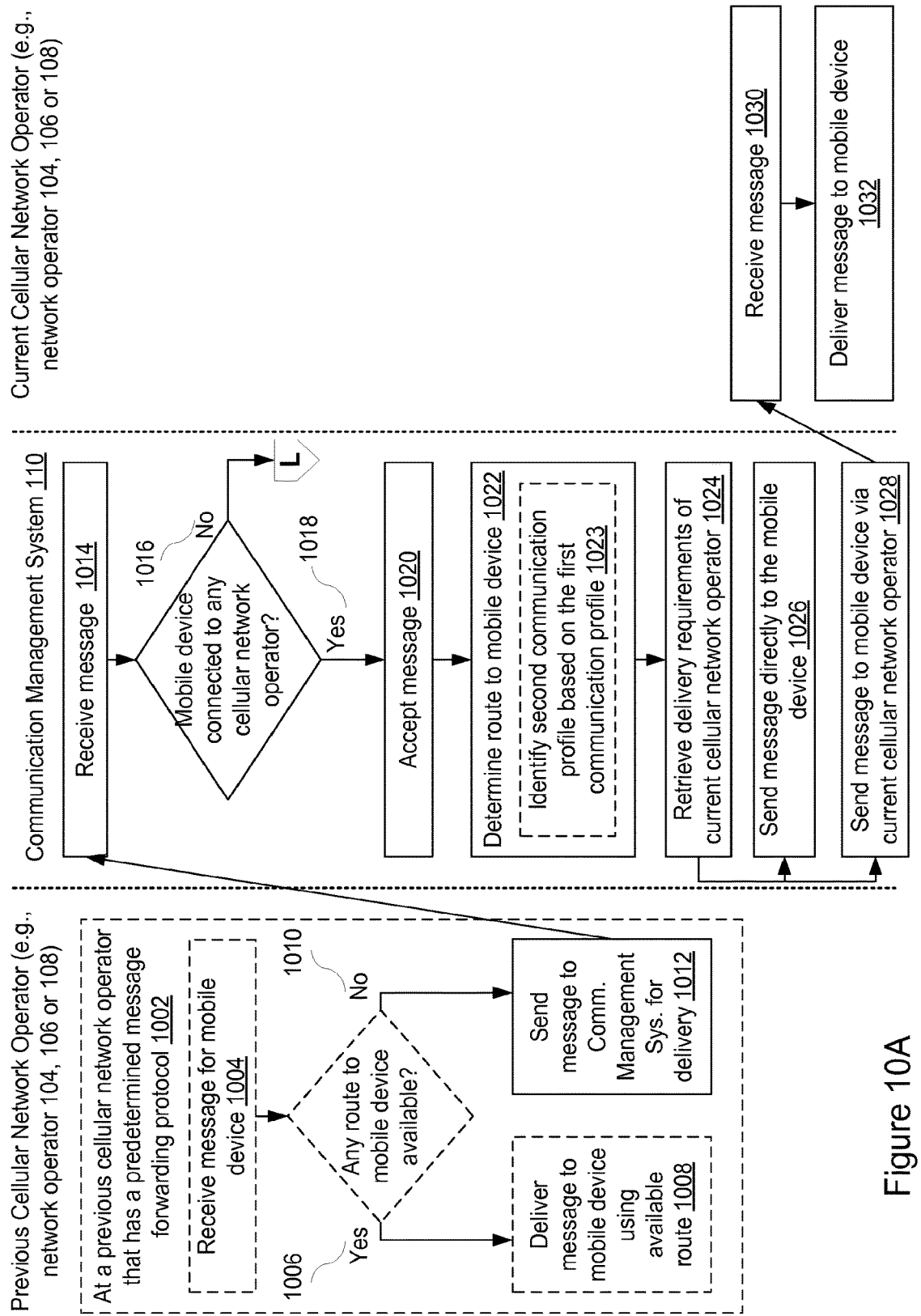
FIGS. 10A-10B are flow diagrams illustrating a process for routing a message to a mobile device associated with multiple communication profiles by managing forwarded messages in accordance with some embodiments.
Figure 10B:
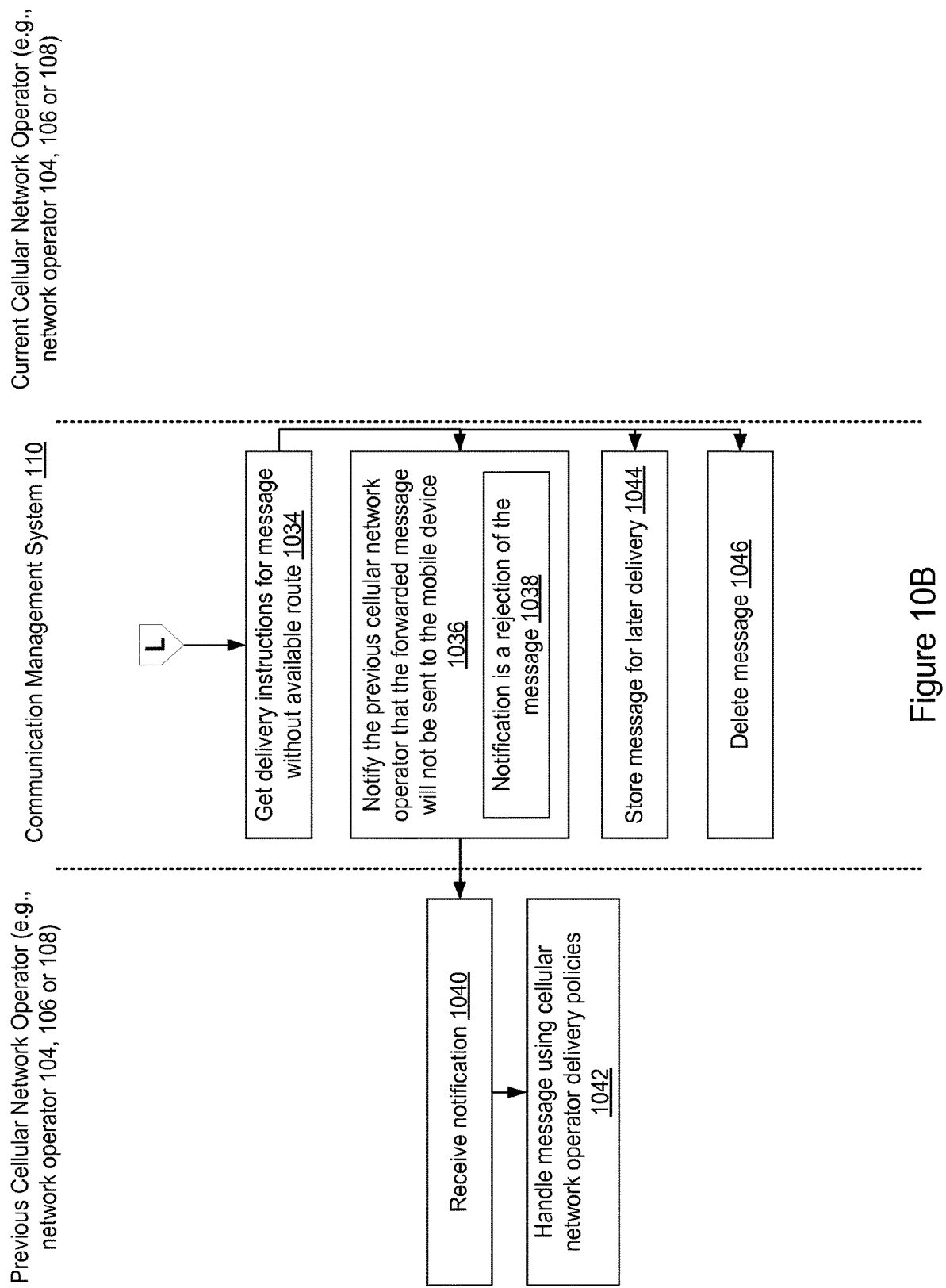
Figure 11A:
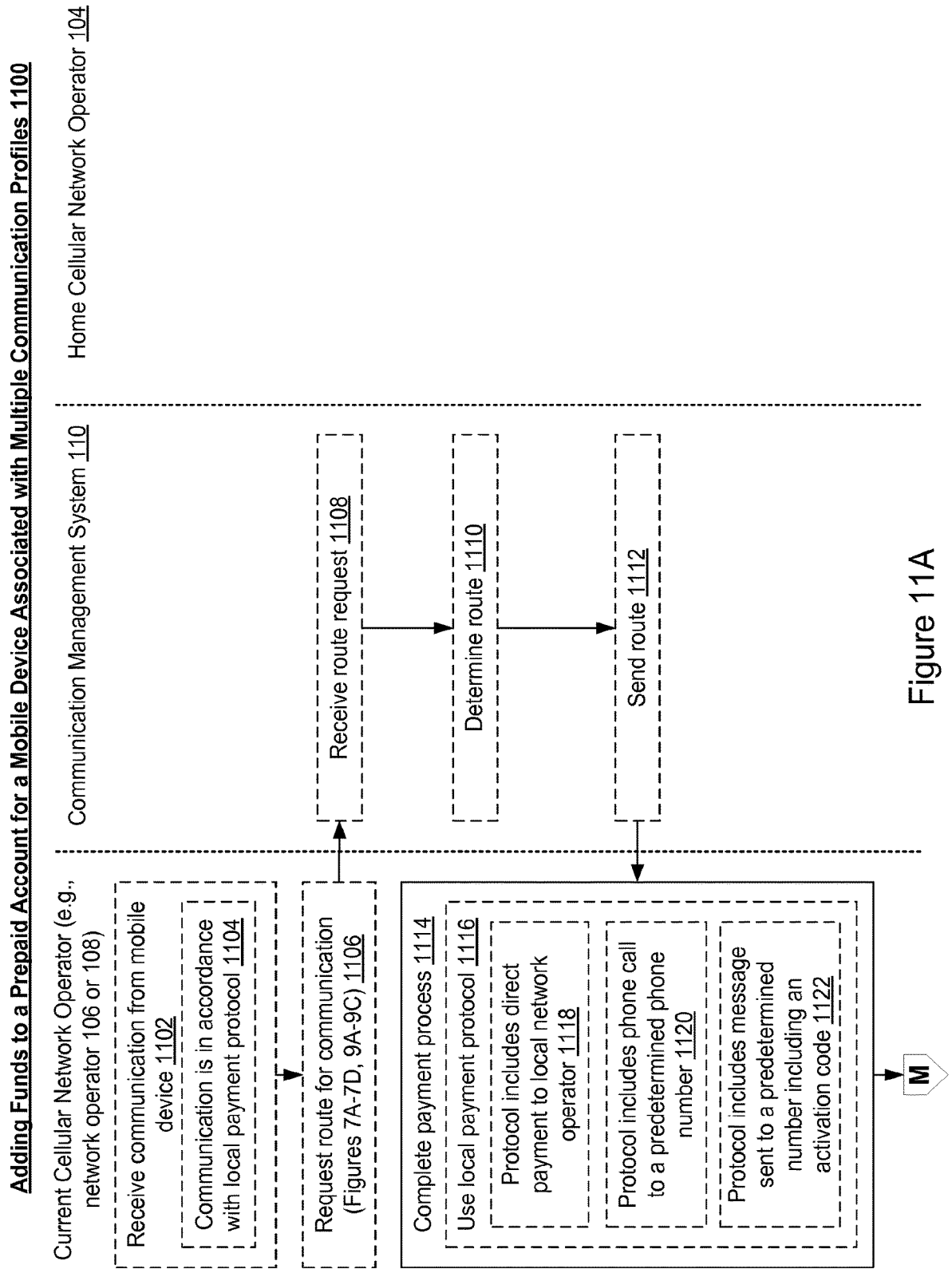
FIGS. 11A-11D are flow diagrams illustrating a process for adding funds to a prepaid account for a mobile device associated with multiple communication profiles in accordance with some embodiments.
Figure 11B:
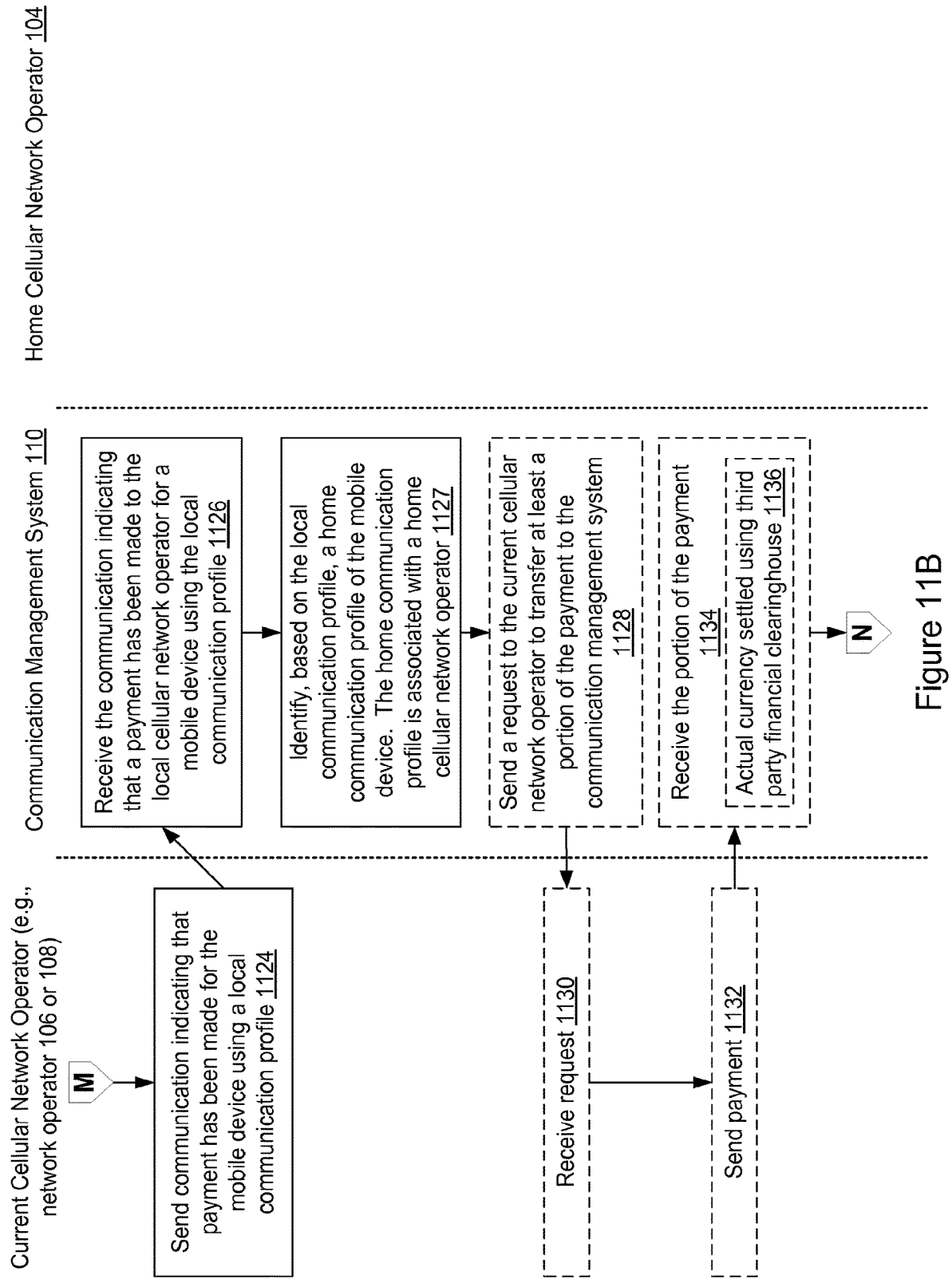
Figure 11C:
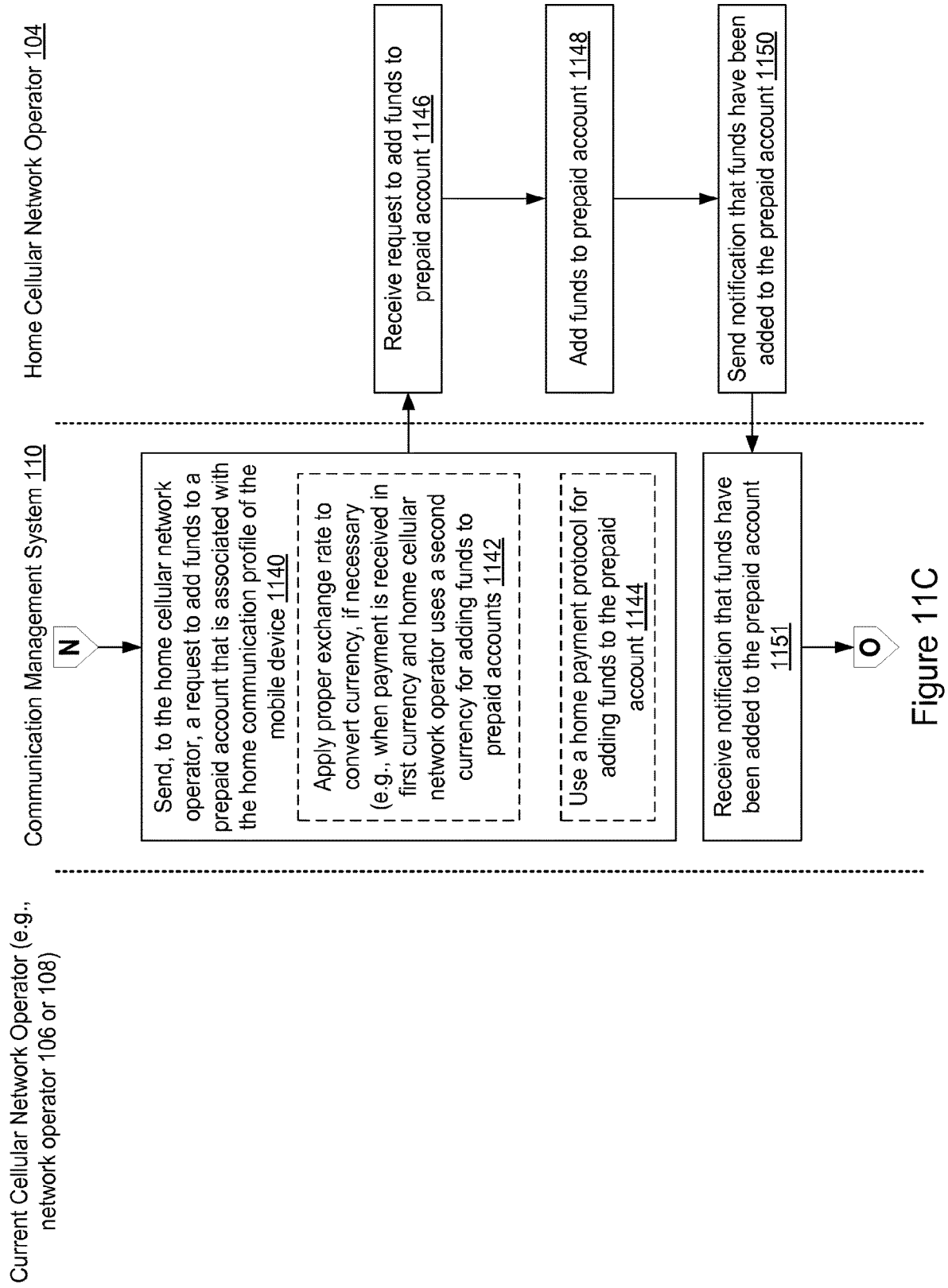
Figure 11D:
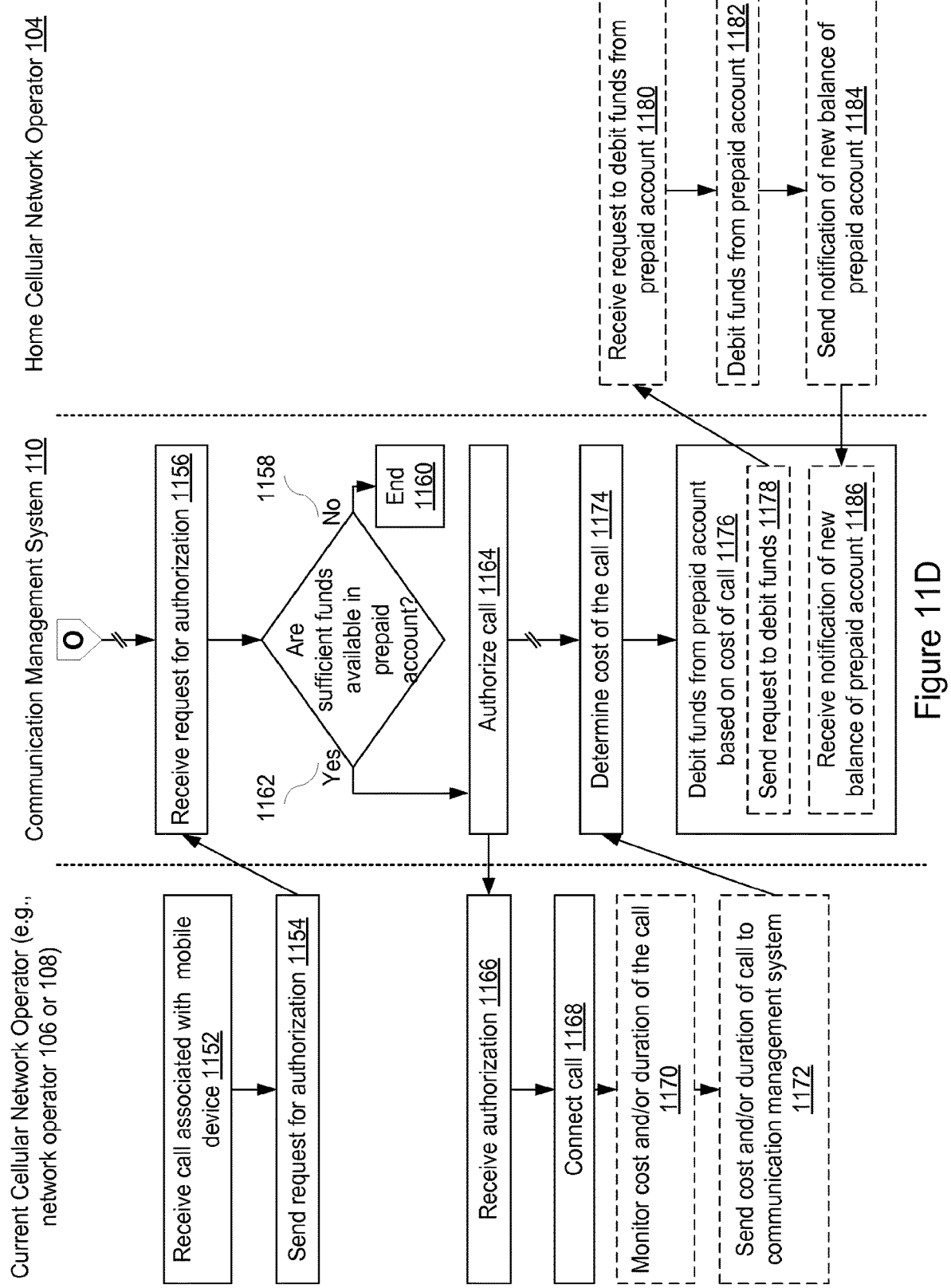

Attention is now directed towards FIGS. 10A-10B, which illustrate a process 1000 for routing a message to a mobile device (e.g., 102 in FIG. 1A, 2) associated with multiple communication profiles by managing forwarded messages in accordance with some embodiments. In accordance with some embodiments, a mobile device 102 is registered with a current cellular network operator (e.g., global cellular network operator 106, and/or local cellular network operator 108), as described in greater detail above with reference to FIGS. 5A-5D). In some embodiments the mobile device 102 was previously registered with a previous cellular network operator (e.g., home cellular network operator 104, global cellular network operator 106, or local cellular network operator 108). In some embodiments, the mobile device 102 is associated with a first communication profile for the previous cellular network operator and is also associated with a second communication profile for the current cellular network operator. In accordance with some embodiments, these communication profiles and other subscriber information is stored in a home location register (e.g., 122 in FIG. 3) of the communication management system (e.g., 110 in FIGS. 1A, 3), as described in greater detail above.

In accordance with some embodiments, the previous cellular network operator has (1002) a predetermined message forwarding protocol for forwarding messages to the communication management system 110. It should be understood that typically the home cellular network operator is the previous cellular network operator with a predetermined message forwarding protocol. In these embodiments, when the previous cellular network operator receives (1004) a message (e.g., an SMS/EMS) for the mobile device 102, the previous cellular network operator determines if any route is currently available to the mobile device 102. If a route is (1006) available to the mobile device 102, then the previous cellular network operator delivers (1008) the message to the mobile device 102 using the available route. However, if no route is available (1010) the previous cellular network operator sends (1012) the message to a communication management system 110 for delivery to the mobile device 102 by the communication management system 110. It should be understood that, rather than merely asking the communication management system 110 for routing information for the message, the previous cellular network operator sends (e.g., forwards) the message to the communication management system 110. Additionally, in some embodiments, when a message is received for a mobile device 102 which the previous cellular network operator determines is associated with communication management system 110, the message is also sent to the communication management system 110 for delivery to the mobile device 102.

The communication management system 110 receives (1014), from the previous cellular network operator (e.g., a home cellular network operator), a message (e.g., a forwarded message) addressed to a mobile device 102 using a communication profile for the mobile device 102, where the communication profile is associated with the previous cellular network operator (e.g., the home cellular network operator). In some embodiments the previous cellular network operator has a predetermined message forwarding protocol for forwarding messages to the communication management system 110 when the mobile device 102 is unreachable by the previous cellular network operator.

After receiving the message, the communication management system 110 determines whether the mobile device 102 is connected to any cellular network operator using a communication profile that is managed by the communication management system 110. When the communication management system 110 determines that the mobile device 102 is not connected (1016) to any cellular network operator (e.g., the mobile device 102 is not actively using a respective local communication profile of the plurality of communication profiles managed by the communication management system 110), the communication management system 110 performs one or more operations in accordance with subscriber preferences (e.g., from the subscriber accounts 344 in FIG. 3), as described in greater detail below with reference to operations 1034-1044.

When the communication management system 110 determines that the mobile device 102 is (1018) connected to one of the cellular network operators (e.g., is actively using a respective local communication profile of the plurality of communication profiles managed by the communication management system 110), the communication management system 110 sends the message to the mobile device 102 using a communication profile of the plurality of communication profiles (e.g., a communication profile associated with the current cellular network operator). In particular, after determining that the mobile device 102 is connected to one of the plurality of cellular network operators (e.g., using a communication profile managed by the communication management system 110) the communication management system 110 accepts (1020) the message and determines (1022) a route to the mobile device 102.

In some embodiments, the message is addressed using a first communication profile (e.g., a communication profile associated with the previous cellular network operator), and the mobile device 102 is currently connected with a current cellular network operator using a second communication profile. In some of these embodiments, determining a route to the mobile device 102 includes identifying (1023) the second communication profile based on the first communication profile (e.g., using the subscriber identity information 340 in the HLR 122 of the communication management system 110), as described in greater detail above with reference to FIGS. 7A-7D).

It should be understood that, in accordance with some embodiments, when the previous cellular network operator is the home cellular network operator, the first communication profile is a home communication profile that is managed by the home cellular network operator, while the second communication profile is a local communication profile that is managed by the communication management system 110 (e.g., for a local cellular network operator). Additionally, in some of these embodiments, the home communication profile is permanently associated with the mobile device 102; and the local communication profile is a communication profile that has been temporarily assigned to the mobile device 102 by the communication management system 110. Additionally, as described in greater detail above, it should be understood that a respective communication profile of the plurality of communication profiles is managed by the communication management system 110 when a request to register the mobile device 102 for connection to a respective cellular network operator using the respective communication profile is relayed from the respective cellular network operator to the communication management system 110 for authentication.

In some embodiments, after determining a route to the mobile device 102, the communication management system 110 retrieves (1024) delivery requirements of the current cellular network operator (e.g., message size limits, message frequency limits, message formatting requirements). In some embodiments, current cellular network operator is associated with a second communication profile (e.g., a local communication profile), and sending the message to the mobile device 102 using the second communication profile includes sending (1026) the message directly to the mobile device 102 using the second communication profile. In some embodiments, the second communication profile is associated with a current cellular network operator (e.g., a local cellular network operator), and sending the message to the mobile device 102 using the second communication profile includes sending (1028) the message to the current cellular network operator, where the message is addressed to the mobile device 102 using the second communication profile. In some of these embodiments, the current cellular network operator receives (1030) the message and delivers (1032) the message to the mobile device 102.

In accordance with some embodiments, when the mobile device 102 is not connected to any of the cellular network operators managed by the communication management system 110 (i.e., the communication management system 110 determines that the mobile device 102 is not currently using any of the communication profiles of the plurality of communication profiles managed by the communication management system 110), the communication management system 110 gets (1034) delivery instructions for a message without an available route. In some embodiments the delivery instructions are stored as subscriber preferences in the subscriber accounts (e.g., 344 in FIG. 3) at the communication management system 110.

In some embodiments, the delivery instructions include instructions to respond (1036) to the request for a route with a message notifying the previous cellular network operator (e.g., the home cellular network operator) that the forwarded message will not be sent to the mobile device 102. In some embodiments, the notification is a rejection (1038) of the message. In some embodiments, the notification is a message indicating that no route is currently available to the mobile device 102 and that the message will be stored for later delivery. The previous cellular network operator receives (1040) the notification indicating that the message will not be sent to the mobile device 102 and then handles (1042) the message using the delivery policies of the previous cellular network operator. Typically, the previous cellular network operator will hold the message for a period of time, and re-try the procedure as described above, or simply drop the message.

In some embodiments, the communication management system 110 stores (1044) the message for later delivery to the mobile device 102. For example, the communication management system 110 stores the message for one week or until the next time that the mobile device 102 connects with a cellular network operator using a respective communication profile managed by the communication management system 110. In these embodiments, when the communication management system 110 detects that the mobile device 102 has connected to a cellular network operator using the respective communication profile, the message is sent to the cellular network operator for delivery to the mobile device 102 (e.g., the message is modified by replacing the first communication profile in the message with the respective communication profile and the modified message is sent to the cellular network operator). In some embodiments the message is deleted (1046), either immediately or after a period of time has elapsed without the mobile device 102 connecting with a cellular network operator using a communication profile managed by the communication management system 110.

As one example of some of the embodiments described above, a mobile device 102 has a home communication profile that is associated with a home cellular network operator (e.g., CELLULARONE) and a local communication profile that is associated with a local cellular network operator (e.g., AIRTEL). When CELLULARONE receives an SMS for the mobile device 102 (addressed using the home communication profile) CELLULARONE first attempts to send the SMS via the CELLULARONE network. If CELLULARONE is unable to deliver the SMS (e.g., because the mobile device 102 is not connected to any MSC/VLR on the CELLULARONE network), then CELLULARONE forwards the SMS to the communication management system 110 per a predefined forwarding policy. If the communication management system 110 determines that the mobile device 102 is connected with AIRTEL, then the SMS is sent to AIRTEL for delivery to the mobile device 102. However, if the communication management system 110 determines that the mobile device 102 is not currently connected with any cellular network operator, then the communication management system 110 rejects the forwarded SMS that was received from CELLULARONE. Once the forwarded SMS has been rejected CELLULARONE can determine further actions to take with respect to the message, per subscriber preferences.

It should be understood that the ability of the communication management system 110 to accept automatically forwarded messages, and reject the automatically forwarded messages when a mobile device 102 is unavailable is advantageous in accordance with some embodiments. In particular, the ability to reject automatically forwarded messages gives the communication management system 110 access to messages that are sent to the home communication network of a mobile device 102 and allows those messages to be forwarded to the mobile device 102 when the mobile device 102 is available through the communication management system 110, without losing messages by forwarding them to the communication management system 110 when the mobile device 102 is not available through communication management system 110. In other words, the ability of the communication management system 110 to reject forwarded messages reduces the problems associated with setting up a forwarding protocol for forwarding messages to the communication management system 110 when the mobile device 102 is not available at the home cellular network operator (e.g., by ensuring that messages that are sent to the communication management system 110 when the mobile device 102 is not available through the communication management system 110 are not lost).

Attention is now directed towards FIGS. 11A-11D, which illustrate a process 1100 for adding funds to a prepaid account for a mobile device (e.g., 102 in FIG. 1A, 2) associated with multiple communication profiles in accordance with some embodiments. In accordance with some embodiments, a mobile device 102 is registered with a current cellular network operator (e.g., global cellular network operator 106, and/or local cellular network operator 108), as described in greater detail above with reference to FIGS. 5A-5D). In some embodiments the mobile device 102 has a prepaid account associated with a different cellular network operator (e.g., home cellular network operator 104). In some embodiments, the mobile device 102 is associated with a communication profile for the current cellular network operator (e.g., a local communication profile for a local cellular network operator 108 or a global communication profile for a global cellular network operator 106) and is also associated with a communication profile for the current cellular network operator (e.g., a home communication profile for the home cellular network operator 104). In accordance with some embodiments, these communication profiles and other subscriber information is stored in a communication management system (e.g., 110 in FIGS. 1A, 3) or a HLR (e.g., 122 in FIG. 3) of the communication management system 110, as described in greater detail above.

In some embodiments, the current cellular network operator (e.g., global cellular network operator 106 or local cellular network operator 108) receives (1102) a communication from a mobile device 102. In some embodiments, the communication (e.g., a message such as an SMS or a phone call) is (1104) in accordance with a local payment protocol for adding funds to prepaid accounts associated with the current cellular network operator. In some embodiments the current cellular network operator requests (1106) a route for the communication from a communication management system 110. The communication management system 110 receives (1108) the route request, determines (1110) a route for the communication and sends (1112) the route to the current cellular network operator. In some embodiments the route request and determination is performed in accordance with the embodiments described in greater detail above (e.g., with reference to FIGS. 7A-7D and/or 9A-9C). In some embodiments, the communication is routed back to the current cellular network operator where the payment process is completed. For example, when the communication is an SMS message that includes an activation code for adding funds to a prepaid account in accordance with protocols of the current cellular network operator, the route for the SMS will direct the SMS back to the current cellular network operator for processing in accordance with the local payment protocol.

The current cellular network operator completes (1114) a payment process for adding funds to a prepaid account (e.g., by verifying that the current cellular network operator has received 2000 Rupee to be added to a prepaid account that enables the mobile device 102 to make phone calls at 4 Rupee per minute and send texts at 10 Rupee per text). In some embodiments, the payment process uses (1116) a local payment protocol for adding funds to prepaid accounts that is determined by the current cellular network operator. In other words, the subscriber can add funds to a central prepaid account managed by the home cellular network operator 104 using a local process for adding funds to prepaid accounts (e.g., the same payment process that would be used by a local mobile device that was associated with the current cellular network operator).

In some embodiments the current payment protocol includes (1118) direct payment to a current cellular network operator. For example, the subscriber could take the mobile device 102 to a retail location of the current cellular network operator, provide a payment at the store and have an employee at the store complete the fund addition process either by entering an activation code into the phone or updating a database for the current cellular network operator to indicate that the funds have been added to the prepaid account. As another example, the subscriber could access a website of the current cellular network operator and add funds to the prepaid account via the website (e.g., using a credit card).

In some embodiments the local payment protocol includes (1120) making a phone call from the mobile device 102 to a predetermined phone number and entering an activation code. In some embodiments the local payment protocol includes (1122) sending a message (e.g., an SMS, EMS, etc.) from the mobile device 102 to a predetermined number where the predetermined message includes an activation code. In accordance with some embodiments, the local payment protocol includes a communication (e.g., a phone call or a message) from the mobile device 102 to the current cellular network operator and the communication is routed by the communication management system 110 to the current cellular network operator. For example, a subscriber could purchase a fund addition card for the current cellular network operator (e.g., either directly from the current cellular network operator or at a resale location such as a grocery store). The subscriber would follow the instructions on the fund activation card by calling a phone number or sending a text to a number on the fund addition card, thereby instructing the current cellular network operator to add funds to a prepaid account associated with the communication profile of the mobile device 102 that is associated with the current cellular network operator (e.g., a local communication profile). However, in accordance with some embodiments, there is no prepaid account for the mobile device 102 that is managed by the current cellular network operator (e.g., because the mobile device 102 only has a prepaid account with the home cellular network operator 104).

In some embodiments, the current cellular network operator sends (1124) a communication to the communication management system 110 indicating that payment has been made for the mobile device 102 using a communication profile associated with the current cellular network (e.g., a local communication profile). The communication management system 110 receives (1126), from the current cellular network operator, the communication indicating that a payment has been made to the current cellular network operator for a mobile device 102 using a communication profile associated with the current cellular network operator (e.g., a local communication profile). In other words, the communication management system 110 is notified that the current cellular network operator has received a payment of funds and a request to use the funds to "top-up" or add value to a prepaid account for the mobile device 102.

The communication management system 110 identifies (1127), based on the communication profile that is associated with the current cellular network operator (e.g., the local communication profile), a home communication profile of the mobile device 102, the home communication profile is associated with a home cellular network operator 104. In other words, the mobile device 102 has a plurality of different communication profiles for a plurality of different cellular network operators, as described in greater detail above with reference to FIGS. 5A-5D. Typically the home cellular network operator 104 is the cellular network operator with which the subscriber has a permanent relationship, and which has a contract or other financial relationship with the subscriber. In other words, the home cellular network operator 104 is typically a cellular network operator from which the subscriber purchased the mobile device 102 or a SIM card for the mobile device 102. Thus, if the mobile device 102 has a prepaid account, the home cellular network operator 104 typically manages that prepaid account. Additional distinguishing features of the home cellular network operator 104, in accordance with some embodiments, are described in greater detail above.

It should be understood that, in accordance with some embodiments, the communication profile associated with the current cellular network operator (e.g., the local communication profile) is managed by the communication management system 110. Thus, communications directed to and from the mobile device 102 using the communication profile associated with the current cellular network operator (e.g., the local communication profile) are authenticated by the communication management system 110. For example, the communication management system 110 determines whether the mobile device 102 has sufficient funds in a prepaid account to initiate or receive a respective communication. In contrast, in some embodiments, the home communication profile (e.g., the communication profile associated with the home cellular network operator 104) is managed by the home cellular network operator 104. Thus, communications directed to and from the mobile device 102 using the home communication profile are authenticated by the home cellular network operator 104. For example, the home cellular network operator 104 determines whether the mobile device 102 has sufficient funds in a prepaid account to initiate or receive a respective communication.

In some embodiments, the communication management system 110 sends (1128) a request to the current cellular network operator to transfer at least a portion of the payment received from the subscriber to the communication management system 102. The current cellular network operator receives (1130) the request and sends (1132) at least a portion of the payment to the communication management system 110. In some embodiments the payment sent by the current cellular network operator is the whole payment received from the subscriber. In some embodiments, only a portion of the payment is sent to the communication management system 110, and the remainder of the payment received from the subscriber is kept by the current cellular network operator to cover expenses of the current cellular network operator. In accordance with some embodiments, the communication management system 110 receives the portion of the payment from the current cellular network operator.

In some embodiments, after receiving the portion of the payment from the current cellular network operator, the communication management system 110 sends (1140) a request to add funds to a prepaid account that is associated with the home communication profile of the mobile device 102 to the home cellular network operator 104. In some embodiments, sending the request to add funds to a prepaid account includes applying (1142) a proper exchange rate to convert the currency in which the payment was made to a currency that is used by the home cellular network operator 104. Applying an exchange rate in this manner is necessary primarily when payment is received from the current cellular network operator in a first currency and the home cellular network operator 104 uses a second currency for adding funds to prepaid accounts. In other words, when the payment received by the current cellular network operator is denominated in a first currency and the home cellular network operator 104 uses a second currency for adding funds to prepaid accounts, transferring the requested funds to the home cellular network operator 104 includes converting the portion of the payment from the first currency to the second currency. In some embodiments the request to add funds uses a home payment protocol that is used by the home cellular network operator 104 for adding funds to prepaid accounts. In other words, in some embodiments, the home cellular network operator 104 may have a protocol for sending an SMS message to a particular number to add funds to a prepaid account, or making a phone call to a particular phone number to add funds to the prepaid account. In some embodiments, the request to add funds follows this home payment protocol. In other embodiments, the communication management system 110 has direct access (e.g., via an application programming interface) to the prepaid fund addition system of the home cellular network operator 104, and can directly request that funds be added to the prepaid account associated with the home communication profile of the mobile device 102.

In accordance with some embodiments, the home cellular network operator 104 receives (1146) the request to add funds to the prepaid account. In response to the request, the home cellular network operator 104 adds (1148) the funds to the prepaid account. After adding the funds to the prepaid account, the home cellular network operator 104 sends (1150) a notification to the communication management system 110 indicating that the funds have been added to the prepaid account. The communication management system 110 receives (1151) the notification that funds have been added to the prepaid account. In accordance with some embodiments, the communication management system 110 manages the communications to and from the mobile device 102 while the mobile device 102 is connected with the current cellular network operator. Thus, it should be understood that, in some embodiments, the communication management system 110 makes determinations as to whether the mobile device 102 has sufficient funds in the prepaid account to initiate or receive communications.

It should be understood that, in accordance with some embodiments, the transfers of payment and addition of funds to a prepaid account described above with respect to operations 1128-1151 are merely transfers of payment obligations from the current cellular network operator to the communication management system 110 and/or the home cellular network operator. For example, the current cellular network operator transfers the obligation to honor the additional prepaid funds to the communication management system 110 and accepts an obligation to transfer the portion of the payment received from the subscriber to the communication management system 110. In some embodiments, the actual transfer of currency is performed in real-time. In some embodiments, the actual transfer of currency is performed at a later time. In some embodiments the communication management system 110 manages the transfer of currency. In some embodiments the transfer of currency is settled by a third-party financial clearinghouse. In some embodiments, a first transfer of currency takes place between the current cellular network operator and the communication management system 110, and a second transfer of currency takes place between the communication management system 110 and a home cellular network operator 104 that manages the prepaid account for the mobile device 102. In some embodiments, the currency transfer occurs directly between the current cellular network operator and a home cellular network operator 104 that manages the prepaid account for the mobile device 102.

In accordance with some embodiments, after sending the request to add funds to the prepaid account that is associated with the home communication profile of the mobile device 102, the communication management system 110 authorizes a phone call between the mobile device 102 and another device and debits funds from the prepaid account based on a cost of the phone call. More specifically, in some embodiments, the current cellular network operator receives (1152) a call associated with the mobile device 102 (e.g., either an incoming call to the mobile device 102 or an outgoing call to the mobile device 102). In response to receiving the call, the current cellular network operator sends (1154) a request to the communication management system 110 for authorization to connect the call. Additionally, in some embodiments, the current cellular network operator sends a request to the communication management system 110 for routing information or other information managed by the communication management system 110 for the mobile device 102.

The communication management system 110 receives (1156) the request and determines whether sufficient funds are available in the prepaid account associated with the mobile device 102. If sufficient funds are not (1158) available, then the method ends (1160) and no authorization is sent to the current cellular network operator. In some embodiments either the current cellular network operator or the communication management system 110 sends a notification to the mobile device 102 indicating that the prepaid account does not have sufficient funds and, optionally, providing instructions to the mobile device 102 as to how to add additional funds to the prepaid account.

If sufficient funds are (1162) available, the communication management system 110 authorizes (1164) the call. The current cellular network operator receives (1166) the authorization and connects (1168) the call. In some embodiments, the current cellular network operator monitors (1170) the call (e.g., either monitoring a duration of the call and/or monitoring a cost of the call). In some embodiments, once the call is complete the current cellular network operator sends (1172) a message indicating the cost and/or duration of the call to the communication management system 110.

The communication management system 110 determines (1174) a cost of the call either using information received from the current cellular network operator or based on information acquired directly by the communication management system 110 (e.g., by multiplying a duration of the call by a connection rate and, optionally, a flat connection fee). After determining the cost of the call, the communication management system 110 debits (1176) funds from the prepaid account (e.g., the prepaid account that is managed by the home cellular network operator 104) based on the cost of the call. In some embodiments, debiting the funds from the prepaid account includes the communication management system 110 sending a request to the home cellular network operator 104 to debit the funds from a central prepaid account. The home cellular network operator 104 receives (1180) the request to debit funds from the prepaid account, debits (1182) the funds from the prepaid account and sends (1184) a notification of the new balance of the prepaid account to the communication management system 110. The communication management system 110 subsequently receives (1186) the notification of the new balance of the prepaid account for the mobile device 102, which can thereafter be used by the communication management system 110 to determine whether to authorize further communications to and from the mobile device 102. While the preceding embodiments have been discussed primarily with respect to authorizing a phone call, it should be understood that the receipt or transmission of a message (e.g., SMS/EMS/MMS) could be authorized in an analogous manner.

Additionally, it should be understood that, in accordance with some embodiments, the communication costs for the mobile device 102 are determined by the home cellular network operator 104. In particular, even the costs of communicating while connected with a local cellular network operator 108 are determined by the home cellular network operator 104. For example, in one embodiment, the communication services of the local communication network(s) 108 are purchased by the communication management system 110 and sold to the home cellular network operator 104 at bulk rates. In this example, home cellular network operator 104 determines the retail rate for the communication services (e.g., sending/receiving phone calls, messages and/or data).

As one example of the foregoing, a prepaid subscriber has a mobile device 102 that is associated with a first carrier (e.g., CELLULARONE), where the mobile device has a prepaid account with a $50 balance that is managed by CELLULARONE. The mobile device 102 is transported to China, where the mobile device 102 is configured to operate as a local prepaid mobile device (e.g., by obtaining a local communication profile and registering with a local cellular network operator such as CHINAMOBILE as a local prepaid mobile device). While the mobile device 102 is in China using the CHINAMOBILE communication profile, the mobile device 102 uses the funds in the prepaid account that is managed by CELLULARONE (e.g., because the communication management system 110 that is in communication with both CELLULARONE and CHINAMOBILE authorizes communications on the CHINAMOBILE network based on the funds in the central prepaid account managed by CELLULARONE). Once the funds in the CELLULARONE prepaid account have been exhausted, the subscriber purchases a fund addition card at a CHINAMOBILE retail store, follows the instructions on the fund addition card (e.g., by placing a phone call to a CHINAMOBILE service number and entering an activation code), and funds are added to the CELLULARONE prepaid account (e.g., as mediated by the communication management system 110).

In other words, in accordance with some embodiments, a single central prepaid account managed by a home cellular network operator 104 is associated with the mobile device 102 even when the mobile device 102 is connected with a local cellular network operator 108 and is using a local communication profile that is associated with the local cellular network operator 108. One advantage of having a single prepaid account is that all of the funds added by the subscriber to the prepaid account while using the mobile device 102 go to a single account, which eliminates the need for the subscriber to separately add prepaid funds to different accounts for different cellular network operators and avoids the problem of transferring funds between prepaid accounts managed by different cellular network operators when the mobile device 102 switches from using a communication profile associated with one cellular network operator to using a communication profile associated with another cellular network operator (e.g., switching between cellular network operators at a mobile device 102 in accordance with the embodiments described above with reference to FIGS. 5A-5D).

The foregoing description, for purpose of explanation, has been described with reference to specific embodiments. However, the illustrative discussions above are not intended to be exhaustive or to limit the disclosed system and method to the precise forms disclosed. Many modifications and variations are possible in view of the above teachings. The embodiments were chosen and described in order to best explain the principles of the disclosed system and method and its practical applications, to thereby enable others skilled in the art to best utilize the disclosed system and method and various embodiments with various modifications as are suited to the particular use contemplated.

What is claimed is:

1. A method, comprising:
    at a mobile device having one or more processors and memory, the memory storing a plurality of communication profiles comprising a home communication profile and a global communication profile, wherein the home communication profile comprises an identifier to identify the mobile device to a home cellular network operator and the global communication profile comprises an identifier to identify the mobile device to a global cellular network operator,
    after leaving a service area of the home cellular network operator:
        determining whether the plurality of communication profiles further comprises a local communication profile that satisfies local access requirements for connecting to a local cellular network operator, the local communication profile comprising an identifier to identify the mobile device to the local cellular network operator, wherein the global cellular network operator has a cellular signal service area that is larger than a cellular signal service area for the local cellular network operator;
        in response to determining that the plurality of communication profiles does not comprise the local communication profile that satisfies the local access requirements, connecting to a communication management system via the global cellular network operator using the global communication profile;
        while connected with the communication management system, receiving, from the communication management system via the global cellular network operator, the local communication profile that satisfies the local access requirements;
        connecting to the local cellular network operator using the local communication profile that satisfies the local access requirements as received from the communication management system; and
        after connecting to the local cellular network operator, communicating with another device via the local cellular network operator as if the mobile device was a local mobile device.

2. The method of claim 1, wherein connecting to the communication management system comprises sending a request to a local partner cellular network operator of the global cellular network operator using the global communication profile.

3. The method of claim 2, wherein connecting to the communication management system further comprises routing the request by the global cellular network operator to the communication management system using a network-specific address that is specific to the global cellular network operator.

4. The method of claim 1, the local cellular network operator being a first local cellular network operator, wherein the plurality of communication profiles further comprises one or more local communication profiles distinct from the local communication profile that satisfies the local access requirements, the one or more local communication profiles each comprising a respective identifier to identify the mobile device to a respective local cellular network operator, the method further comprising:
    requesting, using a respective local communication profile of the one or more local communication profiles, a connection to the respective local cellular network operator;
    in response to requesting the connection to the respective local cellular network operator, receiving information that identifies a location of the mobile device without being connected to the respective local cellular network operator; and
    determining the local access requirements based on the location of the mobile device;
    wherein determining whether the plurality of communication profiles comprises the local communication profile that satisfies the local access requirements comprises searching the one or more local communication profiles for a local communication profile that satisfies the local access requirements, wherein the searching comprises comparing a respective local communication profile of the one or more local communication profiles to an identifier of the first local cellular network operator.

5. The method of claim 1, wherein the plurality of communication profiles further comprises one or more local communication profiles distinct from the local communication profile that satisfies the local access requirements, the one or more local communication profiles each comprising a respective identifier to identify the mobile device to a respective local cellular network operator, the method further comprising:
    requesting, using a respective local communication profile of the one or more local communication profiles, a connection to the respective local cellular network operator;
    in response to requesting the connection to the respective local cellular network operator, receiving information that identifies a location of the mobile device without being connected to the respective local cellular network operator; and
    determining the local access requirements based on the location of the mobile device.

6. The method of claim 1, wherein:
    the local cellular network operator is a first local cellular network operator;

the plurality of communication profiles further comprises one or more local communication profiles distinct from the local communication profile that satisfies the local access requirements; and determining whether the plurality of communication profiles comprises the local communication profile that satisfies the local access requirements comprises searching the one or more local communication profiles for a local communication profile that satisfies the local access requirements, wherein the searching comprises comparing a respective local communication profile of the one or more local communication profiles to an identifier of the first local cellular network operator.

7. The method of claim 1, wherein:
connecting to the communication management system comprises connecting the mobile device to the global cellular network operator via one of a first plurality of cellular nodes associated with the global cellular network operator;
connecting to the local cellular network operator using the local communication profile that satisfies the local access requirements comprises connecting the mobile device to the local cellular network operator via one of a second plurality of cellular nodes associated with the local cellular network operator; and
network coverage provided by the first plurality of cellular nodes extends over a larger geographical area than network coverage provided by the second plurality of cellular nodes.

8. The method of claim 1, wherein connecting to the communication management system comprises:
loading the global communication profile as an active communication profile;
requesting registration with the communication management system using the global communication profile; and
in response to requesting registration with the communication management system, receiving registration information from the communication management system.

9. The method of claim 8, further comprising using the global communication profile to communicate with other devices via a first cellular network operator until the local communication profile that satisfies the local access requirements is received.

10. The method of claim 1, wherein the local communication profile that satisfies the local access requirements is received as an SMS message.

11. The method of claim 1, wherein connecting to the local cellular network operator comprises:
loading the local communication profile that satisfies the local access requirements as an active communication profile;
sending a request to register with the local cellular network operator using the local communication profile that satisfies the local access requirements; and
receiving, in response to the request, registration information from the local cellular network operator.

12. The method of claim 1, further comprising using the global communication profile to communicate with other devices via a first cellular network operator until the local communication profile that satisfies the local access requirements is received.

13. The method of claim 1, wherein:
the memory comprises a subscriber identity module (SIM) card;
the plurality of communication profiles is stored on the SIM card; and
the method further comprises, after receiving the local communication profile that satisfies the local access requirements and before connecting to the local cellular network operator, moving the local communication profile that satisfies the local access requirements into an active location of the SIM card.

14. The method of claim 13, wherein the SIM card is removable from the mobile device.

15. A mobile device, comprising:
one or more processors;
memory storing one or more programs and a plurality of communication profiles, the plurality of communication profiles comprising:
a home communication profile comprising an identifier to identify the mobile device to a home cellular network operator; and
a global communication profile comprising an identifier to identify the mobile device to a global cellular network operator;
wherein the one or more programs are configured to be executed by the one or more processors, the one or more programs including instructions for:
determining whether the plurality of communication profiles further comprises a local communication profile that satisfies local access requirements for connecting to a local cellular network operator, the local communication profile comprising an identifier to identify the mobile device to the local cellular network operator, wherein the global cellular network operator has a cellular signal service area that is larger than a cellular signal service area for the local cellular network operator;
in response to determining that the plurality of communication profiles does not comprise the local communication profile that satisfies the local access requirements, connecting to a communication management system via the global cellular network operator using the global communication profile;
while connected with the communication management system, receiving, from the communication management system via the global cellular network operator, the local communication profile that satisfies the local access requirements;
connecting to the local cellular network operator using the local communication profile that satisfies the local access requirements as received from the communication management system; and
after connecting to the local cellular network operator, communicating with another device via the local cellular network operator as if the mobile device was a local mobile device.

16. The mobile device of claim 15, wherein:
the memory comprises a subscriber identity module (SIM) card;
the plurality of communication profiles is stored on the SIM card; and
the one or more programs further include instructions for moving the local communication profile that satisfies the local access requirements into an active location of the SIM card after receiving the local communication profile that satisfies the local access requirements and before connecting to the local cellular network operator.

17. The mobile device of claim 16, wherein the SIM card is removable from the mobile device.

18. A method, comprising:
at a communication management system having one or more processors and memory:
- receiving from a global cellular network operator a first request to connect a mobile device to the communication management system using a global communication profile comprising an identifier to identify the mobile device to the global cellular network operator, wherein the mobile device was previously connected to a home cellular network operator using a home communication profile comprising an identifier to identify the mobile device to the home cellular network operator;
- in response to the first request, enabling the mobile device to connect to the communication management system via the global cellular network operator using the global communication profile;
- while the mobile device is connected to the communication management system, sending to the mobile device via the global cellular network operator a local communication profile that satisfies local access requirements for connecting to a local cellular network operator;
- after sending the local communication profile to the mobile device, receiving from the local cellular network operator a second request to connect the mobile device to the local cellular network operator using the local communication profile; and
- in response to the second request, enabling the mobile device to connect to the local cellular network operator.

* * * * *